United States Patent
Kwon et al.

(10) Patent No.: US 10,498,792 B2
(45) Date of Patent: Dec. 3, 2019

(54) APPARATUS AND METHOD FOR TRANSMITTING OR RECEIVING BROADCAST SIGNAL

(71) Applicant: LG ELECTRONICS INC., Seoul (KR)

(72) Inventors: Woosuk Kwon, Seoul (KR); Minsung Kwak, Seoul (KR); Kyoungsoo Moon, Seoul (KR); Woosuk Ko, Seoul (KR); Sungryong Hong, Seoul (KR)

(73) Assignee: LG ELECTRONICS INC., Seoul (KR)

(*) Notice: Subject to any disclaimer, the term of this patent is extended or adjusted under 35 U.S.C. 154(b) by 170 days.

(21) Appl. No.: 15/574,802

(22) PCT Filed: May 16, 2016

(86) PCT No.: PCT/KR2016/005143
§ 371 (c)(1),
(2) Date: Nov. 16, 2017

(87) PCT Pub. No.: WO2016/186407
PCT Pub. Date: Nov. 24, 2016

(65) Prior Publication Data
US 2018/0146022 A1    May 24, 2018

Related U.S. Application Data

(60) Provisional application No. 62/172,210, filed on Jun. 7, 2015, provisional application No. 62/171,254, filed
(Continued)

(51) Int. Cl.
*H04L 29/06* (2006.01)
*H04N 21/2343* (2011.01)
(Continued)

(52) U.S. Cl.
CPC ........ *H04L 65/607* (2013.01); *H04L 65/4076* (2013.01); *H04N 21/2343* (2013.01); *H04N 21/2362* (2013.01); *H04N 21/858* (2013.01)

(58) Field of Classification Search
None
See application file for complete search history.

(56) References Cited

U.S. PATENT DOCUMENTS

2016/0198241 A1* 7/2016 Kitazato ............ H04N 21/4345 725/33

FOREIGN PATENT DOCUMENTS

KR   10-2010-0105314 A1   9/2010
KR       10-1241890 B1    3/2013
(Continued)

OTHER PUBLICATIONS

Department of Homeland Security, "Accessible Common Alerting Protocol Radio Data System Demonstration: Gulf Coast States," Final Report, Aug. 2014.*

*Primary Examiner* — Michael J Hess
(74) *Attorney, Agent, or Firm* — Birch, Stewart, Kolasch & Birch, LLP

(57) ABSTRACT

A method for transmitting a broadcast signal is disclosed. The method for transmitting a broadcast signal according to an embodiment of the present invention includes performing delivery layer processing of a broadcast service data and signaling information with respect to the broadcast service data, performing UDP/IP encapsulation of a broadcast service data and signaling information with respect to the broadcast service data and performing physical layer processing of a broadcast service data and signaling information with respect to the broadcast service data.

14 Claims, 33 Drawing Sheets

Related U.S. Application Data on Jun. 5, 2015, provisional application No. 62/163,351, filed on May 18, 2015, provisional application No. 62/162,802, filed on May 17, 2015.

(51) Int. Cl.
*H04N 21/2362* (2011.01)
*H04N 21/858* (2011.01)

(56) References Cited

FOREIGN PATENT DOCUMENTS

| | | |
|---|---|---|
| KR | 10-1435840 B1 | 8/2014 |
| KR | 10-1467818 B1 | 12/2014 |
| WO | WO 2013/162312 A1 | 10/2013 |

\* cited by examiner

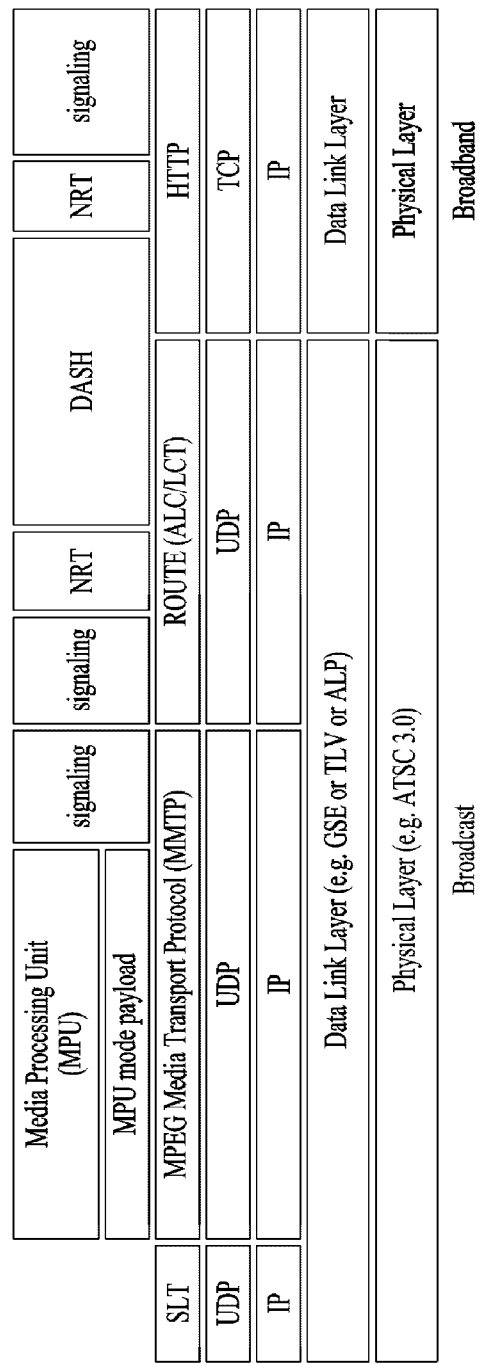
[Figure 1]

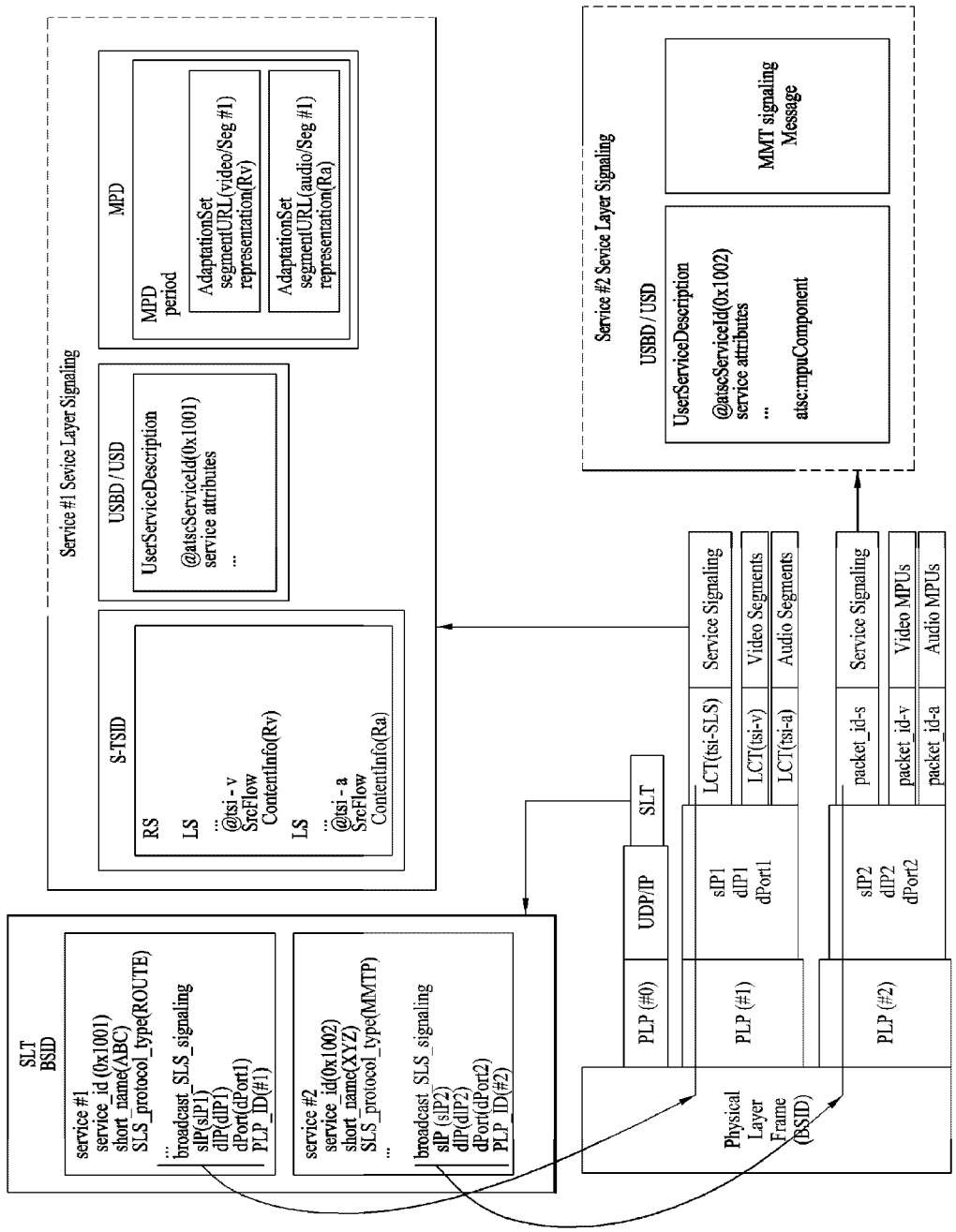
[Figure 2]

【Figure 3】

| Syntax | No. of Bits | Format |
|---|---|---|
| LLS_table( ) { | | |
|    LLS_table_id | 8 | uimsbf |
|    provider_id | 8 | uimsbf |
|    LLS_table_version | 8 | uimsbf |
|    switch (LLS_table_id) { | | |
|      case 0x01: | | |
|        SLT | var | Sec. 6.3 |
|        break; | | |
|      case 0x02: | | |
|        RRT | var | See Annex F |
|        break; | | |
|      case 0x03: | | |
|        System Time | var | Sec. 6.4 |
|        break; | | |
|      case 0x04: | | |
|        CAP | var | Sec. 6.5 |
|        break; | | |
|      default: | | |
|        reserved | var | |
|    } | | |
| } | | | t3010

| Element or Attribute Name | Use | Data Type |
|---|---|---|
| SLT | | |
|   @bsid | 1 | unsignedShort |
|   @sltCapabilities | 0..1 | string |
|   sltInetUrl | 0..1 | anyURL |
|     @urlType | 1 | unsignedByte |
|   Service | 1..N | |
|     @serviceID | 1 | unsignedShort |
|     @sltSvcSeqNum | 1 | unsignedByte |
|     @protected | 0..1 | boolean |
|     @majorChannelNo | 0..1 | 1...999 |
|     @minorChannelNo | 0..1 | 1...999 |
|     @serviceCategory | 1 | unsignedByte |
|     @shortServiceName | 0..1 | string |
|     @hidden | 0..1 | boolean |
|     @broadbandAccessRequired | 0..1 | boolean |
|     @svcCapabilities | 0..1 | string |
|     BroadcastSvcCignaling | 0..1 | |
|       @slsProtocol | 1 | unsignedByte |
|       @slsMajorProtocolVersion | 1 | unsignedByte |
|       @slsMinorProtocolVersion | 1 | unsignedByte |
|       @slsPlpID | 0..1 | unsignedByte |
|       @slsDestinationIpAddress | 1 | string |
|       @slsDestinationUdpPort | 1 | unsignedShort |
|       @slsSourceIpAddress | 1 | string |
|     svcInetUrl | 0..N | anyURL |
|       @urlType | 1 | unsignedByte | t3020

【Figure 4】

| Element or Attribute Name | | | | Use | Data Type |
|---|---|---|---|---|---|
| bundleDescription | | | | | |
|   userServiceDescription | | | | | |
| | @globalServiceID | | | 1 | anyURL |
| | @serviceID | | | 1 | unsignedShort |
| | @serviceStatus | | | 0..1 | boolean |
| | @fullMPDUri | | | 1 | anyURL |
| | @sTSIDUri | | | 1 | anyURL |
| | name | | | 0..N | string |
| | | @lang | | 1 | language |
| | serviceLanguage | | | 0..N | language |
| | capabilityCode | | | 0..1 | string |
| | deliveryMethod | | | 1..N | |
| | | broadcastAppService | | 1..N | |
| | | | basePattern | 1..N | string |
| | | unicastAppService | | 0..N | |
| | | | basePattern | 1..N | string |

— t4010

| Element or Attribute Name | | | Use | Data Type |
|---|---|---|---|---|
| S-TSID | | | | |
| | @serviceID | | 1 | unsignedShort |
| | RS | | 1..N | |
| | | @bsid | 0..1 | unsignedShort |
| | | @sIpAddr | 0..1 | string |
| | | @dIpAddr | 0..1 | string |
| | | @dport | 0..1 | unsignedShort |
| | | @PLPID | 0..1 | unsignedByte |
| | | LS | 1..N | |
| | |   @tsi | 1 | unsignedInt |
| | |   @PLPID | 0..1 | unsignedByte |
| | |   @bw | 0..1 | unsignedInt |
| | |   @startTime | 0..1 | dateTime |
| | |   @endTime | 0..1 | dateTime |
| | |   ScrFlow | 0..1 | scrFlowType |
| | |   RepairFlow | 0..1 | rprFlowType | t4020

[Figure 5]

| Element or Attribute Name | | | | Use |
|---|---|---|---|---|
| bundleDescription | | | | |
| | userServiceDescription | | | |
| | | @globalServiceID | | M |
| | | @serviceID | | M |
| | | Name | | 0..N |
| | | | @lang | CM |
| | | serviceLanguage | | 0..N |
| | | contentAdvisoryRating | | 0..1 |
| | | Channel | | 1 |
| | | | @serviceGenre | 0..1 |
| | | | @serviceIcon | 1 |
| | | | ServiceDescription | 0..N |
| | | | | @serviceDescrText | 1 |
| | | | | @serviceDescrLang | 0..1 |
| | | mpuComponent | | 0..1 |
| | | | @mmtPackageId | 1 |
| | | | @nextMmtPackageId | 0..1 |
| | | routeComponent | | 0..1 |
| | | | @sTSIDUri | 1 |
| | | | @sTSIDDestinationIpAddress | 0..1 |
| | | | @sTSIDDestinationUdpPort | 1 |
| | | | @sTSIDSourceIpAddress | 1 |
| | | | @sTSIDMajorProtocolVersion | 0..1 |
| | | | @sTSIDMinorProtocolVersion | 0..1 |
| | | broadbandComponent | | 0..1 |
| | | | @fullMPDUri | 1 |
| | | ComponentInfo | | 1..N |
| | | | @ComponentType | 1 |
| | | | @ComponentRole | 1 |
| | | | @ComponentProtectedFlag | 0..1 |
| | | | @ComponentId | 1 |
| | | | @ComponentName | 0..1 |

[Figure 6]
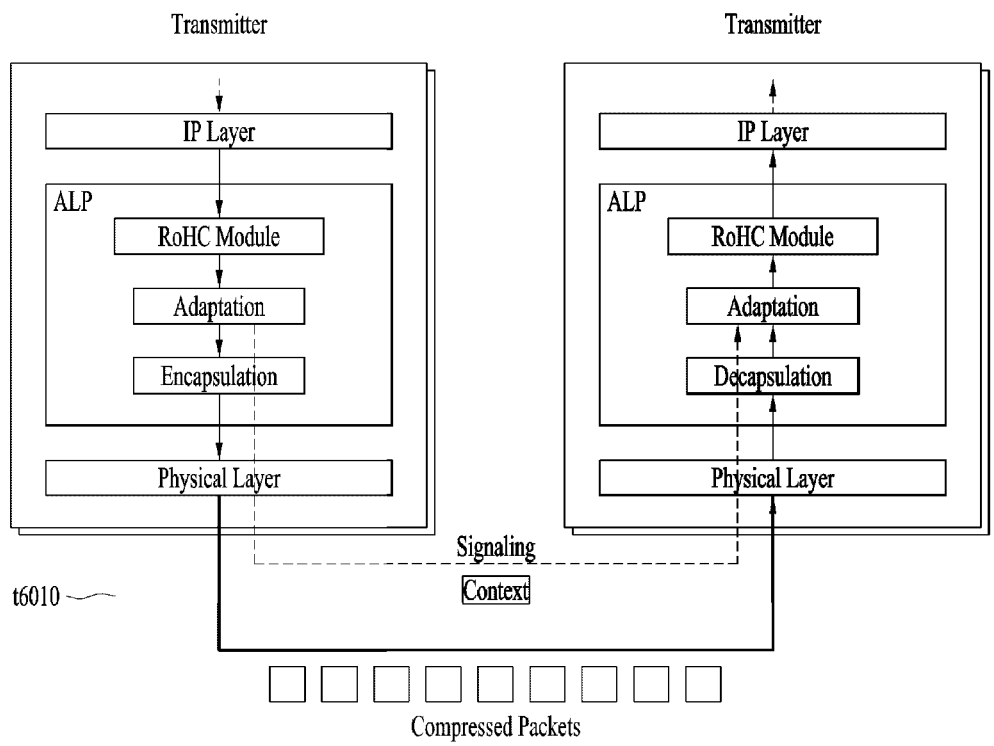
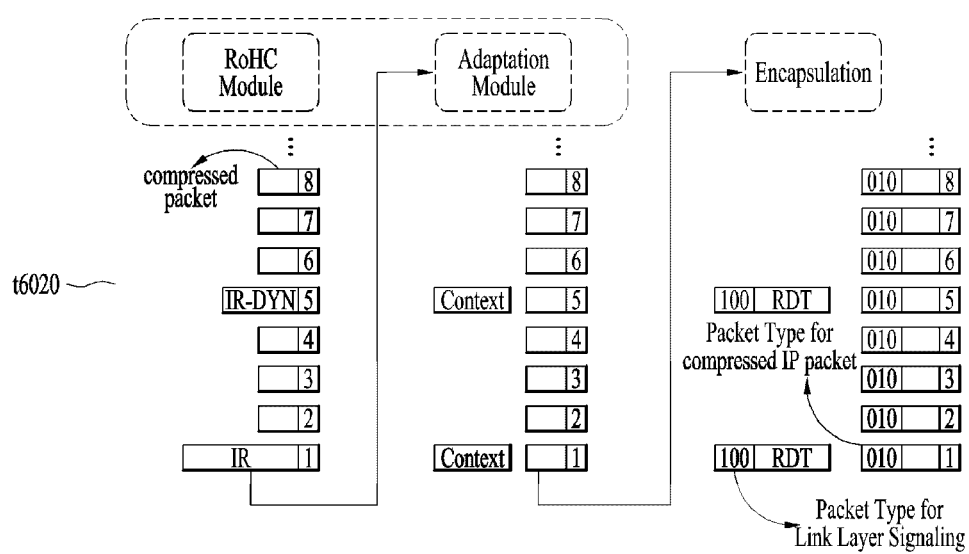

[Figure 7]

| Syntax | Number of bits | Format |
|---|---|---|
| Link_Mapping_Table() { | | |
|     signaling_type | 8 | 0x01 |
|     PLP_ID | 6 | uimsbf |
|     reserved | 2 | "11" |
|     num_session | 8 | uimsbf |
|     for(i = 0 ; i < num_session ; i++) { | | |
|         src_IP_add | 32 | uimsbf |
|         dst_IP_add | 32 | uimsbf |
|         src_UDP_port | 16 | uimsbf |
|         dst_UDP_port | 16 | uimsbf |
|         SID_flag | 1 | bslbf |
|         compressed_flag | 1 | bslbf |
|         reserved | 6 | '111111' |
|         if (SID_flag == "1") { | | |
|             SID | 8 | uimsbf |
|         } | | |
|         if (compressed_flag == '1') { | | |
|             context_id | 8 | uimsbf |
|         } | | |
|     } | | |
| } | | |

[Figure 8]
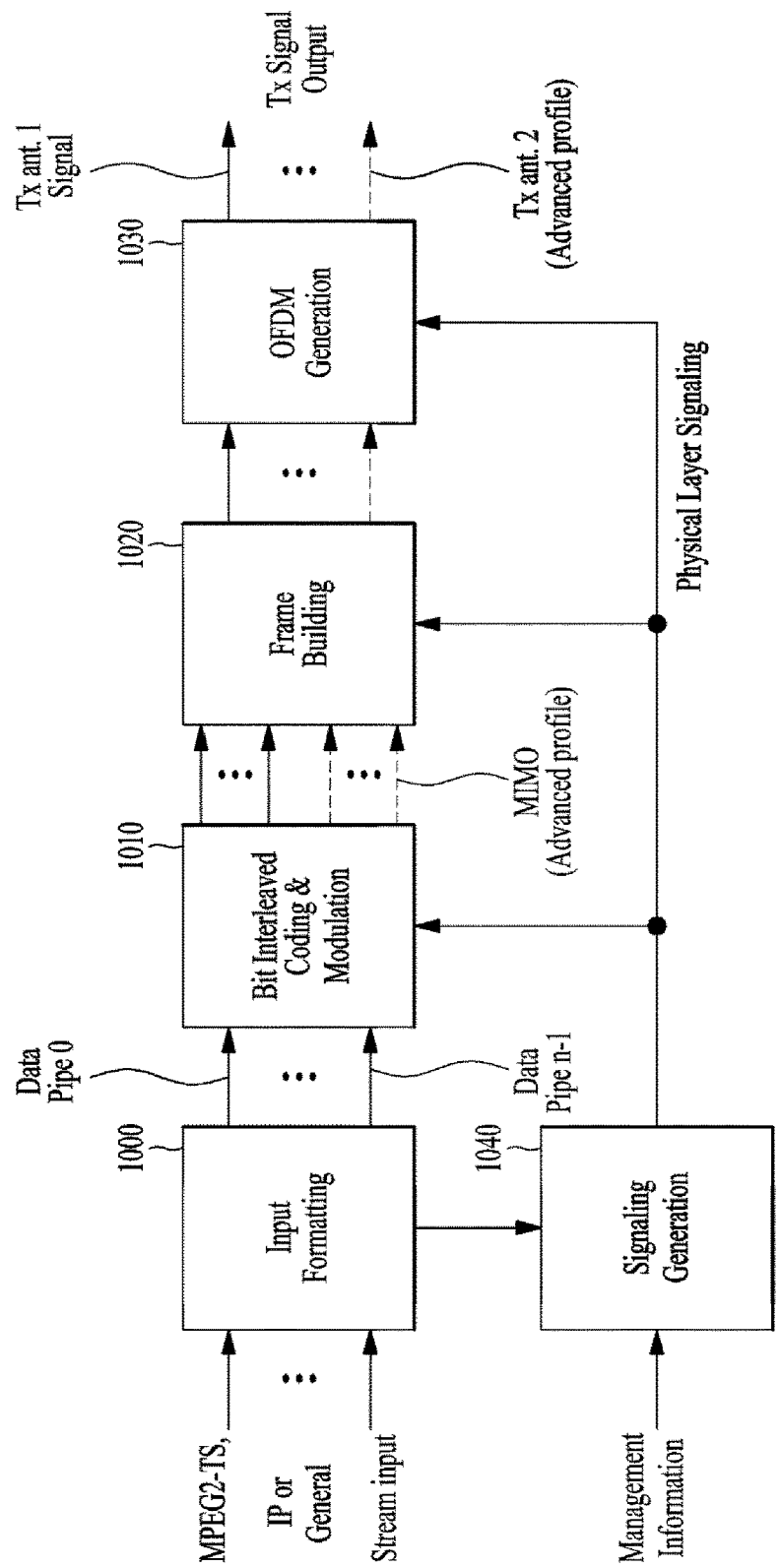

[Figure 9]

[Figure 10]
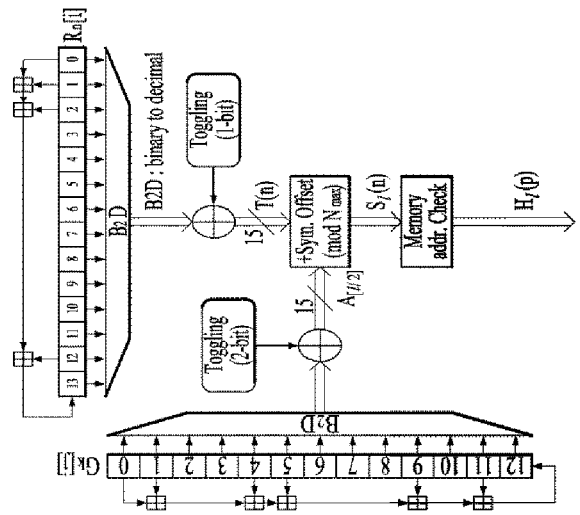
(c)
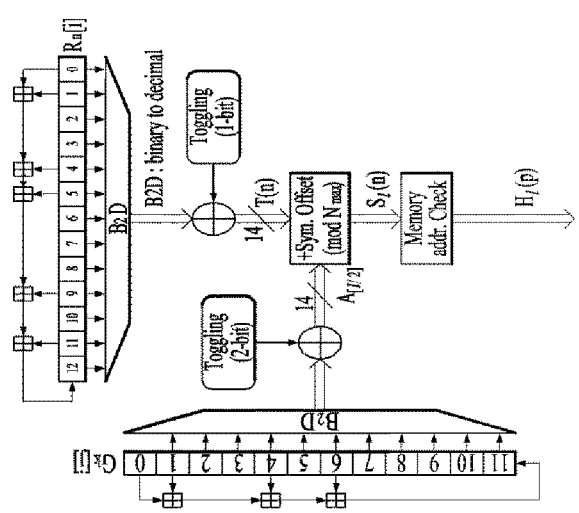
(b)
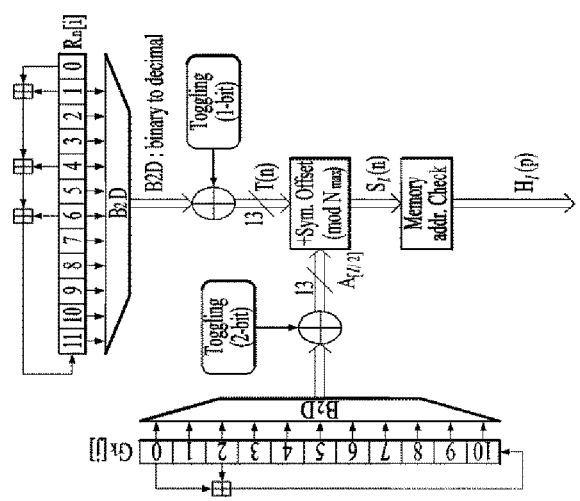
(a)

[Figure 11]
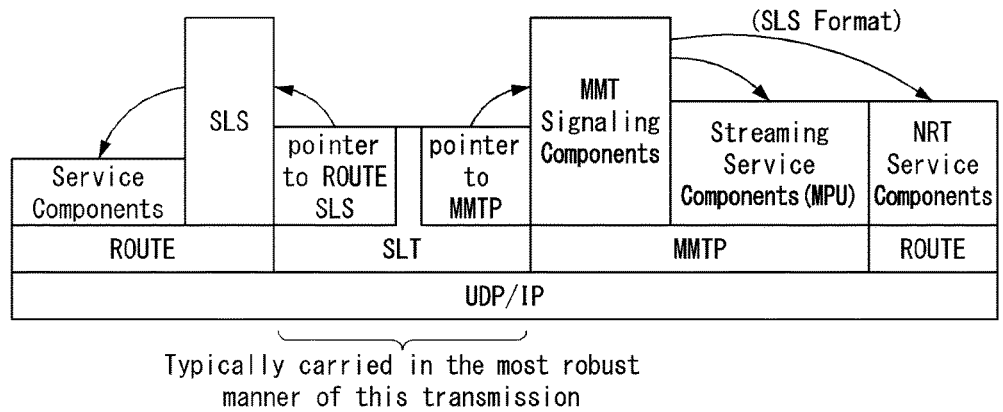
[Figure 12]
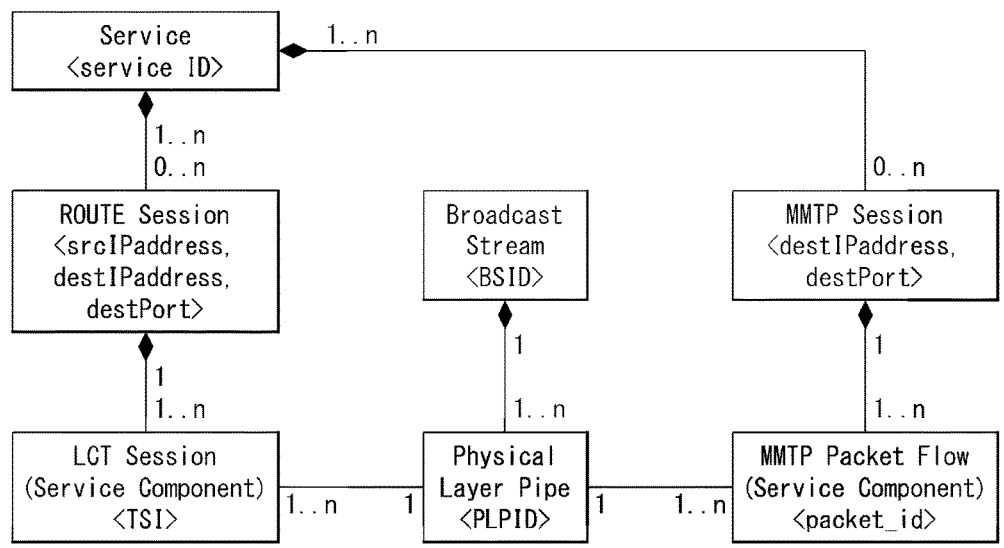

[Figure 13]
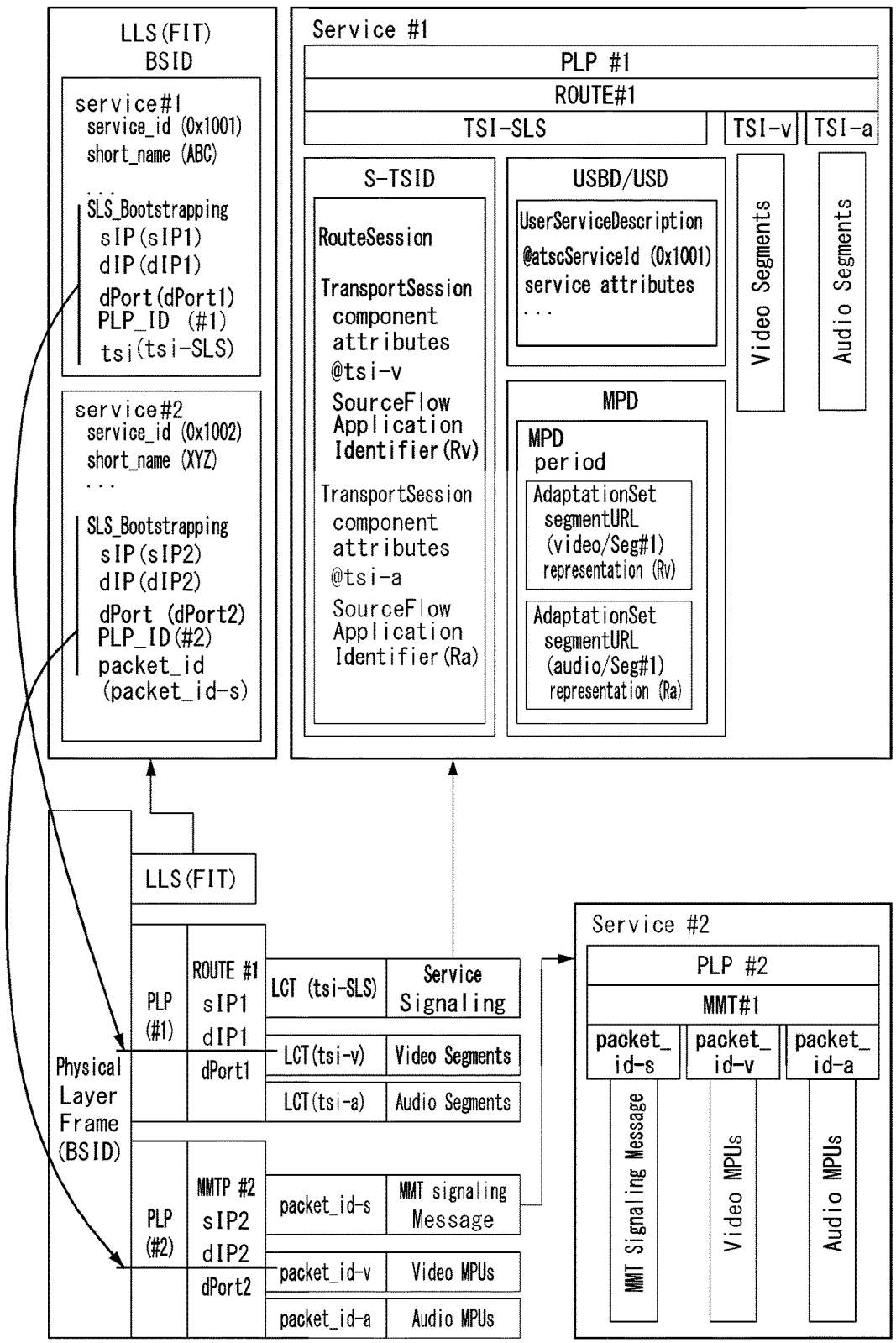

[Figure 14]

| Syntax | No. of | Format |
|---|---|---|
| service_list_table_section() { | | |
|     table_id | 8 | TBD |
|     SLT_section_version | 4 | uimsbf |
|     SLT_section_length | 12 | uimsbf |
|     SLT_protocol_version | 8 | uimsbf |
|     broadcast_stream_id | 16 | uimsbf |
|     SLT_section_number | 4 | uimsbf |
|     last_SLT_section_number | 4 | uimsbf |
|     num_services | 8 | uimsbf |
|     for (i=0; i<num_services;i++) { | | |
|         service_id | 16 | uimsbf |
|         SLT_service_seq_number | 3 | uimsbf |
|         protected | 1 | bslbf |
|         major_channel_number | 10 | uimsbf |
|         minor_channel_number | 10 | uimsbf |
|         service_category | 4 | uimsbf |
|         short_service_name_length  /* m */ | 4 | uimsbf |
|         short_service_name() | 8*m | uimsbf |
|         broadcast_signaling_present | 1 | bslbf |
|         SLS_source_IP_address_present | 1 | bslbf |
|         broadband_access_required | 1 | bslbf |
|         reserved | 1 | '1' |
|         SLS_protocol_type | 4 | uimsbf |
|         if (broadcast_signaling_present) { | | |
|             SLS_PLP_ID | 8 | uimsbf |
|             SLS_destination_IP_address | 32 | uimsbf |
|             SLS_destination_UDP_port | 16 | uimsbf |
|             if (SLS_source_address_present) { | | |
|                 SLS_source_IP_address | 32 | uimsbf |
|             } | | |
|             SLS_protocol_version | 8 | uimsbf |
|             reserved | 4 | '1111' |
|             num_ext_length_bits  /* b */ | 4 | uimsbf |
|             if (num_ext_length_bits>0) { | | |
|                 if (num_ext_length_bits%8) != 0 { | | |
|                     reserved1 | (8 - b%8) | '11111..' |
|                 } | | |
|                 ext_length  /* e */ | b | uimsbf |
|                 reserved2() | 8*e | |
|             } | | |
|         } | | |
|         reserved | 4 | '1111' |
|         num_service_level_descriptors | 4 | uimsbf |
|         for (j=0;j<num_service_level_descriptors;j++) { | | |
|             service_level_descriptor() | var | |
|         } | | |
|     } | | |
|     reserved | 4 | '1111' |
|     num_SLT_level_descriptors | 4 | uimsbf |
|     for (n=0; n<num_SLT_level_descriptors; n++) { | | |
|         SLT_level_descriptor() | var | |
|     } | | |
|     for (k=0; k<N; k++) { | | |
|         reserved3 | 8 | |
|     } | | |
| } | | |

[Figure 15]

| Element or Attribute Name | | | Use |
|---|---|---|---|
| slt | | | |
| | @bsid | | 1 |
| | @sltSectionVersion | | 1 |
| | @sltSectionNumber | | 0..1 |
| | @totalSltSectionNumbers | | 0..1 |
| | @language | | 0..1 |
| | @capabilities | | 0..1 |
| | InetSigLocation | | 0..1 |
| | Service | | 1..N |
| | | @serviceId | 1 |
| | | @SLTserviceSeqNumber | 1 |
| | | @protected | 0..1 |
| | | @majorChannelNo | 1 |
| | | @minorChannelNo | 1 |
| | | @serviceCategory | 1 |
| | | @shortServiceName | 1 |
| | | @SLSProtocolType | 1 |
| | | @slsPlpId | 0..1 |
| | | @slsDestinationIpAddress | 0..1 |
| | | @slsDestinationUdpPort | 0..1 |
| | | @slsSourceIpAddress | 0..1 |
| | | @slsMajorProtocolVersion | 0..1 |
| | | @SlsMinorProtocolVersion | 0..1 |
| | | @serviceLanguage | 0..1 |
| | | @broadbandAccessRequired | 0..1 |
| | | @capabilities | 0..1 |
| | | InetSigLocation | 0..1 |

【Figure 16】
| InetSigLocation | | 0..1 |
|---|---|---|
| | @urlType | 1 |
| | @url | 1 |
【Figure 17】
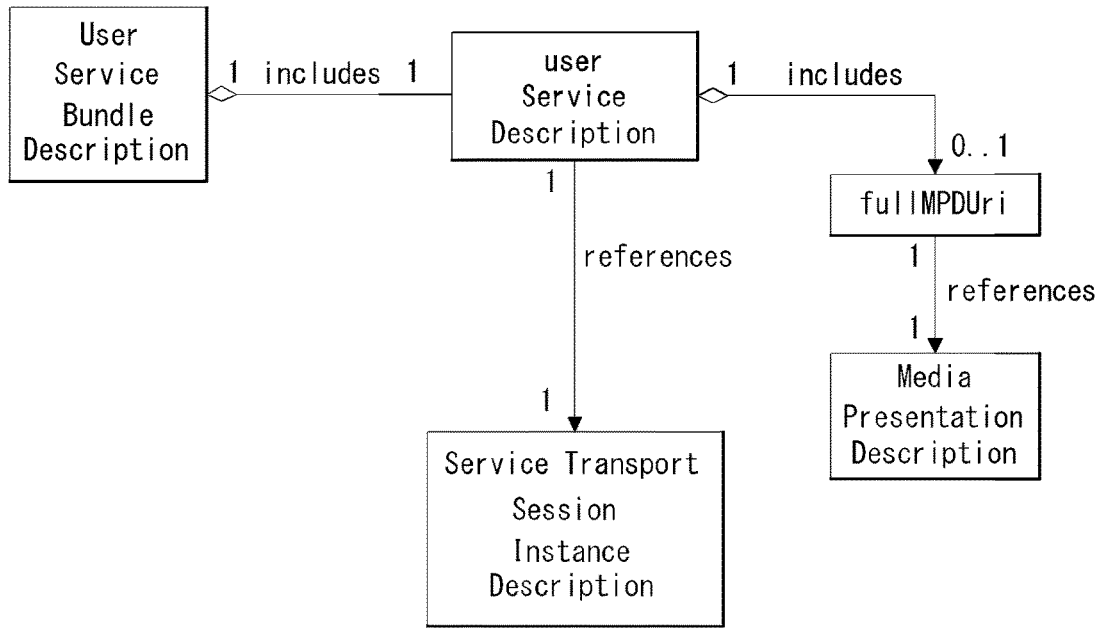

[Figure 18]

| Element or Attribute Name | | | | | Use |
|---|---|---|---|---|---|
| bundleDescription | | | | | |
| | userServiceDescription | | | | |
| | | @serviceId | | | M |
| | | @atsc:serviceId | | | M |
| | | @atsc:fullMPDUri | | | M |
| | | @atsc:sTSIDUri | | | M |
| | | name | | | 0···N |
| | | | lang | | CM |
| | | serviceLanguage | | | 0···N |
| | | atsc : capabilityCode | | | 0···1 |
| | | deliveryMethod | | | 1...N |
| | | | atsc : broadcastAppService | | 1···N |
| | | | | basePattern | 1···N |
| | | | atsc : unicastAppService | | 0···N |
| | | | | basePattern | 1···N |
| Legend: | | | | | |
| For attributes: M=Mandatory, O=Optional, OD=Optional with Default Value, CM=Conditionally Mandatory. | | | | | |
| For elements: <minOccurs>...<maxOccurs> (N=unbounded) | | | | | |
| Note that the conditions only holds without using xlink:href. If linking is used, then all attributes are "optional" and <minOccurs=0> | | | | | |
| Elements are bold; attributes are non-bold and preceded with an @. | | | | | |

[Figure 19]

| Element/@Attribute | | | | Use |
|---|---|---|---|---|
| S-TSID | | | | |
| | RS | | | 1..N |
| | | @bsid | | OD |
| | | @sIpAddr | | OD |
| | | @dIpAddr | | OD |
| | | @dport | | OD |
| | | @PLPID | | OD |
| | | LS | | 1..N |
| | | | @tsi | M |
| | | | @PLPID | OD |
| | | | @bw | O |
| | | | @startTime | O |
| | | | @endTime | O |
| | | | SrcFlow | 0..1 |
| | | | RprFlow | 0..1 |

Legend:

For attributes: M=Mandatory, O=Optional, OD=Optional with Default Value, CM=Conditionally Mandatory.

For elements: <minOccurs>...<maxOccurs> (N=unbounded)

Note that the conditions only holds without using xlink:href. If linking is used, then all attributes are "optional" and <minOccurs=0>

Elements are bold; attributes are non-bold and preceded with an @.

【Figure 20】
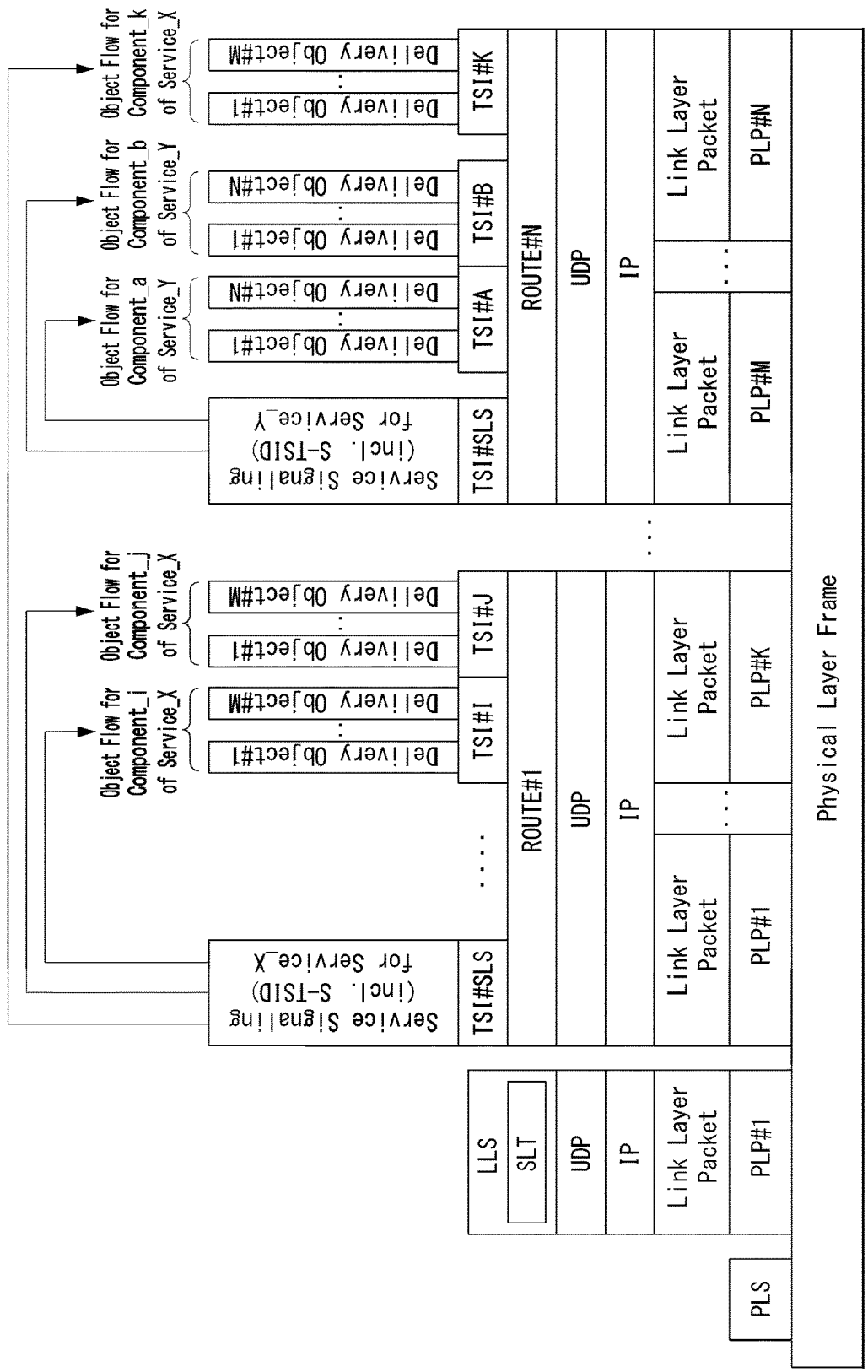

[Figure 21]
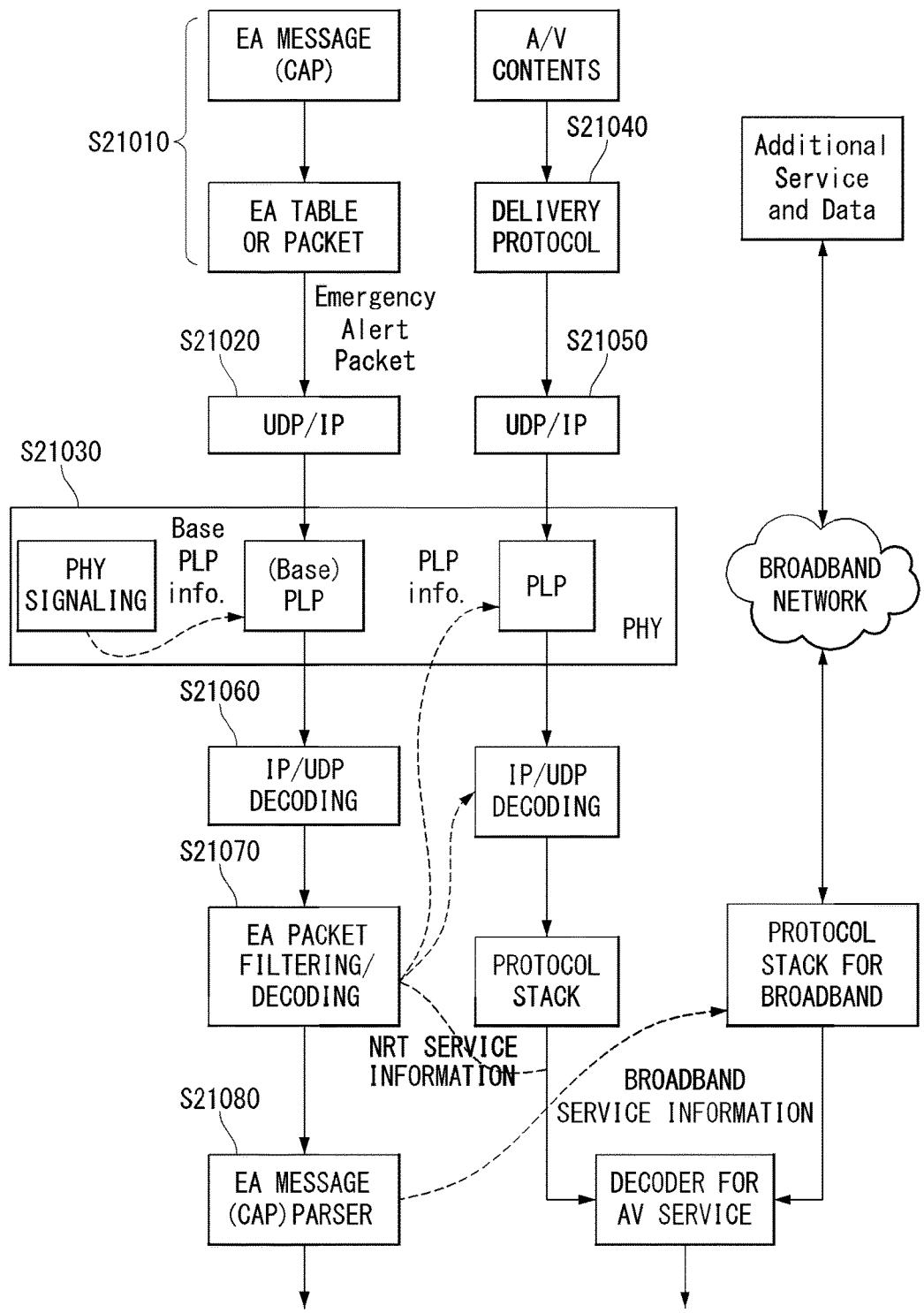

[Figure 22]
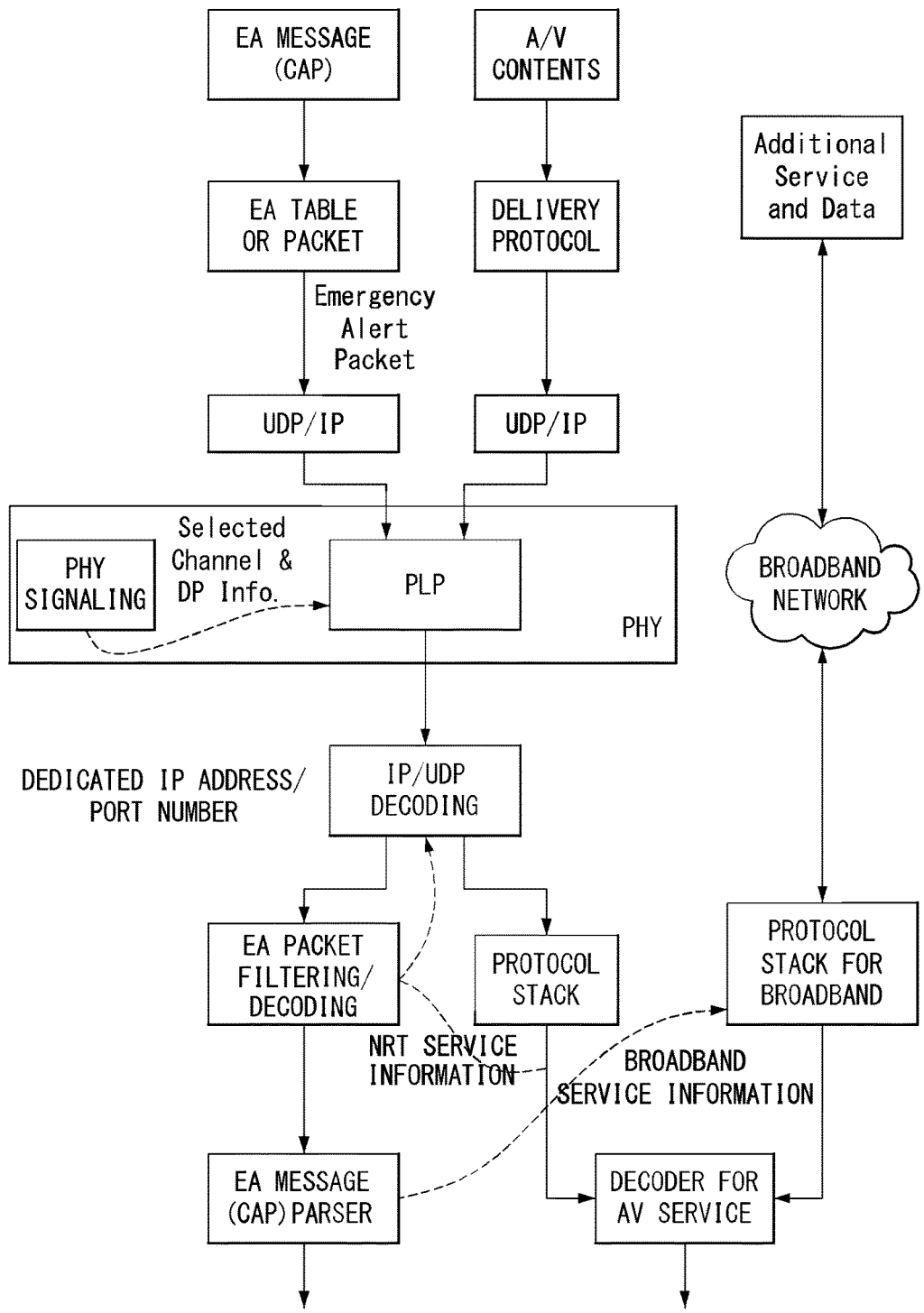

【Figure 23】

| Syntax | No. Bits | Format |
|---|---|---|
| Emergency_Alert() { | | |
|     message_identifier_str_length /* m */ | 8 | uimsbf |
|     message_identifier_str() | m | var |
|     sender_str_length /* m */ | 8 | uimsbf |
|     sender_str() | m | var |
|     sent_str_length /* m */ | 8 | uimsbf |
|     sent_str() | m | var |
|     status | 4 | uimsbf |
|     msgType | 4 | uimsbf |
|     scope | 4 | uimsbf |
|     num_info | 8 | uimsbf |
|     for (i=0; i< num_info; i++) { | | |
|         category | 8 | uimsbf |
|         reserved | 4 | '1111' |
|         lang_str_length /* m */ | 4 | uimsbf |
|         lang_str | m | var |
|         event_str_length /* m */ | 8 | uimsbf |
|         event_str() | m | var |
|         urgency | 4 | uimsbf |
|         severity | 4 | uimsbf |
|         certainty | 4 | uimsbf |
|         num_resources | 8 | uimsbf |
|         for (j=0; j< num_resources; j++) { | | |
|             resource_desc_str_length /* m */ | 8 | uimsbf |
|             resource_desc_str | m | var |
|             mimeType_str_length /* m */ | 8 | uimsbf |
|             mimeType_str | m | var |
|             resource_location() | | |
|         } | | |
|     } | | |
| } | | |

[Figure 24]
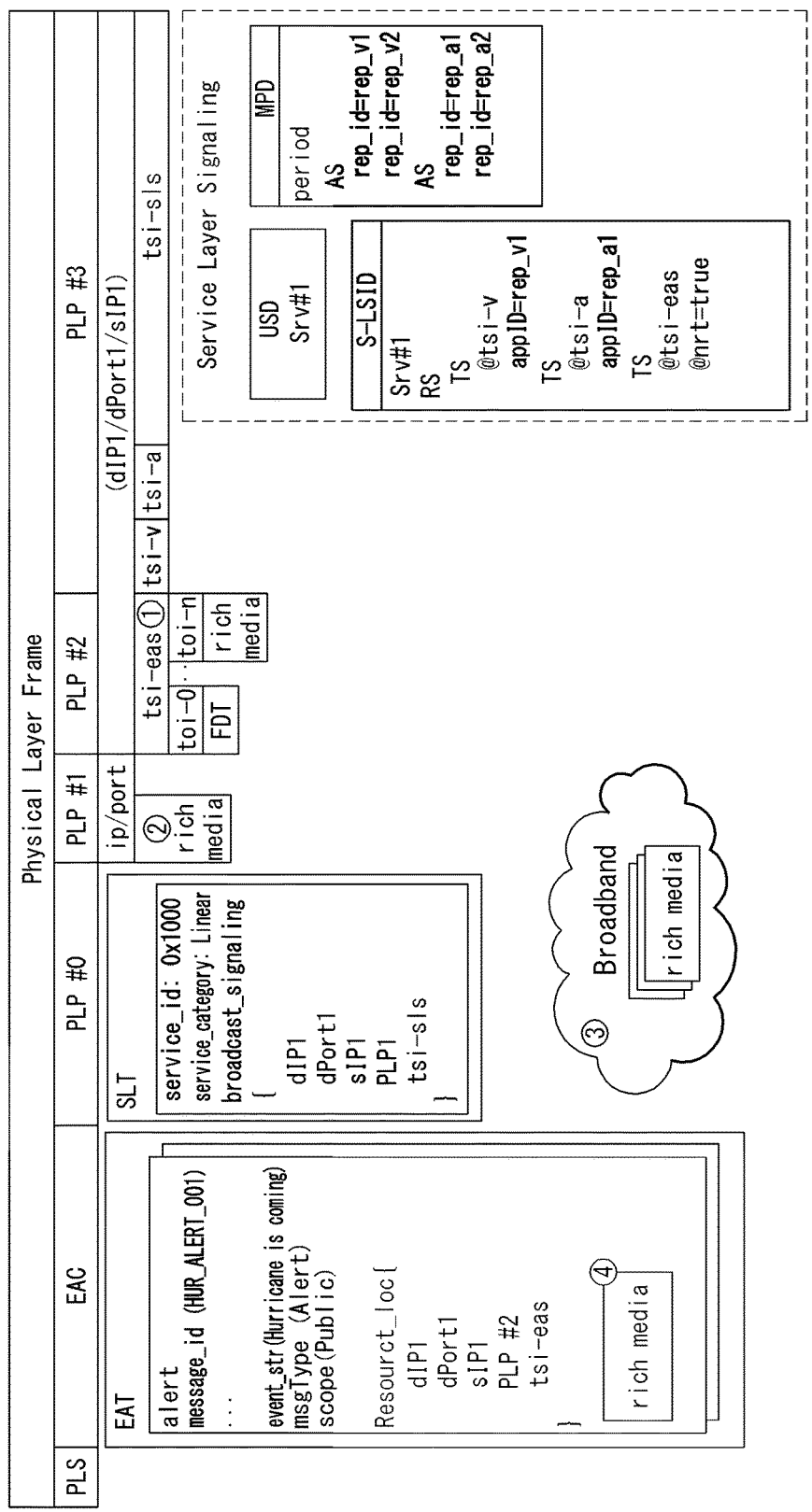

【Figure 25】

| Syntax | No. Bits | Format |
|---|---|---|
| resource_location() { | | |
|     location_type | 8 | uimsbf |
|     if(location_type == 0x01){ | | |
|         PLP_ID | 16 | uimsbf |
|         source_IP_address | 32 or 128 | uimsbf |
|         destination_IP_address | 32 or 128 | uimsbf |
|         destination_Port | 16 | uimsbf |
|         session_id | 16 | uimsbf |
|         broadcast_stream_id | 16 | uimsbf |
|     } | | |
|     else if(location_type == 0x02){ | | |
|         PLP_ID | 16 | uimsbf |
|         destination_IP_address | 32 or 128 | uimsbf |
|         destination_Port | 16 | uimsbf |
|         broadcast_stream_id | 16 | uimsbf |
|     } | | |
|     else if(location_type == 0x03){ | | |
|         resource_download_url_str_length /* m */ | 8 | uimsbf |
|         resource_download_url_str | m | var |
|     } | | |
|     else if(location_type == 0x04){ | | uimsbf |
|         resource_data_length /* m */ | 32 | uimsbf |
|         resource_data_bytes() | m | var |
|     } | | |
| } | | |

【Figure 26】

| Syntax | No. Bits | Format |
|---|---|---|
| Emergency_Alert_Table() { | | |
|     table_id | 8 | TBD |
|     table_id_extension{ | | |
|         reserved | 8 | |
|         EAT_protocol_version | 8 | uimsbf |
|     } | | |
|     section_length | 16 | uimsbf |
|     EAT_version_number | 8 | uimsbf |
|     current_section_number | 8 | uimsbf |
|     last_section_number | 8 | uimsbf |
|     num_emergency_alert | 8 | uimsbf |
|     for (m=0; m< num_emergency_alert; m++) { | | |
|         ea_id | 8 | uimsbf |
|         reserved | 2 | '1111' |
|         ea_transfer_type | 3 | uimsbf |
|         ea_format | 3 | uimsbf |
|         if(ea_transfer_type == 0x01){ | | |
|             if(ea_format == 0x01){ | | |
|                 reserved | 6 | '111111' |
|                 encoding_type | 2 | uimsbf |
|                 CAP_data_length | 16 | uimsbf |
|                 CAP_data_bytes() | var | |
|             } | | |
|             else if(ea_format == 0x02){ | | |
|                 emergency_alert_length | 16 | uimsbf |
|                 emergency_alert() | var | |
|             } | | |
|             else if(ea_format == 0x03){ | | |
|                 reserved | 6 | '111111' |
|                 encoding_type | 2 | uimsbf |
|                 emergency_alert_length | 16 | uimsbf |
|                 emergency_alert() | var | |
|             } | | |
|         } | | |
|         else if(ea_transfer_type == 0x02){ | | |
|             broadcast_stream_id | 16 | uimsbf |
|             PLP_ID | 8 | uimsbf |
|             sourceIPaddress | 32 | uimsbf |
|             destinationIPaddress | 32 | uimsbf |
|             destinationPort | 16 | uimsbf |
|             tsi | 16 | uimsbf |
|         } | | |
|         else if(ea_transfer_type == 0x03){ | | |
|             ea_url_length /* m */ | 8 | uimsbf |
|             ea_url | var | |
|         } | | |
|     } | | |
| } | | |

[Figure 27]
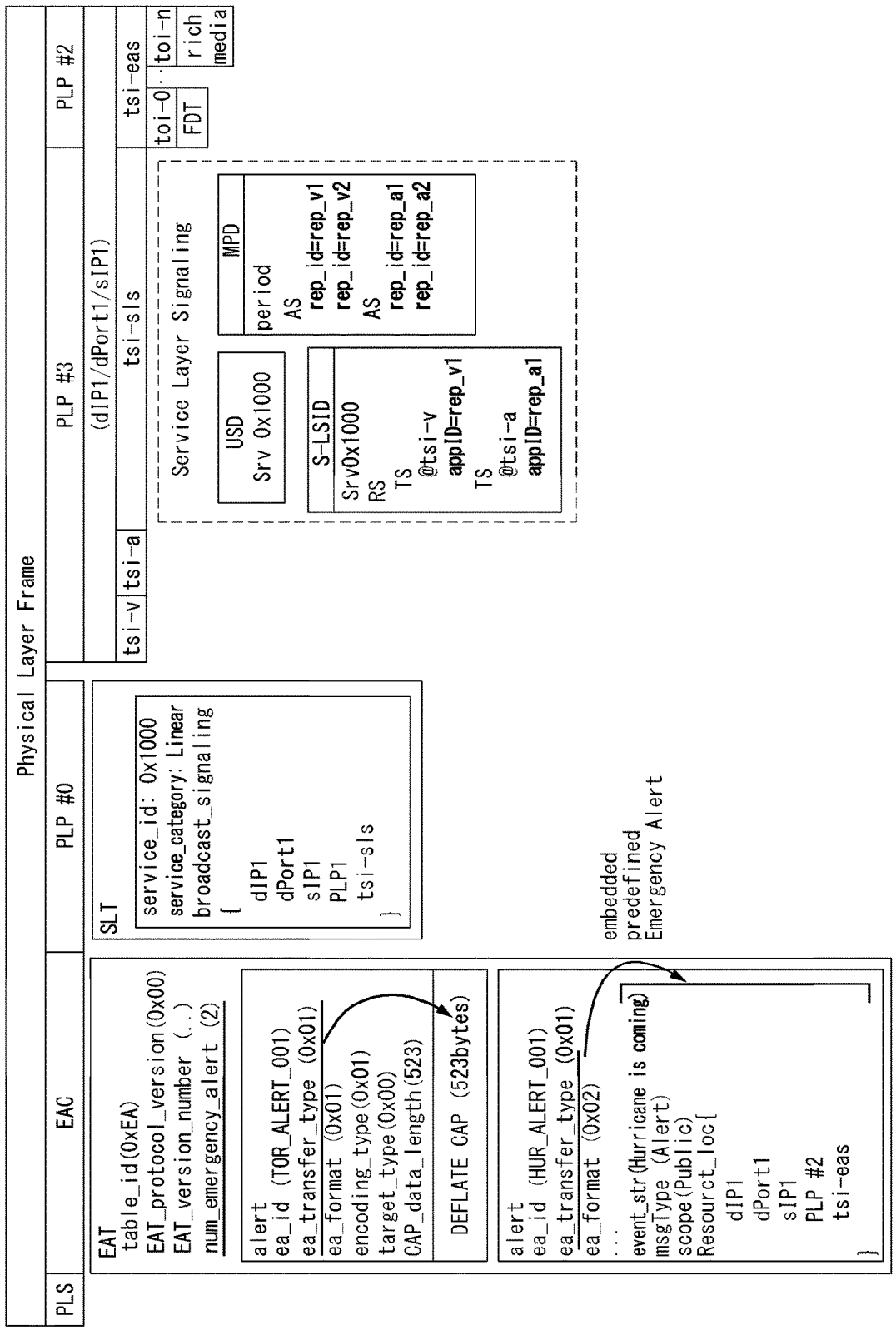

[Figure 28]
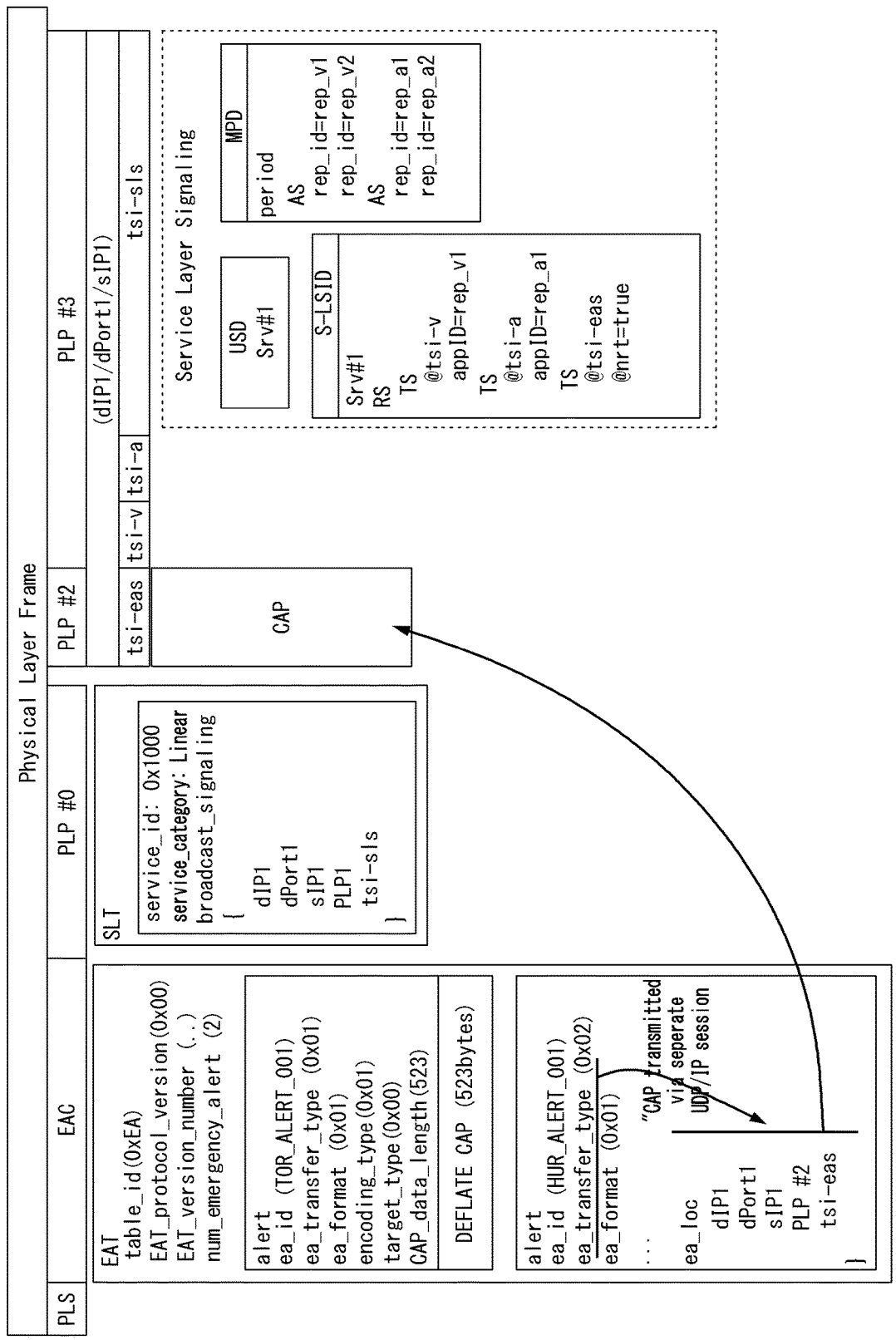

【Figure 29】

| Syntax | No. Bits | Format |
|---|---|---|
| Emergency_Alert_Table() { | | |
|     table_id | 8 | TBD |
|     table_id_extension{ | | |
|         reserved | 8 | |
|         EAT_protocol_version | 8 | uimsbf |
|     } | | |
|     section_length | 16 | uimsbf |
|     EAT_version_number | 8 | uimsbf |
|     current_section_number | 8 | uimsbf |
|     last_section_number | 8 | uimsbf |
|     num_emergency_alert | 8 | uimsbf |
|     for (m=0; m< num_emergency_alert; m++) { | | |
|         ea_id | 8 | uimsbf |
|         EAS_NRT_service_id | 16 | uimsbf |
|         reserved | 2 | '1111' |
|         ea_transfer_type | 3 | uimsbf |
|         ea_format | 3 | uimsbf |
|         if(ea_transfer_type == 0x01){ | | |
|             if(ea_format == 0x01){ | | |
|                 encoding_type | 2 | |
|                 target_type | 2 | |
|                 CAP_data_length | 12 | |
|                 CAP_data_bytes() | var | |
|             } | | |
|             else if(ea_format == 0x02){ | | |
|                 Emergency_Alert() | Var | |
|             } | | |
|     }else if(ea_transfer_type == 0x02){ | | |
|         broadcast_stream_id | 16 | uimsbf |
|         PLP_ID | 8 | uimsbf |
|         sourceIPaddress | 32 | uimsbf |
|         destinationIPaddress | 32 | uimsbf |
|         destinationPort | 16 | uimsbf |
|         tsi | 16 | uimsbf |
|     }else if(ea_transfer_type == 0x03){ | | |
|         ea_url_length /* m */ | 8 | uimsbf |
|         ea_url | Var | |
|     } | | |
|     } | | |
| } | | |

[Figure 30]

| Syntax | No. Bits | Format |
|---|---|---|
| Emergency_NRT_Information_Table() { | | |
|     table_id | 8 | TBD |
|     table_id_extension{ | | |
|         reserved | 8 | |
|         ENRT_IT_protocol_version | 8 | uimsbf |
|     } | | |
|     section_length | 16 | uimsbf |
|     ENRT_IT_version_number | 8 | uimsbf |
|     current_section_number | 8 | uimsbf |
|     last_section_number | 8 | uimsbf |
|     service_id | 16 | |
|     num_rich_media_contents | 8 | uimsbf |
|     for (m=0; m< num_rich_media_contents; m++) { | | |
|         content_linkage | 32 | uimsbf |
|         expiration | 32 | '1111' |
|         size | 32 | uimsbf |
|         time_slot_info | var | |
|         content_description_length /* m */ | 8 | uimsbf |
|         content_description | m | |
|         name_length /*m*/ | 8 | uimsbf |
|         name | m | |
|         reserved | 7 | '1111111' |
|         availableOnInet | 1 | bslbf |
|         if(availableOnInet == true){ | | |
|             content_url_length /* m */ | 8 | uimsbf |
|             content_url | Var | |
|         } | | |
|     } | | |
| } | | |

[Figure 31]
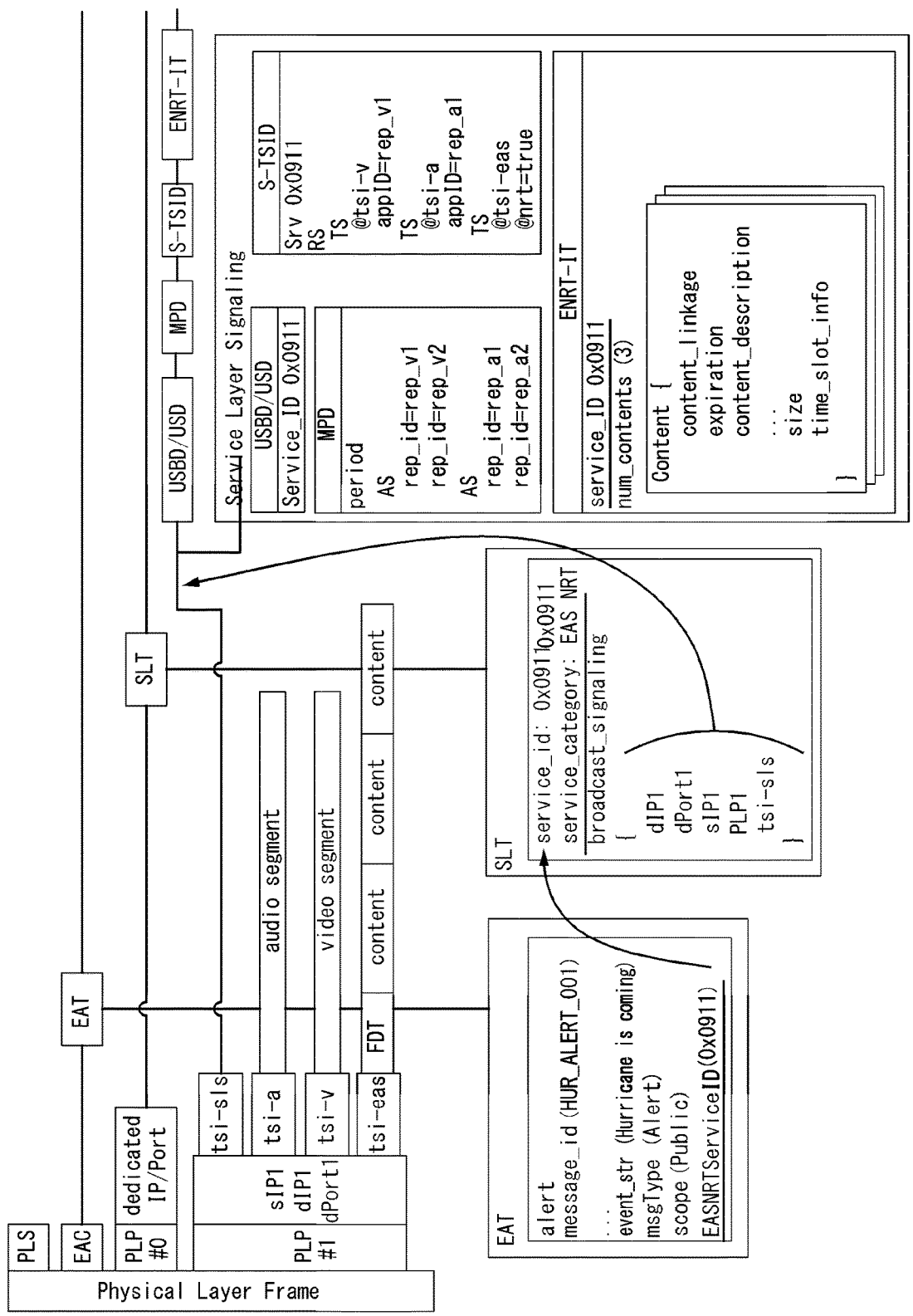

【Figure 32】
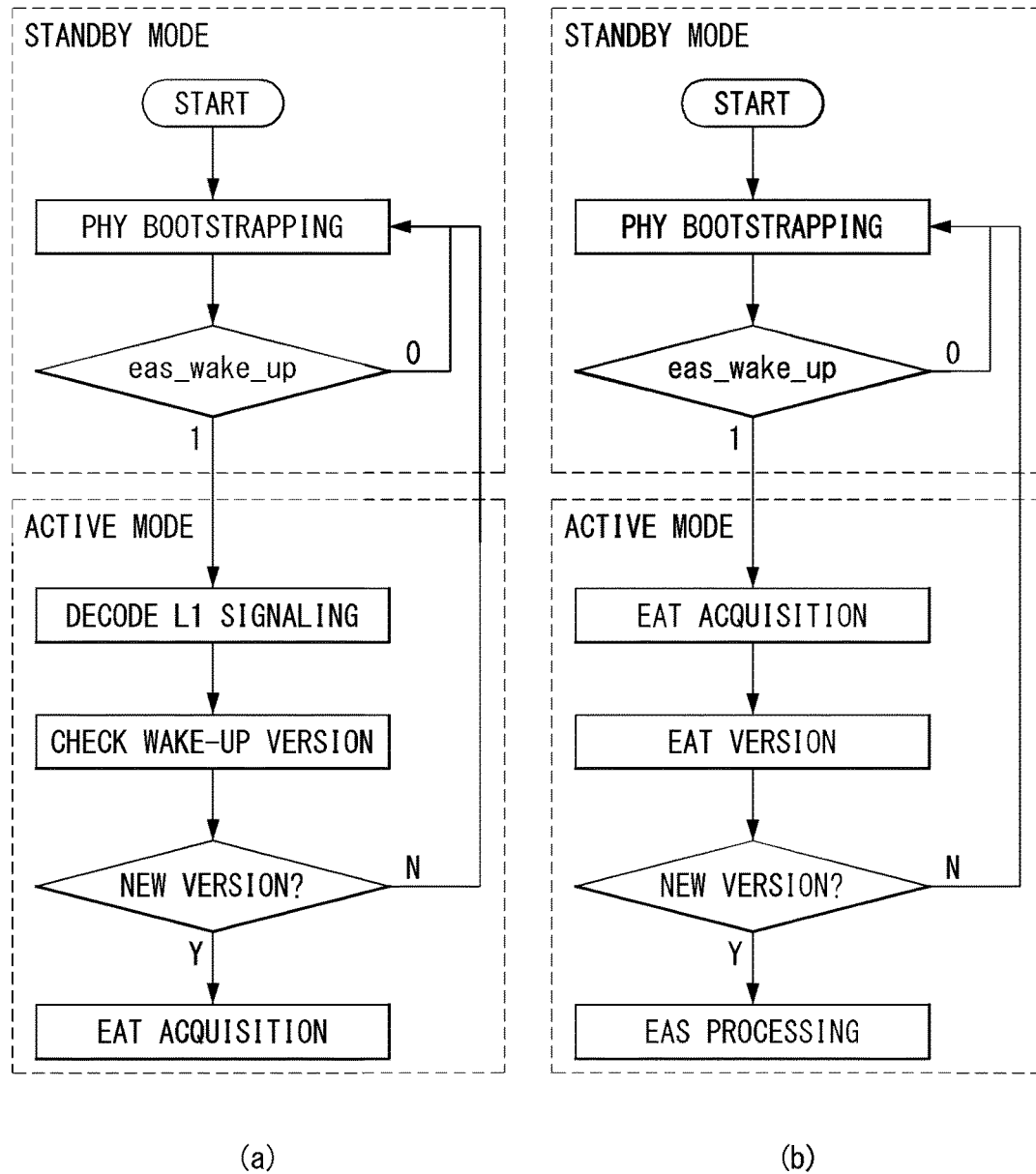

[Figure 33]
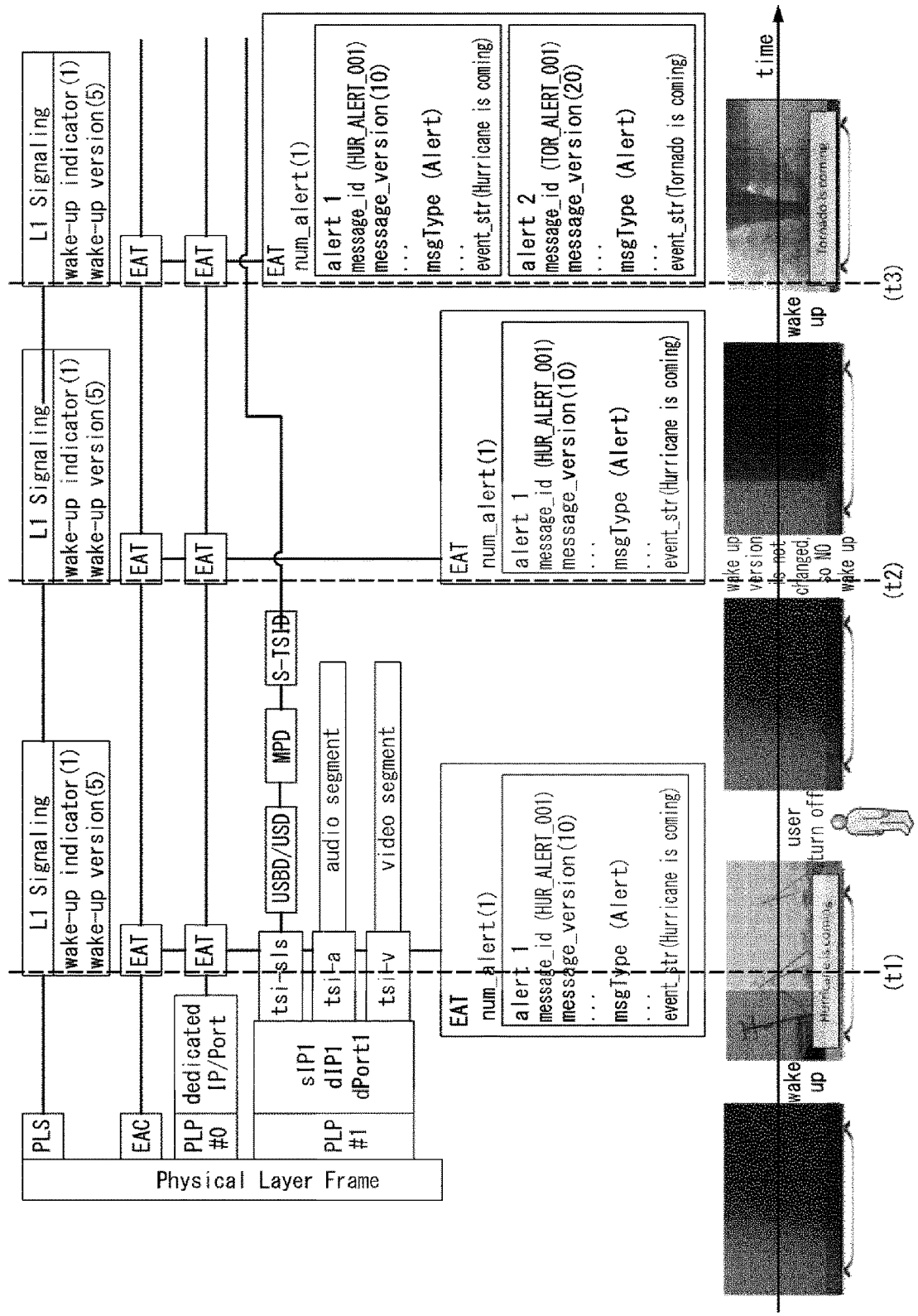

[Figure 34]
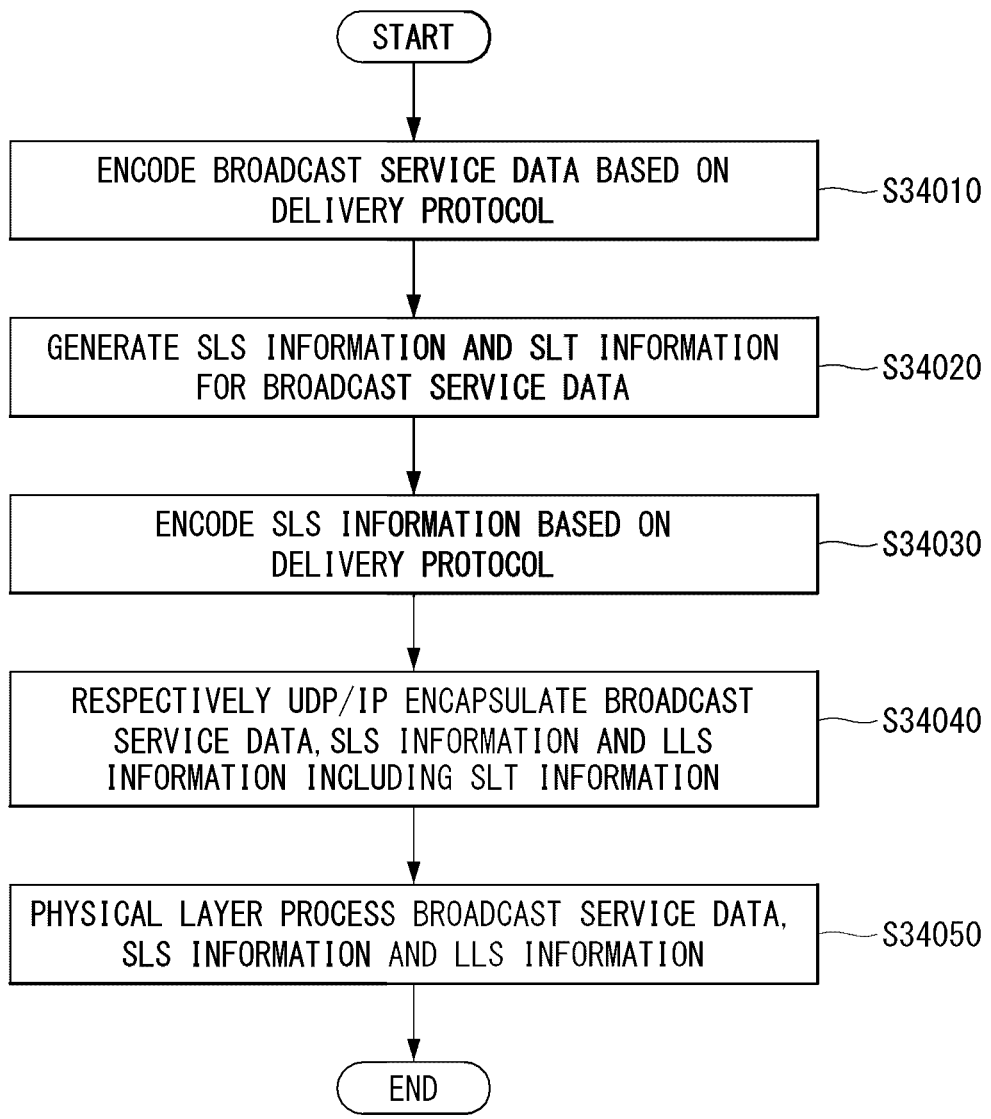

【Figure 35】
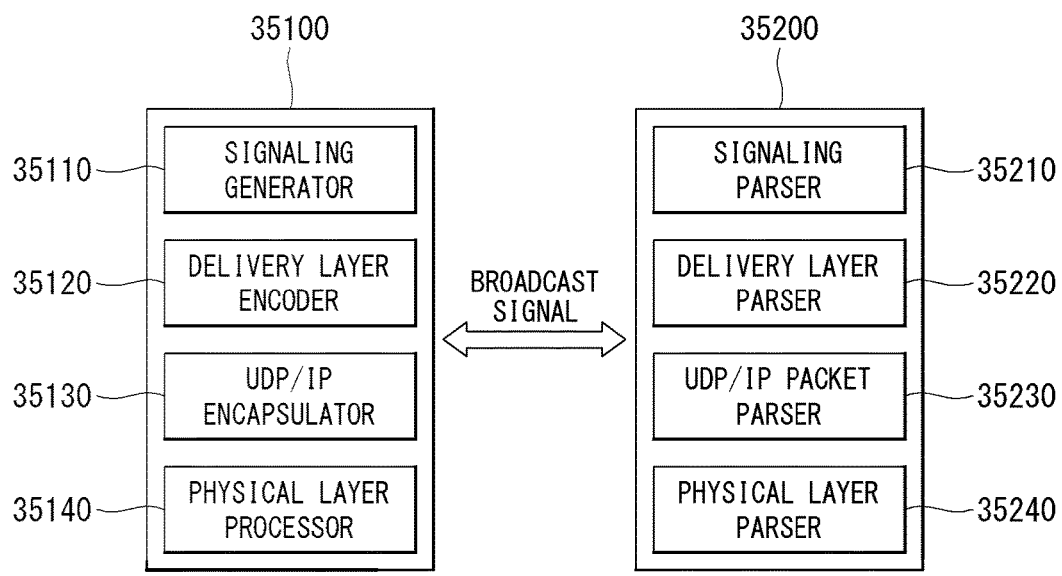

APPARATUS AND METHOD FOR TRANSMITTING OR RECEIVING BROADCAST SIGNAL

CROSS REFERENCE TO RELATED APPLICATIONS

This application is the National Phase of PCT International Application No. PCT/KR2016/005143, filed on May 16, 2016, which claims priority under 35 U.S.C. 119(e) to U.S. Provisional Application No. 62/162,802, filed on May 17, 2015, U.S. Provisional Application No. 62/163,351, filed on May 18, 2015, U.S. Provisional Application No. 62/171,254, filed on Jun. 5, 2015 and U.S. Provisional Application No. 62/172,210, filed on Jun. 7, 2015, all of which are hereby expressly incorporated by reference into the present application.

TECHNICAL FIELD

The present invention relates to an apparatus for transmitting a broadcast signal, an apparatus for receiving a broadcast signal, a method for transmitting a broadcast signal and a method for receiving a broadcast signal.

BACKGROUND ART

As analog broadcast signal transmission comes to an end, various technologies for transmitting/receiving digital broadcast signals have been developed. A digital broadcast signal may include a larger amount of video/audio data than an analog broadcast signal and may further include various types of additional data in addition to the video/audio data.

DISCLOSURE

Technical Problem

A digital broadcast system may provide HD (high definition) images, multi-channel audio and various additional services. However, data transmission efficiency for transmission of large amounts of data, robustness of transmission/reception networks and network flexibility in consideration of mobile reception equipment need to be improved for digital broadcast.

Technical Solution

The present invention proposes a method for transmitting a broadcast signal and an apparatus for transmitting a broadcast signal.

A method for transmitting a broadcast signal according to an embodiment of the present invention may include encoding a broadcast service data based on a delivery protocol; generating SLS information and SLT information with respect to the broadcast service data, wherein the SLS information provides a discovery and an acquisition of the broadcast service data, and wherein the SLT information provides a discovery and a basic service list building of the SLS information; encoding the SLS information based on the delivery protocol; performing respective UDP (User Datagram Protocol)/IP (Internet Protocol) encapsulations of Low level Signaling (LLS) information including the broadcast service data, the SLS information and the SLT information; and generating a signal frame by performing physical layer processing of the broadcast service data, the SLS information and the SLT information, and the delivery protocol may include at least one of Real-Time Object Delivery over Unidirectional Transport (ROUTE) protocol or MPEG Media Transport (MMT) protocol.

In addition, in an embodiment of the present invention, the LLS information may be carried as a payload of an IP packet that has a predetermined address and port number. In addition, the LLS information may include Emergency Alert (EA) related signaling information.

In addition, in an embodiment of the present invention, the EA related signaling information may correspond to a Common Alerting Protocol (CAP) message.

In addition, in an embodiment of the present invention, the EA related signaling information may include signaling information for a rich media content transmission, and when the rich media content is delivered through broadband, the EA related signaling information may indicate Uniform Resource Locator (URL) information for receiving the rich media content, and when the rich media content is delivered through broadcast, the EA related signaling information may indicate LCT channel information in which the rich media content is delivered.

In addition, in an embodiment of the present invention, the SLT information may include service category information, and a service category indicated by the service category information may include a linear A/V service, a linear audio only service, an application-based service and an EA service, and when the rich media content for EA is delivered to the EA service, the EA related signaling information may include service ID information that delivers the rich media content.

In addition, in an embodiment of the present invention, when the signal frame includes the EA related signaling information, physical layer signaling information of the signal frame may indicate wake-up from a standby mode of a receiver, and includes wake-up signal indicating a wake-up version.

A broadcast signal transmitter according to an embodiment of the present invention that performs the method for transmitting a broadcast signal may include a signaling generator configured to generate Service Layer Signaling (SLS) information and a basic service list building providing a discovery and an acquisition of a broadcast service data and Service List Table (SLT) information providing an acquisition of the SLS information; a delivery layer encoder configured to encode the broadcast service data and the SLS information based on at least one delivery protocol of Real-Time Object Delivery over Unidirectional Transport (ROUTE) protocol or MPEG Media Transport (MMT) protocol; a UDP/IP encapsulator configured to perform respective UDP (User Datagram Protocol)/IP (Internet Protocol) encapsulations of Low level Signaling (LLS) information including the broadcast service data, the SLS information and the SLT information; and a physical layer processor configured to generate a signal frame by performing physical layer processing of the broadcast service data, the SLS information and the SLT information.

Technical Effects

The present invention may process data according to service characteristics to control Quality of Services (QoS) for each service or service component, thereby providing various broadcast services.

The present invention may achieve transmission flexibility by transmitting various broadcast services through the same radio frequency (RF) signal bandwidth.

The present invention may provide a method and apparatus for transmitting/receiving a broadcast signal capable of receiving digital broadcast signals without an error even in the case of using a mobile reception device or in an indoor environment.

The present invention may support a next generation broadcast service efficiently in the environment that supports the hybrid broadcast that uses a terrestrial broadcast network and an Internet network.

Hereinafter, the additional effects of the present invention may be described together with the construction of the invention.

DESCRIPTION OF DRAWINGS

FIG. 1 is a diagram showing a protocol stack according to an embodiment of the present invention.

FIG. 2 is a diagram showing a service discovery procedure according to one embodiment of the present invention.

FIG. 3 is a diagram showing a low level signaling (LLS) table and a service list table (SLT) according to one embodiment of the present invention.

FIG. 4 is a diagram showing a USBD and an S-TSID delivered through ROUTE according to one embodiment of the present invention.

FIG. 5 is a diagram showing a USBD delivered through MMT according to one embodiment of the present invention.

FIG. 6 is a diagram showing link layer operation according to one embodiment of the present invention.

FIG. 7 is a diagram showing a link mapping table (LMT) according to one embodiment of the present invention.

FIG. 8 illustrates a configuration of a broadcast signal transmission apparatus for future broadcast services according to an embodiment of the present invention.

FIG. 9 illustrates a write operation of a time interleaver according to an embodiment of the present invention.

FIG. 10 illustrates an interlaving address generator including a main pseudo-random binary sequence (PRBS) generator and a sub-PRBS generator according to each FFT mode which are included in a frequency interleavaer according to an embodiment of the present invention.

FIG. 11 illustrates a service delivery and signaling structure according to an embodiment of the present invention.

FIG. 12 illustrates logical entity and relationship of a service management, delivery and physical layers according to an embodiment of the present invention.

FIG. 13 illustrates a method for using a service signaling for bootstrapping and service discovery according to an embodiment of the present invention.

FIG. 14 illustrates SLT information according to an embodiment of the present invention.

FIG. 15 illustrates an XML format of the SLT according to an embodiment of the present invention.

FIG. 16 illustrates an XML format of InetSigLocation information according to an embodiment of the present invention.

FIG. 17 illustrates a service layer signaling data model according to an embodiment of the present invention.

FIG. 18 illustrates a USBD according to an embodiment of the present invention.

FIG. 19 illustrates an S-TSID according to an embodiment of the present invention.

FIG. 20 illustrates a hierarchical signaling structure according to an embodiment of the present invention.

FIG. 21 illustrates a method for transmitting EA information using UDP/IP according to an embodiment of the present invention.

FIG. 22 illustrates a method for transmitting EA information using UDP/IP according to an embodiment of the present invention.

FIG. 23 illustrates an EA message according to an embodiment of the present invention.

FIG. 24 illustrates a resource location transmitted to support the enhanced alert according to an embodiment of the present invention.

FIG. 25 illustrates a syntax representing a location of a resource for an enhanced alert transmission according to an embodiment of the present invention.

FIG. 26 illustrates EA information according to another embodiment of the present invention.

FIG. 27 illustrates an embodiment of signaling an embedded EA in an EA message.

FIG. 28 illustrates an embodiment of signaling an EA with a separate session in an EA message.

FIG. 29 illustrates syntax of the EA information according to another embodiment of the present invention.

FIG. 30 illustrates an ENRT-IT (EA related NRT information table) for rich media contents signaling according to an embodiment of the present invention.

FIG. 31 illustrates a signaling structure of rich media contents according to an embodiment of the present invention.

FIG. 32 is a diagram illustrating a method for waking up a broadcast receiver or processing an EA message according to an embodiment of the present invention.

FIG. 33 illustrates an operation of a broadcast receiver according to wake-up information.

FIG. 34 illustrates a method for transmitting a broadcast signal according to an embodiment of the present invention.

FIG. 35 illustrates a broadcast signal transmitter and a broadcast signal receiver according to an embodiment of the present invention.

BEST MODE FOR INVENTION

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although most terms used in the present invention have been selected from general ones widely used in the art, some terms have been arbitrarily selected by the applicant and their meanings are explained in detail in the following description as needed. Thus, the present invention should be understood based upon the intended meanings of the terms rather than their simple names or meanings. Also, the term block and module are used similarly to indicate logical/functional unit of particular signal/data processing.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc. The present invention may process broadcast signals for the future broadcast services through non-MIMO or MIMO according to one embodiment. A non-MIMO scheme according to an embodiment of the present invention may include a multiple input single output (MISO) scheme, a single input single output (SISO) scheme, etc. The present invention proposes a physical profile (or system) optimized to minimize receiver complexity while attaining the performance required for a particular use case.

FIG. 1 is a diagram showing a protocol stack according to an embodiment of the present invention.

A service may be delivered to a receiver through a plurality of layers. First, a transmission side may generate service data. The service data may be processed for transmission at a delivery layer of the transmission side and the service data may be encoded into a broadcast signal and transmitted over a broadcast or broadband network at a physical layer.

Here, the service data may be generated in an ISO base media file format (BMFF). ISO BMFF media files may be used for broadcast/broadband network delivery, media encapsulation and/or synchronization format. Here, the service data is all data related to the service and may include service components configuring a linear service, signaling information thereof, non real time (NRT) data and other files.

The delivery layer will be described. The delivery layer may provide a function for transmitting service data. The service data may be delivered over a broadcast and/or broadband network.

Broadcast service delivery may include two methods.

As a first method, service data may be processed in media processing units (MPUs) based on MPEG media transport (MMT) and transmitted using an MMT protocol (MMTP). In this case, the service data delivered using the MMTP may include service components for a linear service and/or service signaling information thereof.

As a second method, service data may be processed into DASH segments and transmitted using real time object delivery over unidirectional transport (ROUTE), based on MPEG DASH. In this case, the service data delivered through the ROUTE protocol may include service components for a linear service, service signaling information thereof and/or NRT data. That is, the NRT data and non-timed data such as files may be delivered through ROUTE.

Data processed according to MMTP or ROUTE protocol may be processed into IP packets through a UDP/IP layer. In service data delivery over the broadcast network, a service list table (SLT) may also be delivered over the broadcast network through a UDP/IP layer. The SLT may be delivered in a low level signaling (LLS) table. The SLT and LLS table will be described later.

IP packets may be processed into link layer packets in a link layer. The link layer may encapsulate various formats of data delivered from a higher layer into link layer packets and then deliver the packets to a physical layer. The link layer will be described later.

In hybrid service delivery, at least one service element may be delivered through a broadband path. In hybrid service delivery, data delivered over broadband may include service components of a DASH format, service signaling information thereof and/or NRT data. This data may be processed through HTTP/TCP/IP and delivered to a physical layer for broadband transmission through a link layer for broadband transmission.

The physical layer may process the data received from the delivery layer (higher layer and/or link layer) and transmit the data over the broadcast or broadband network. A detailed description of the physical layer will be given later.

The service will be described. The service may be a collection of service components displayed to a user, the components may be of various media types, the service may be continuous or intermittent, the service may be real time or non real time, and a real-time service may include a sequence of TV programs.

The service may have various types. First, the service may be a linear audio/video or audio service having app based enhancement. Second, the service may be an app based service, reproduction/configuration of which is controlled by a downloaded application. Third, the service may be an ESG service for providing an electronic service guide (ESG). Fourth, the service may be an emergency alert (EA) service for providing emergency alert information.

When a linear service without app based enhancement is delivered over the broadcast network, the service component may be delivered by (1) one or more ROUTE sessions or (2) one or more MMTP sessions.

When a linear service having app based enhancement is delivered over the broadcast network, the service component may be delivered by (1) one or more ROUTE sessions or (2) zero or more MMTP sessions. In this case, data used for app based enhancement may be delivered through a ROUTE session in the form of NRT data or other files. In one embodiment of the present invention, simultaneous delivery of linear service components (streaming media components) of one service using two protocols may not be allowed.

When an app based service is delivered over the broadcast network, the service component may be delivered by one or more ROUTE sessions. In this case, the service data used for the app based service may be delivered through the ROUTE session in the form of NRT data or other files.

Some service components of such a service, some NRT data, files, etc. may be delivered through broadband (hybrid service delivery).

That is, in one embodiment of the present invention, linear service components of one service may be delivered through the MMT protocol. In another embodiment of the present invention, the linear service components of one service may be delivered through the ROUTE protocol. In another embodiment of the present invention, the linear service components of one service and NRT data (NRT service components) may be delivered through the ROUTE protocol. In another embodiment of the present invention, the linear service components of one service may be delivered through the MMT protocol and the NRT data (NRT service components) may be delivered through the ROUTE protocol. In the above-described embodiments, some service components of the service or some NRT data may be delivered through broadband. Here, the app based service and data regarding app based enhancement may be delivered over the broadcast network according to ROUTE or through broadband in the form of NRT data. NRT data may be referred to as locally cached data.

Each ROUTE session includes one or more LCT sessions for wholly or partially delivering content components configuring the service. In streaming service delivery, the LCT session may deliver individual components of a user service, such as audio, video or closed caption stream. The streaming media is formatted into a DASH segment.

Each MMTP session includes one or more MMTP packet flows for delivering all or some of content components or an MMT signaling message. The MMTP packet flow may deliver a component formatted into MPU or an MMT signaling message.

For delivery of an NRT user service or system metadata, the LCT session delivers a file based content item. Such content files may include consecutive (timed) or discrete (non-timed) media components of the NRT service or metadata such as service signaling or ESG fragments. System metadata such as service signaling or ESG fragments may be delivered through the signaling message mode of the MMTP.

A receiver may detect a broadcast signal while a tuner tunes to frequencies. The receiver may extract and send an SLT to a processing module. The SLT parser may parse the SLT and acquire and store data in a channel map. The receiver may acquire and deliver bootstrap information of the SLT to a ROUTE or MMT client. The receiver may acquire and store an SLS. USBD may be acquired and parsed by a signaling parser.

FIG. 2 is a diagram showing a service discovery procedure according to one embodiment of the present invention.

A broadcast stream delivered by a broadcast signal frame of a physical layer may carry low level signaling (LLS). LLS data may be carried through payload of IP packets delivered to a well-known IP address/port. This LLS may include an SLT according to type thereof. The LLS data may be formatted in the form of an LLS table. A first byte of every UDP/IP packet carrying the LLS data may be the start of the LLS table. Unlike the shown embodiment, an IP stream for delivering the LLS data may be delivered to a PLP along with other service data.

The SLT may enable the receiver to generate a service list through fast channel scan and provides access information for locating the SLS. The SLT includes bootstrap information. This bootstrap information may enable the receiver to acquire service layer signaling (SLS) of each service. When the SLS, that is, service signaling information, is delivered through ROUTE, the bootstrap information may include an LCT channel carrying the SLS, a destination IP address of a ROUTE session including the LCT channel and destination port information. When the SLS is delivered through the MMT, the bootstrap information may include a destination IP address of an MMTP session carrying the SLS and destination port information.

In the shown embodiment, the SLS of service #1 described in the SLT is delivered through ROUTE and the SLT may include bootstrap information sIP1, dIP1 and dPort1 of the ROUTE session including the LCT channel delivered by the SLS. The SLS of service #2 described in the SLT is delivered through MMT and the SLT may include bootstrap information sIP2, dIP2 and dPort2 of the MMTP session including the MMTP packet flow delivered by the SLS.

The SLS is signaling information describing the properties of the service and may include receiver capability information for significantly reproducing the service or providing information for acquiring the service and the service component of the service. When each service has separate service signaling, the receiver acquires appropriate SLS for a desired service without parsing all SLSs delivered within a broadcast stream.

When the SLS is delivered through the ROUTE protocol, the SLS may be delivered through a dedicated LCT channel of a ROUTE session indicated by the SLT. In some embodiments, this LCT channel may be an LCT channel identified by tsi=0. In this case, the SLS may include a user service bundle description (USBD)/user service description (USD), service-based transport session instance description (S-TSID) and/or media presentation description (MPD).

Here, USBD/USD is one of SLS fragments and may serve as a signaling hub describing detailed description information of a service. The USBD may include service identification information, device capability information, etc. The USBD may include reference information (URI reference) of other SLS fragments (S-TSID, MPD, etc.). That is, the USBD/USD may reference the S-TSID and the MPD. In addition, the USBD may further include metadata information for enabling the receiver to decide a transmission mode (broadcast/broadband network). A detailed description of the USBD/USD will be given below.

The S-TSID is one of SLS fragments and may provide overall session description information of a transport session carrying the service component of the service. The S-TSID may provide the ROUTE session through which the service component of the service is delivered and/or transport session description information for the LCT channel of the ROUTE session. The S-TSID may provide component acquisition information of service components associated with one service. The S-TSID may provide mapping between DASH representation of the MPD and the tsi of the service component. The component acquisition information of the S-TSID may be provided in the form of the identifier of the associated DASH representation and tsi and may or may not include a PLP ID in some embodiments. Through the component acquisition information, the receiver may collect audio/video components of one service and perform buffering and decoding of DASH media segments. The S-TSID may be referenced by the USBD as described above. A detailed description of the S-TSID will be given below.

The MPD is one of SLS fragments and may provide a description of DASH media presentation of the service. The MPD may provide a resource identifier of media segments and provide context information within the media presentation of the identified resources. The MPD may describe DASH representation (service component) delivered over the broadcast network and describe additional DASH presentation delivered over broadband (hybrid delivery). The MPD may be referenced by the USBD as described above.

When the SLS is delivered through the MMT protocol, the SLS may be delivered through a dedicated MMTP packet flow of the MMTP session indicated by the SLT. In some embodiments, the packet_id of the MMTP packets delivering the SLS may have a value of 00. In this case, the SLS may include a USBD/USD and/or MMT packet (MP) table.

Here, the USBD is one of SLS fragments and may describe detailed description information of a service as in ROUTE. This USBD may include reference information (URI information) of other SLS fragments. The USBD of the MMT may reference an MP table of MMT signaling. In some embodiments, the USBD of the MMT may include reference information of the S-TSID and/or the MPD. Here, the S-TSID is for NRT data delivered through the ROUTE protocol. Even when a linear service component is delivered through the MMT protocol, NRT data may be delivered via the ROUTE protocol. The MPD is for a service component delivered over broadband in hybrid service delivery. The detailed description of the USBD of the MMT will be given below.

The MP table is a signaling message of the MMT for MPU components and may provide overall session description information of an MMTP session carrying the service component of the service. In addition, the MP table may include a description of an asset delivered through the MMTP session. The MP table is streaming signaling information for MPU components and may provide a list of assets corresponding to one service and location information (component acquisition information) of these components. The detailed description of the MP table may be defined in the MMT or modified. Here, the asset is a multimedia data entity, is combined by one unique ID, and may mean a data entity used to one multimedia presentation. The asset may correspond to service components configuring one service. A streaming service component (MPU) corresponding to a desired service may be accessed using the MP table. The MP table may be referenced by the USBD as described above.

The other MMT signaling messages may be defined. Additional information associated with the service and the MMTP session may be described by such MMT signaling messages.

The ROUTE session is identified by a source IP address, a destination IP address and a destination port number. The LCT session is identified by a unique transport session identifier (TSI) within the range of a parent ROUTE session. The MMTP session is identified by a destination IP address and a destination port number. The MMTP packet flow is identified by a unique packet_id within the range of a parent MMTP session.

In case of ROUTE, the S-TSID, the USBD/USD, the MPD or the LCT session delivering the same may be referred to as a service signaling channel. In case of MMTP, the USBD/UD, the MMT signaling message or the packet flow delivering the same may be referred to as a service signaling channel.

Unlike the shown embodiment, one ROUTE or MMTP session may be delivered over a plurality of PLPs. That is, one service may be delivered through one or more PLPs. Unlike the shown embodiment, in some embodiments, components configuring one service may be delivered through different ROUTE sessions. In addition, in some embodiments, components configuring one service may be delivered through different MMTP sessions. In some embodiments, components configuring one service may be divided and delivered in a ROUTE session and an MMTP session. Although not shown, components configuring one service may be delivered through broadband (hybrid delivery).

FIG. 3 is a diagram showing a low level signaling (LLS) table and a service list table (SLT) according to one embodiment of the present invention.

One embodiment t3010 of the LLS table may include information according to an LLS_table_id field, a provider_id field, an LLS_table_version field and/or an LLS_table_id field.

The LLS_table_id field may identify the type of the LLS table, and the provider_id field may identify a service provider associated with services signaled by the LLS table. Here, the service provider is a broadcaster using all or some of the broadcast streams and the provider_id field may identify one of a plurality of broadcasters which is using the broadcast streams. The LLS_table_version field may provide the version information of the LLS table.

According to the value of the LLS_table_id field, the LLS table may include one of the above-described SLT, a rating region table (RRT) including information on a content advisory rating, SystemTime information for providing information associated with a system time, a common alert protocol (CAP) message for providing information associated with emergency alert. In some embodiments, the other information may be included in the LLS table.

One embodiment t3020 of the shown SLT may include an @bsid attribute, an @sltCapabilities attribute, an sltInetUrl element and/or a Service element. Each field may be omitted according to the value of the shown Use column or a plurality of fields may be present.

The @bsid attribute may be the identifier of a broadcast stream. The @sltCapabilities attribute may provide capability information required to decode and significantly reproduce all services described in the SLT. The sltInetUrl element may provide base URL information used to obtain service signaling information and ESG for the services of the SLT over broadband. The sltInetUrl element may further include an @urlType attribute, which may indicate the type of data capable of being obtained through the URL.

The Service element may include information on services described in the SLT, and the Service element of each service may be present. The Service element may include an @serviceID attribute, an @sltSvcSeqNum attribute, an @protected attribute, an @majorChannelNo attribute, an @minorChannelNo attribute, an @serviceCategory attribute, an @shortServiceName attribute, an @hidden attribute, an @broadbandAccessRequired attribute, an @svcCapabilities attribute, a BroadcastSvcSignaling element and/or an svcInetUrl element.

The @serviceID attribute is the identifier of the service and the @sltSvcSeqNum attribute may indicate the sequence number of the SLT information of the service. The @protected attribute may indicate whether at least one service component necessary for significant reproduction of the service is protected. The @majorChannelNo attribute and the @minorChannelNo attribute may indicate the major channel number and minor channel number of the service, respectively.

The @serviceCategory attribute may indicate the category of the service. The category of the service may include a linear A/V service, a linear audio service, an app based service, an ESG service, an EAS service, etc. The @shortServiceName attribute may provide the short name of the service. The @hidden attribute may indicate whether the service is for testing or proprietary use. The @broadbandAccessRequired attribute may indicate whether broadband access is necessary for significant reproduction of the service. The @svcCapabilities attribute may provide capability information necessary for decoding and significant reproduction of the service.

The BroadcastSvcSignaling element may provide information associated with broadcast signaling of the service. This element may provide information such as location, protocol and address with respect to signaling over the broadcast network of the service. Details thereof will be described below.

The svcInetUrl element may provide URL information for accessing the signaling information of the service over broadband. The sltInetUrl element may further include an @urlType attribute, which may indicate the type of data capable of being obtained through the URL.

The above-described BroadcastSvcSignaling element may include an @slsProtocol attribute, an @slsMajorProtocolVersion attribute, an @slsMinorProtocolVersion attribute, an @slsPlpId attribute, an @slsDestinationIpAddress attribute, an @slsDestinationUdpPort attribute and/or an @slsSourceIpAddress attribute.

The @slsProtocol attribute may indicate the protocol used to deliver the SLS of the service (ROUTE, MMT, etc.). The @slsMajorProtocolVersion attribute and the @slsMinorProtocolVersion attribute may indicate the major version number and minor version number of the protocol used to deliver the SLS of the service, respectively.

The @slsPlpId attribute may provide a PLP identifier for identifying the PLP delivering the SLS of the service. In some embodiments, this field may be omitted and the PLP information delivered by the SLS may be checked using a combination of the information of the below-described LMT and the bootstrap information of the SLT.

The @slsDestinationIpAddress attribute, the @slsDestinationUdpPort attribute and the @slsSourceIpAddress attribute may indicate the destination IP address, destination UDP port and source IP address of the transport packets delivering the SLS of the service, respectively. These may identify the transport session (ROUTE session or MMTP session) delivered by the SLS. These may be included in the bootstrap information.

FIG. 4 is a diagram showing a USBD and an S-TSID delivered through ROUTE according to one embodiment of the present invention.

One embodiment t4010 of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, an @serviceStatus attribute, an @fullMPDUri attribute, an @sTSIDUri attribute, a name element, a serviceLanguage element, a capabilityCode element and/or a deliveryMethod element. Each field may be omitted according to the value of the shown Use column or a plurality of fields may be present.

The @globalServiceID attribute is the globally unique identifier of the service and may be used for link with ESG data (Service@globalServiceID). The @serviceId attribute is a reference corresponding to the service entry of the SLT and may be equal to the service ID information of the SLT. The @serviceStatus attribute may indicate the status of the service. This field may indicate whether the service is active or inactive.

The @fullMPDUri attribute may reference the MPD fragment of the service. The MPD may provide a reproduction description of a service component delivered over the broadcast or broadband network as described above. The @sTSIDUri attribute may reference the S-TSID fragment of the service. The S-TSID may provide parameters associated with access to the transport session carrying the service as described above.

The name element may provide the name of the service. This element may further include an @lang attribute and this field may indicate the language of the name provided by the name element. The serviceLanguage element may indicate available languages of the service. That is, this element may arrange the languages capable of being provided by the service.

The capabilityCode element may indicate capability or capability group information of a receiver necessary to significantly reproduce the service. This information is compatible with capability information format provided in service announcement.

The deliveryMethod element may provide transmission related information with respect to content accessed over the broadcast or broadband network of the service. The deliveryMethod element may include a broadcastAppService element and/or a unicastAppService element. Each of these elements may have a basePattern element as a sub element.

The broadcastAppService element may include transmission associated information of the DASH representation delivered over the broadcast network. The DASH representation may include media components over all periods of the service presentation.

The basePattern element of this element may indicate a character pattern used for the receiver to perform matching with the segment URL. This may be used for a DASH client to request the segments of the representation. Matching may imply delivery of the media segment over the broadcast network.

The unicastAppService element may include transmission related information of the DASH representation delivered over broadband. The DASH representation may include media components over all periods of the service media presentation.

The basePattern element of this element may indicate a character pattern used for the receiver to perform matching with the segment URL. This may be used for a DASH client to request the segments of the representation. Matching may imply delivery of the media segment over broadband.

One embodiment t4020 of the shown S-TSID may have an S-TSID root element. The S-TSID root element may include an @serviceId attribute and/or an RS element. Each field may be omitted according to the value of the shown Use column or a plurality of fields may be present.

The @serviceId attribute is the identifier of the service and may reference the service of the USBD/USD. The RS element may describe information on ROUTE sessions through which the service components of the service are delivered. According to the number of ROUTE sessions, a plurality of elements may be present. The RS element may further include an @bsid attribute, an @sIpAddr attribute, an @dIpAddr attribute, an @dport attribute, an @PLPID attribute and/or an LS element.

The @bsid attribute may be the identifier of a broadcast stream in which the service components of the service are delivered. If this field is omitted, a default broadcast stream may be a broadcast stream including the PLP delivering the SLS of the service. The value of this field may be equal to that of the @bsid attribute.

The @sIpAddr attribute, the @dIpAddr attribute and the @dport attribute may indicate the source IP address, destination IP address and destination UDP port of the ROUTE session, respectively. When these fields are omitted, the default values may be the source address, destination IP address and destination UDP port values of the current ROUTE session delivering the SLS, that is, the S-TSID. This field may not be omitted in another ROUTE session delivering the service components of the service, not in the current ROUTE session.

The @PLPID attribute may indicate the PLP ID information of the ROUTE session. If this field is omitted, the default value may be the PLP ID value of the current PLP delivered by the S-TSID. In some embodiments, this field is omitted and the PLP ID information of the ROUTE session may be checked using a combination of the information of the below-described LMT and the IP address/UDP port information of the RS element.

The LS element may describe information on LCT channels through which the service components of the service are transmitted. According to the number of LCT channel, a plurality of elements may be present. The LS element may include an @tsi attribute, an @PLPID attribute, an @bw attribute, an @startTime attribute, an @endTime attribute, a SrcFlow element and/or a RepairFlow element.

The @tsi attribute may indicate the tsi information of the LCT channel. Using this, the LCT channels through which the service components of the service are delivered may be identified. The @PLPID attribute may indicate the PLP ID information of the LCT channel. In some embodiments, this field may be omitted. The @bw attribute may indicate the maximum bandwidth of the LCT channel. The @startTime attribute may indicate the start time of the LCT session and the @endTime attribute may indicate the end time of the LCT channel.

The SrcFlow element may describe the source flow of ROUTE. The source protocol of ROUTE is used to transmit a delivery object and at least one source flow may be established within one ROUTE session. The source flow may deliver associated objects as an object flow.

The RepairFlow element may describe the repair flow of ROUTE. Delivery objects delivered according to the source protocol may be protected according to forward error correction (FEC) and the repair protocol may define an FEC framework enabling FEC protection.

FIG. 5 is a diagram showing a USBD delivered through MMT according to one embodiment of the present invention.

One embodiment of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, a Name element, a serviceLanguage element, a contentAdvisoryRating element, a Channel element, a mpuComponent element, a routeComponent element, a broadbandComponent element and/or a ComponentInfo element. Each field may be omitted according to the value of the shown Use column or a plurality of fields may be present.

The @globalServiceID attribute, the @serviceId attribute, the Name element and/or the serviceLanguage element may be equal to the fields of the USBD delivered through ROUTE. The contentAdvisoryRating element may indicate the content advisory rating of the service. This information is compatible with content advisory rating information format provided in service announcement. The Channel element may include information associated with the service. A detailed description of this element will be given below.

The mpuComponent element may provide a description of service components delivered as the MPU of the service. This element may further include an @mmtPackageId attribute and/or an @nextMmtPackageId attribute. The @mmtPackageId attribute may reference the MMT package of the service components delivered as the MPU of the service. The @nextMmtPackageId attribute may reference an MMT package to be used after the MMT package referenced by the @mmtPackageId attribute in terms of time. Through the information of this element, the MP table may be referenced.

The routeComponent element may include a description of the service components of the service. Even when linear service components are delivered through the MMT protocol, NRT data may be delivered according to the ROUTE protocol as described above. This element may describe information on such NRT data. A detailed description of this element will be given below.

The broadbandComponent element may include the description of the service components of the service delivered over broadband. In hybrid service delivery, some service components of one service or other files may be delivered over broadband. This element may describe information on such data. This element may further an @fullMPDUri attribute. This attribute may reference the MPD describing the service component delivered over broadband. In addition to hybrid service delivery, the broadcast signal may be weakened due to traveling in a tunnel and thus this element may be necessary to support handoff between broadband and broadband. When the broadcast signal is weak, the service component is acquired over broadband and, when the broadcast signal becomes strong, the service component is acquired over the broadcast network to secure service continuity.

The ComponentInfo element may include information on the service components of the service. According to the number of service components of the service, a plurality of elements may be present. This element may describe the type, role, name, identifier or protection of each service component. Detailed information of this element will be described below.

The above-described Channel element may further include an @serviceGenre attribute, an @serviceIcon attribute and/or a ServiceDescription element. The @serviceGenre attribute may indicate the genre of the service and the @serviceIcon attribute may include the URL information of the representative icon of the service. The ServiceDescription element may provide the service description of the service and this element may further include an @serviceDescrText attribute and/or an @serviceDescrLang attribute. These attributes may indicate the text of the service description and the language used in the text.

The above-described routeComponent element may further include an @sTSIDUri attribute, an @sTSIDDestinationIpAddress attribute, an @sTSIDDestinationUdpPort attribute, an @sTSIDSourceIpAddress attribute, an @sTSIDMajorProtocolVersion attribute and/or an @sTSIDMinorProtocolVersion attribute.

The @sTSIDUri attribute may reference an S-TSID fragment. This field may be equal to the field of the USBD delivered through ROUTE. This S-TSID may provide access related information of the service components delivered through ROUTE. This S-TSID may be present for NRT data delivered according to the ROUTE protocol in a state of delivering linear service component according to the MMT protocol.

The @sTSIDDestinationIpAddress attribute, the @sTSIDDestinationUdpPort attribute and the @sTSIDSourceIpAddress attribute may indicate the destination IP address, destination UDP port and source IP address of the transport packets carrying the above-described S-TSID. That is, these fields may identify the transport session (MMTP session or the ROUTE session) carrying the above-described S-TSID.

The @sTSIDMajorProtocolVersion attribute and the @sTSIDMinorProtocolVersion attribute may indicate the major version number and minor version number of the transport protocol used to deliver the above-described S-TSID, respectively.

The above-described ComponentInfo element may further include an @componentType attribute, an @componentRole attribute, an @componentProtectedFlag attribute, an @componentId attribute and/or an @componentName attribute.

The @componentType attribute may indicate the type of the component. For example, this attribute may indicate whether the component is an audio, video or closed caption component. The @componentRole attribute may indicate the role of the component. For example, this attribute may indicate main audio, music, commentary, etc. if the component is an audio component. This attribute may indicate primary video if the component is a video component. This attribute may indicate a normal caption or an easy reader type if the component is a closed caption component.

The @componentProtectedFlag attribute may indicate whether the service component is protected, for example, encrypted. The @componentId attribute may indicate the identifier of the service component. The value of this attribute may be the asset_id (asset ID) of the MP table corresponding to this service component. The @componentName attribute may indicate the name of the service component.

FIG. 6 is a diagram showing link layer operation according to one embodiment of the present invention.

The link layer may be a layer between a physical layer and a network layer. A transmission side may transmit data from the network layer to the physical layer and a reception side may transmit data from the physical layer to the network layer (t6010). The purpose of the link layer is to compress (abstract) all input packet types into one format for processing by the physical layer and to secure flexibility and expandability of an input packet type which is not defined yet. In addition, the link layer may provide option for compressing (abstracting) unnecessary information of the header of input packets to efficiently transmit input data. Operation such as overhead reduction, encapsulation, etc. of the link layer is referred to as a link layer protocol and packets generated using this protocol may be referred to as link layer packets. The link layer may perform functions such as packet encapsulation, overhead reduction and/or signaling transmission.

At the transmission side, the link layer (ALP) may perform an overhead reduction procedure with respect to input packets and then encapsulate the input packets into link layer packets. In addition, in some embodiments, the link layer may perform encapsulation into the link layer packets without performing the overhead reduction procedure. Due to use of the link layer protocol, data transmission overhead on the physical layer may be significantly reduced and the link layer protocol according to the present invention may provide IP overhead reduction and/or MPEG-2 TS overhead reduction.

When the shown IP packets are input as input packets (t6010), the link layer may sequentially perform IP header compression, adaptation and/or encapsulation. In some embodiments, some processes may be omitted. For example, the RoHC module may perform IP packet header compression to reduce unnecessary overhead. Context information may be extracted through the adaptation procedure and transmitted out of band. The IP header compression and adaption procedure may be collectively referred to as IP header compression. Thereafter, the IP packets may be encapsulated into link layer packets through the encapsulation procedure.

When MPEG 2 TS packets are input as input packets, the link layer may sequentially perform overhead reduction and/or an encapsulation procedure with respect to the TS packets. In some embodiments, some procedures may be omitted. In overhead reduction, the link layer may provide sync byte removal, null packet deletion and/or common header removal (compression). Through sync byte removal, overhead reduction of 1 byte may be provided per TS packet. Null packet deletion may be performed in a manner in which reinsertion is possible at the reception side. In addition, deletion (compression) may be performed in a manner in which common information between consecutive headers may be restored at the reception side. Some of the overhead reduction procedures may be omitted. Thereafter, through the encapsulation procedure, the TS packets may be encapsulated into link layer packets. The link layer packet structure for encapsulation of the TS packets may be different from that of the other types of packets.

First, IP header compression will be described.

The IP packets may have a fixed header format but some information necessary for a communication environment may be unnecessary for a broadcast environment. The link layer protocol may compress the header of the IP packet to provide a mechanism for reducing broadcast overhead.

IP header compression may employ a header compressor/decompressor and/or an adaptation module. The IP header compressor (RoHC compressor) may reduce the size of each IP packet header based on the RoHC scheme. Thereafter, the adaptation module may extract context information and generate signaling information from each packet stream. A receiver may parse signaling information associated with the packet stream and attach context information to the packet stream. The RoHC decompressor may restore the packet header to reconfigure an original IP packet. Hereinafter, IP header compression may mean only IP header compression by a header compression or a combination of IP header compression and an adaptation process by an adaptation module. The same is true in decompressing.

Hereinafter, adaptation will be described.

In transmission of a single-direction link, when the receiver does not have context information, the decompressor cannot restore the received packet header until complete context is received. This may lead to channel change delay and turn-on delay. Accordingly, through the adaptation function, configuration parameters and context information between the compressor and the decompressor may be transmitted out of band. The adaptation function may provide construction of link layer signaling using context information and/or configuration parameters. The adaptation function may use previous configuration parameters and/or context information to periodically transmit link layer signaling through each physical frame.

Context information is extracted from the compressed IP packets and various methods may be used according to adaptation mode.

Mode #1 refers to a mode in which no operation is performed with respect to the compressed packet stream and an adaptation module operates as a buffer.

Mode #2 refers to a mode in which an IR packet is detected from a compressed packet stream to extract context information (static chain). After extraction, the IR packet is converted into an IR-DYN packet and the IR-DYN packet may be transmitted in the same order within the packet stream in place of an original IR packet.

Mode #3 (t6020) refers to a mode in which IR and IR-DYN packets are detected from a compressed packet stream to extract context information. A static chain and a dynamic chain may be extracted from the IR packet and a dynamic chain may be extracted from the IR-DYN packet. After extraction, the IR and IR-DYN packets are converted into normal compression packets. The converted packets may be transmitted in the same order within the packet stream in place of original IR and IR-DYN packets.

In each mode, the context information is extracted and the remaining packets may be encapsulated and transmitted according to the link layer packet structure for the compressed IP packets. The context information may be encapsulated and transmitted according to the link layer packet structure for signaling information, as link layer signaling.

The extracted context information may be included in a RoHC-U description table (RDT) and may be transmitted separately from the RoHC packet flow. Context information may be transmitted through a specific physical data path along with other signaling information. The specific physical data path may mean one of normal PLPs, a PLP in which low level signaling (LLS) is delivered, a dedicated PLP or an L1 signaling path. Here, the RDT may be context information (static chain and/or dynamic chain) and/or signaling information including information associated with header compression. In some embodiments, the RDT shall be transmitted whenever the context information is changed. In addition, in some embodiments, the RDT shall be transmitted every physical frame. In order to transmit the RDT every physical frame, the previous RDT may be reused.

The receiver may select a first PLP and first acquire signaling information of the SLT, the RDT, the LMT, etc., prior to acquisition of a packet stream. When signaling information is acquired, the receiver may combine the signaling information to acquire mapping between service—IP information—context information—PLP. That is, the receiver may check which service is transmitted in which IP streams or which IP streams are delivered in which PLP and acquire context information of the PLPs. The receiver may select and decode a PLP carrying a specific packet stream. The adaptation module may parse context information and combine the context information with the compressed packets. To this end, the packet stream may be restored and delivered to the RoHC decompressor. Thereafter, decompression may start. At this time, the receiver may detect IR packets to start decompression from an initially received IR packet (mode 1), detect IR-DYN packets to start decompression from an initially received IR-DYN packet (mode 2) or start decompression from any compressed packet (mode 3).

Hereinafter, packet encapsulation will be described.

The link layer protocol may encapsulate all types of input packets such as IP packets, TS packets, etc. into link layer packets. To this end, the physical layer processes only one packet format independently of the protocol type of the network layer (here, an MPEG-2 TS packet is considered as a network layer packet). Each network layer packet or input packet is modified into the payload of a generic link layer packet.

In the packet encapsulation procedure, segmentation may be used. If the network layer packet is too large to be processed in the physical layer, the network layer packet may be segmented into two or more segments. The link layer packet header may include fields for segmentation of the transmission side and recombination of the reception side. Each segment may be encapsulated into the link layer packet in the same order as the original location.

In the packet encapsulation procedure, concatenation may also be used. If the network layer packet is sufficiently small such that the payload of the link layer packet includes several network layer packets, concatenation may be performed. The link layer packet header may include fields for performing concatenation. In concatenation, the input packets may be encapsulated into the payload of the link layer packet in the same order as the original input order.

The link layer packet may include a header and a payload. The header may include a base header, an additional header and/or an optional header. The additional header may be further added according to situation such as concatenation or segmentation and the additional header may include fields suitable for situations. In addition, for delivery of the additional information, the optional header may be further included. Each header structure may be predefined. As described above, if the input packets are TS packets, a link layer header having packets different from the other packets may be used.

Hereinafter, link layer signaling will be described.

Link layer signaling may operate at a level lower than that of the IP layer. The reception side may acquire link layer signaling faster than IP level signaling of the LLS, the SLT, the SLS, etc. Accordingly, link layer signaling may be acquired before session establishment.

Link layer signaling may include internal link layer signaling and external link layer signaling. Internal link layer signaling may be signaling information generated at the link layer. This includes the above-described RDT or the below-described LMT. External link layer signaling may be signaling information received from an external module, an external protocol or a higher layer. The link layer may encapsulate link layer signaling into a link layer packet and deliver the link layer packet. A link layer packet structure (header structure) for link layer signaling may be defined and link layer signaling information may be encapsulated according to this structure.

FIG. 7 is a diagram showing a link mapping table (LMT) according to one embodiment of the present invention.

The LMT may provide a list of higher layer sessions carried through the PLP. In addition, the LMT may provide additional information for processing link layer packets carrying the higher layer sessions. Here, the higher layer session may also be referred to as multicast. Information on IP streams or transport sessions transmitted through a specific PLP may be acquired through the LMT. In contrast, information on through which PLP a specific transport session is delivered may be acquired.

The LMT may be delivered in any PLP identified as carrying LLS. Here, the PLP in which the LLS is delivered may be identified by an LLS flag of L1 detail signaling information of a physical layer. The LLS flag may be a flag field indicating whether the LLS is delivered in the PLP, each PLP. Here, L1 detail signaling information may correspond to the below-described PLS2 data.

That is, the LMT may be delivered in the same PLP along with the LLS. Each LMT shall describe mapping between PLPs and IP addresses/ports as described above. As described above, the LLS may include an SLT and the IP address/port described in the LMT may be any IP address/port associated with any service described in the SLT delivered in the same PLP as the LMT.

In some embodiments, the PLP identifier information in the above-described SLT, SLS, etc. may be used to confirm information indicating through which PLP a specific transport session indicated by the SLT or SLS is transmitted may be confirmed.

In another embodiment, the PLP identifier information in the above-described SLT, SLS, etc. will be omitted and PLP information of the specific transport session indicated by the SLT or SLS may be confirmed by referring to the information in the LMT. In this case, the receiver may combine the LMT and other IP level signaling information to identify the PLP. Even in this embodiment, the PLP information in the SLT, SLS, etc. is not omitted and may remain in the SLT, SLS, etc.

The LMT according to the shown embodiment may include a signaling_type field, a PLP_id field, a num_session field and/or information on each session. Although the LMT of the shown embodiment describes IP streams transmitted through one PLP, a PLP loop may be added to the LMT to describe information on a plurality of PLPs in some embodiments. In this case, the LMT may describe, in a PLP loop, PLPs for any IP address/port associated with any service described in the SLT delivered together, as described above.

The signaling_type field may indicate the type of signaling information delivered by the table. The value of signaling_type field for the LMT may be set to 0x01. The signaling_type field may be omitted. The PLP_id field may identify a target PLP to be described. If the PLP loop is used, each PLP_id field may identify each target PLP. The PLP_id field and subsequent fields thereof may be included in the PLP loop. The below-described PLP_id field is an identifier for one PLP of the PLP loop and the below-described fields may be fields for the corresponding PLP.

The num_session field may indicate the number of higher layer sessions delivered through the PLP identified by the corresponding PLP_id field.

According to the number indicated by the num_session field, information on each session may be included. This information may include a src_IP_add field, a dst_IP_add field, a src_UDP_port field, a dst_UDP_port field, an SID_flag field, a compressed_flag field, an SID field and/or a context_id field.

The src_IP_add field, the dst_IP_add field, the src_UDP_port field and the dst_UDP_port field may indicate the source IP address, the destination IP address, the source UDP port and the destination UDP port of the transport session among the higher layer sessions delivered through the PLP identified by the corresponding PLP_id field.

The SID_flag field may indicate whether the link layer packet delivering the transport session has an SID field in the optional header. The link layer packet delivering the higher layer session may have an SID field in the optional header and the SID field value may be equal to that of the SID field in the LMT.

The compressed_flag field may indicate whether header compression is applied to the data of the link layer packet delivering the transport session. In addition, presence/absence of the below-described context_id field may be determined according to the value of this field. If header compression is applied (compressed_flag=1), the RDT may be present and the PLP ID field of the RDT may have the same value as the PLP_id field associated with this compressed_flag field.

The SID field may indicate the SIDs (sub stream IDs) of the link layer packets delivering the transport session. These link layer packets may include SIDs having the same values as this SID field in the optional header thereof. To this end, the receiver may filter link layer packets using LMT information and the SID information of the link layer packet header, without parsing all link layer packets.

The context_id field may provide a reference for a context id (CID) in the RDT. The CID information of the RDT may indicate the context ID of the compression IP packet stream. The RDT may provide context information of the compression IP packet stream. Through this field, the RDT and the LMT may be associated.

In the above-described embodiments of the signaling information/table of the present invention, the fields, elements or attributes may be omitted or may be replaced with other fields. In some embodiments, additional fields, elements or attributes may be added.

In one embodiment of the present invention, service components of one service may be delivered through a plurality of ROUTE sessions. In this case, an SLS may be acquired through bootstrap information of an SLT. An S-TSID and an MPD may be referenced through the USBD of the SLS. The S-TSID may describe not only the ROUTE session delivered by the SLS but also transport session description information of another ROUTE session carried by the service components. To this end, the service components delivered through the plurality of ROUTE sessions may all be collected. This is similarly applicable to the case in which the service components of one service are delivered through a plurality of MMTP sessions. For reference, one service component may be simultaneously used by the plurality of services.

In another embodiment of the present invention, bootstrapping of an ESG service may be performed by a broadcast or broadband network. By acquiring the ESG over broadband, URL information of the SLT may be used. ESG information may be requested using this URL.

In another embodiment of the present invention, one service component of one service may be delivered over the broadcast network and the other service component may be delivered over broadband (hybrid). The S-TSID may describe components delivered over the broadcast network such that the ROUTE client acquires desired service components. In addition, the USBD may have base pattern information to describe which segments (which components) are delivered through which path. Accordingly, the receiver can confirm a segment to be requested from the broadband service and a segment to be detected in a broadcast stream.

In another embodiment of the present invention, scalable coding of a service may be performed. The USBD may have all capability information necessary to render the service. For example, when one service is provided in HD or UHD, the capability information of the USBD may have a value of "HD or UHD". The receiver may check which component is reproduced in order to render the UHD or HD service using the MPD.

In another embodiment of the present invention, through a TOI field of the LCT packets delivered through the LCT channel delivering the SLS, which SLS fragment is delivered using the LCT packets (USBD, S-TSID, MPD, etc.) may be identified.

In another embodiment of the present invention, app components to be used for app based enhancement/an app based service may be delivered over the broadcast network as NRT components or may be delivered over broadband. In addition, app signaling for app based enhancement may be performed by an application signaling table (AST) delivered along with the SLS. In addition, an event which is signaling for operation to be performed by the app may be delivered in the form of an event message table (EMT) along with the SLS, may be signaled in the MPD or may be in-band signaled in the form of a box within DASH representation. The AST, the EMT, etc. may be delivered over broadband. App based enhancement, etc. may be provided using the collected app components and such signaling information.

In another embodiment of the present invention, a CAP message may be included and provided in the above-described LLS table for emergency alert. Rich media content for emergency alert may also be provided. Rich media may be signaled by a CAP message and, if rich media is present, the rich media may be provided as an EAS service signaled by the SLT.

In another embodiment of the present invention, linear service components may be delivered over the broadcast network according to the MMT protocol. In this case, NRT data (e.g., app components) of the service may be delivered over the broadcast network according to the ROUTE protocol. In addition, the data of the service may be delivered over broadband. The receiver may access the MMTP session delivering the SLS using the bootstrap information of the SLT. The USBD of the SLS according to the MMT may reference the MP table such that the receiver acquires linear service components formatted into the MPU delivered according to the MMT protocol. In addition, the USBD may further reference the S-TSID such that the receiver acquires NRT data delivered according to the ROUTE protocol. In addition, the USBD may further reference the MPD to provide a reproduction description of data delivered over broadband.

In another embodiment of the present invention, the receiver may deliver location URL information capable of acquiring a file content item (file, etc.) and/or a streaming component to a companion device through a web socket method. The application of the companion device may acquire components, data, etc. through a request through HTTP GET using this URL. In addition, the receiver may deliver information such as system time information, emergency alert information, etc. to the companion device.

FIG. 8 illustrates a configuration of a broadcast signal transmission apparatus for future broadcast services according to an embodiment of the present invention.

The broadcast signal transmission apparatus for future broadcast services according to the present embodiment may include an input formatting block 1000, a bit interleaved coding & modulation (BICM) block 1010, a frame buidling block 1020, an OFDM generation block 1030 and a signaling generation block 1040. Description will be given of an operation of each block of the broadcast signal transmission apparatus.

In input data according to an embodiment of the present invention, IP stream/packets and MPEG2-TS may be main input formats, and other stream types are handled as general streams.

The input formatting block 1000 may demultiplex each input stream into one or a plurality of data pipes, to each of which independent coding and modulation are applied. A DP is the basic unit for robustness control, which affects QoS. One or a plurality of services or service components may be carried by one DP. The DP is a logical channel in a physical layer for delivering service data or related metadata capable of carrying one or a plurality of services or service components.

Since QoS depends on characteristics of a service provided by the broadcast signal transmission apparatus for future broadcast services according to the embodiment of the present invention, data corresponding to respective services needs to be processed using different schemes.

BICM block 1010 may include a processing block for a profile (or system) to which MIMO is not applied, and a processing block for a profile (or system) to which MIMO is applied and may comprise a plurality blocks for processing each Data Pipe.

A processing block of the BICM block to which MIMO is not applied may include a data FEC encoder, a bit interleaver, a constellation mapper, a signal space diversity (SSD) encoding block and a time interleaver. A processing block of the BICM block to which MIMO is applied may is distinguished from the processing block of the BICM block to which MIMO is not applied in that the processing block further includes a cell-word demultiplexer and a MIMO encoding block The data FEC encoder performs FEC encoding on an input BBF to generate FECBLOCK procedure using outer coding (BCH) and inner coding (LDPC). The outer coding (BCH) is optional coding method. The bit interleaver may interleave outputs of the data FEC encoder to achieve optimized performance with a combination of LDPC codes and a modulation scheme while providing an efficiently implementable structure. A detailed operation of the bit interleaver will be described later.

The constellation mapper may modulate each cell word from the bit interleaver or the cell-word demultiplexer in the advanced profile using either QPSK, QAM-16, non-uniform QAM (NUQ-64, NUQ-256, or NUQ-1024) or non-uniform constellation (NUC-16, NUC-64, NUC-256, or NUC-1024) mapping to give a power-normalized constellation point. This constellation mapping is applied only for DPs. It is observed that QAM-16 and NUQs are square shaped, while NUCs have arbitrary shapes. Both NUQs and NUCs are defined specifically for each code rate and the particular one used is signaled by the parameter DP_MOD field in the PLS2 data. The time interleaver may operates at a DP level. Parameters of time interleaving (TI) may be set differently for each DP. The time interlaever according to an embodiment of the present invention can be positioned between a BICM chain block and a frame builder.

Here, The time interlaever according to an embodiment of the present invention can use both a convolutional interleaver (CI) and a block interleaver (BI) or selectively using either the CI or the BI according to a physical layer pipe (PLP) mode. A PLP according to an embodiment of the present invention is a physical path corresponding to the same concept as that of the above-described DP, and a name of the PLP may be changed by a designer. A PLP mode according to an embodiment of the present invention may include a single PLP mode or a multi-PLP mode according to the number of PLPs processed by a broadcast signal transmitter or a broadcast signal transmission apparatus. In the present invention, time interleaving in which different time interleaving schemes are applied according to PLP modes may be referred to as hybrid time interleaving.

The hybrid time interleaver may include a BI and a CI. That is, when PLP_NUM=1, the BI is not applied (BI is turned OFF) and only the CI is applied. When PLP_NUM>1, both the BI and the CI may be applied (BI is turned ON). A structure and an operation of the CI applied when PLP_NUM>1 may be different from a case of PLP_NUM=1. The hybrid time deinterleaver may perform an operation corresponding to an inverse operation of the hybrid time interleaver described above.

The cell-word demultiplexer is used for dividing a single cell-word stream into dual cell-word streams for MIMO processing. The MIMO encoding block may process an output of the cell-word demultiplexer using a MIMO encoding scheme. The MIMO encoding scheme of the present invention may be defined as full-rate spatial multiplexing (FR-SM) to provide capacity increase with relatively small complexity increase at the receiver side. MIMO processing is applied at the DP level. NUQ ($e_{1,i}$ and $e_{2,i}$) corresponding to a pair of constellation mapper outputs is fed to an input of a MIMO encoder and paired MIMO encoder output ($g_{1,i}$ and $g_{2,i}$) is transmitted by the same carrier k and OFDM symbol I of respective TX antennas thereof.

The frame building block 1020 may map the data cells of the input DPs into the OFDM symbols within a frame, and perform frequency interleaving for frequency-domain diversity.

A frame according to an embodiment of the present invention is further divided into a preamble, one or more frame signaling symbols (FSSs), normal data symbols. The preamble provides a set of basic transmission parameters for efficient transmission and reception of a signal. And the preamble indicates whether the emergency alert service (EAS) is provided in a current frame or not. A main purpose of the FSS is to carry PLS data. For fast synchronization and channel estimation, and hence fast decoding of PLS data, the FSS has a dense pilot pattern than a normal data symbol.

The frame building block 1020 may include a delay compensation block for adjusting timing between DPs and corresponding PLS data to ensure that the DPs and the corresponding PLS data are co-timed at a transmitter side, a cell mapper for mapping PLS, DPs, auxiliary streams, dummy cells, etc. to active carriers of the OFDM symbols in the frame and a frequency interleaver.

The frequency interleaver may randomly interleave data cells received from the cell mapper to provide frequency diversity. In addition, the frequency interleaver may operate on data corresponding to an OFDM symbol pair including two sequential OFDM symbols or an OFDM symbol using a different interleaving-seed order to obtain maximum interleaving gain in a single frame.

The OFDM generation block 1030 modulates OFDM carriers by cells produced by the frame building block, inserts pilots, and produces a time domain signal for transmission. In addition, this block subsequently inserts guard intervals, and applies peak-to-average power ratio (PAPR) reduction processing to produce a final RF signal.

The signaling generation block 1040 may create physical layer signaling information used for an operation of each functional block. Signaling information according to an embodiment of the present invention may include PLS data. The PLS data includes PLS1 data and PLS2 data.

The PLS1 data is a first set of PLS data carried in an FSS symbol in a frame having a fixed size, coding and modulation, which carries basic information about the system in addition to the parameters needed to decode the PLS2 data. The PLS1 data provides basic transmission parameters including parameters required to enable reception and decoding of the PLS2 data. In addition, the PLS1 data remains constant for the duration of a frame group. The PLS2 data is a second set of PLS data transmitted in an FSS symbol, which carries more detailed PLS data about the system and the DPs. The PLS2 contains parameters that provide sufficient information for the receiver to decode a desired DP. The PLS2 signaling further includes two types of parameters, PLS2 static data (PLS2-STAT data) and PLS2 dynamic data (PLS2-DYN data). The PLS2 static data is PLS2 data that remains static for the duration of a frame group and the PLS2 dynamic data is PLS2 data that dynamically changes frame by frame.

PLS2 data can include FIC_FLAG information. FIC (fast information channel) is a dedicated channel for carrying cross-layer information to enable fast service acquisition and channel scanning. FIC_FLAG is a 1-bit field and indicates whether the FIC is used in a current frame. If this field is set to '1', the FIC is provided in the current frame. If this field set to '0', the FIC is not carried in the current frame.

The BICM block 1010 may include BICM block for protection of the PLS data including a PLS FEC encoder, a bit interleaver and a constellation mapper.

The PLS FEC encoder may include a scrambler for scrambling PLS1 data and PLS2 data, a BCH encoding/zero insertion block for outer encoding on the scrambled PLS 1,2 data using a shortened BCH code for PLS protection, and insert zero bits after BCH encoding, an LDPC encoding block for LDPC encoding using an LDPC code and an LDPC parity puncturing block. The bit interleaver may interleave each of shortened and punctured PLS1 data and PLS2 data. The constellation mapper may map the bit-ineterlaeved PLS1 data and PLS2 data to constellations.

The broadcast signal reception apparatus for future broadcast services according to the embodiment of the present invention may correspond to the broadcast signal transmission apparatus for future broadcast services described with reference to FIG. 8.

The broadcast signal reception apparatus for future broadcast services according to the embodiment of the present invention may include a synchronization & demodulation module carrying out demodulation corresponding to a reverse procedure of a procedure performed by the broadcast signal transmission apparatus, a frame parsing module parsing input signal frames and extracting data through which a service selected by a user is transmitted, a demapping & decoding module which convert input signals into bit domain data and then deinterleave the same as necessary, perform demapping of mapping applied for transmission efficiency and correct an error generated on a transmission channel through decoding, an output processor performing reverse procedures of various compression/signal processing procedures which are applied by the broadcast signal transmission apparatus and a signaling decoding module obtaining PLS information from a signal demodulated by the synchronization & demodulation module. The frame parsing module, the demapping & decoding module and the output processor may execute functions thereof using data output from the signaling decoding module.

Hereinafter, time interleaver is described. According to an embodiment of the present invention, each TI group is either mapped directly to one frame or spread over PI frames. Each TI group is also divided into more than one TI block (N_TI), where each TI block corresponds to one usage of a time interleaver memory. The TI blocks within the TI group may contain slightly different numbers of XFECBLOCKs. Typically, the time interleaver may also function as a buffer for DP data prior to a process of frame building.

The Time interleaving according to an embodiment of the present invention is a twisted row-column block interleaver. The twisted row-column block interleaver according to an embodiment of the present invention may column-wise wite a first XFECBLOCK into a first column of a TI memory, and a second XFECBLOCK into a next column, and so on). Then, in an interleaving array, cells are diagonal-wise read diagonal-wise from a first row (rightwards along a row beginning with a left-most column) to a last row, Nr cells are read out. Moreover, in order to achieve single-memory deinterleaving at a receiver side regardless of a number of XFECBLOCKs in a TI block the twisted row-column block interleaver may insert the virtual XFECBLOCKs into the TI memory. The virtual XFECBLOCKs must be inserted infront of other FECBLOCKS to achieve single-memory deinterleaving at a receiver side.

Figure 9:
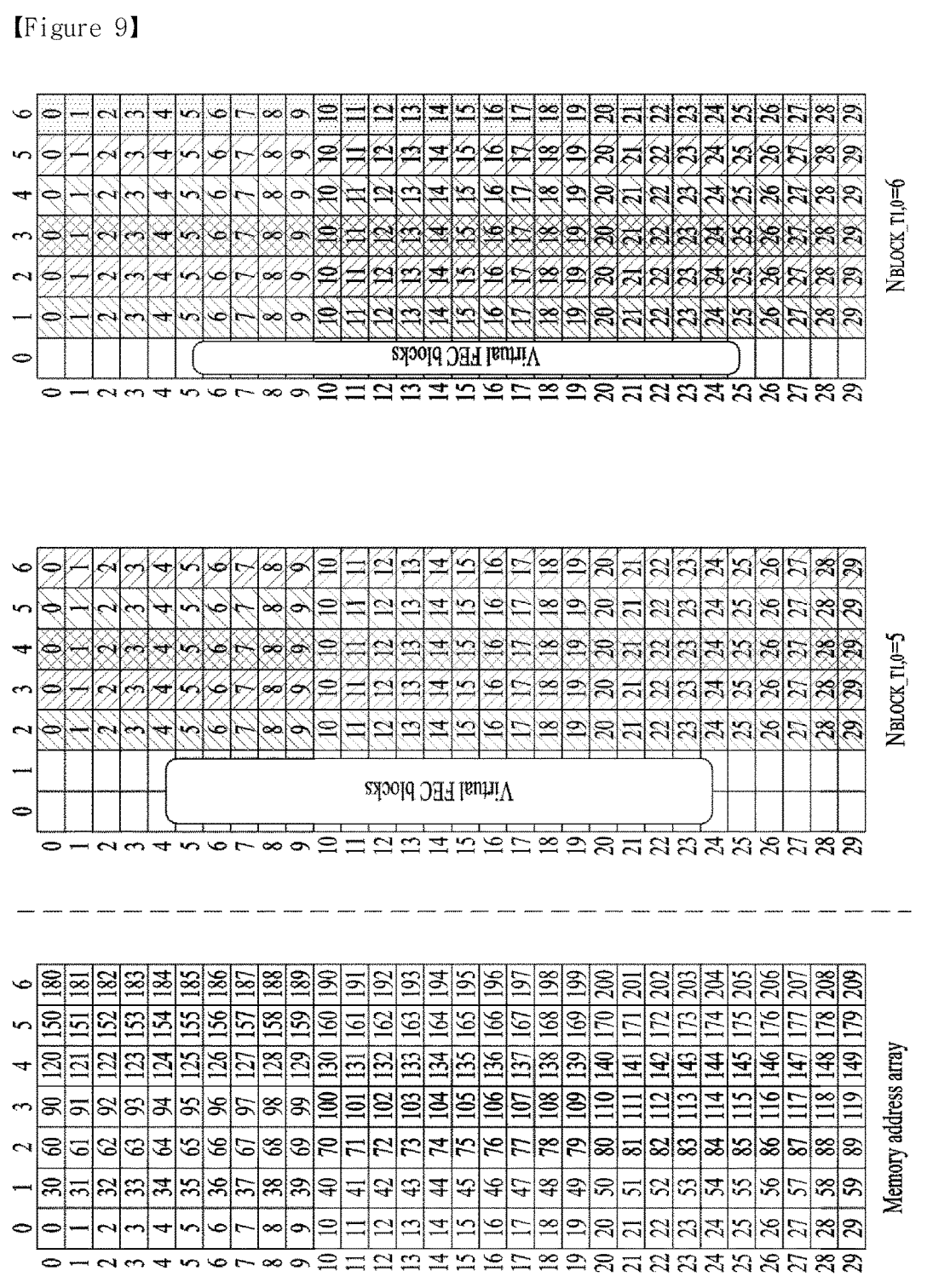

FIG. 9 illustrates a write operation of a time interleaver according to an embodiment of the present invention.

A left block in the figure illustrates a TI memory address array, and right blocks in the figure illustrate a write operation when two virtual FEC blocks and one virtual FEC block are inserted into heads of two contiguous TI groups, respectively.

The frequency interleaver according to the present embodiment may include an interleaving address generator for generating an interleaving address for applying corresponding data to a symbol pair.

FIG. 10 illustrates an interlaving address generator including a main pseudo-random binary sequence (PRBS) generator and a sub-PRBS generator according to each FFT mode which are included in a frequency interleavaer according to an embodiment of the present invention.

(a) shows the block diagrams of the interleaving-address generator for 8K FFT mode, (b) shows the block diagrams of the interleaving-address generator for 16K FFT mode and (c) shows the block diagrams of the interleaving-address generator for 32K FFT mode.

The interleaving process for the OFDM symbol pair is described as follows, exploiting a single interleaving-sequence. First, available data cells (the output cells from the Cell Mapper) to be interleaved in one OFDM symbol $O_{m,l}$ is defined as $O_{m,l}=[x_{m,l,0}, \ldots, x_{m,l,p}, \ldots, x_{m,l,Ndata-1}]$ for $l=0, \ldots, N_{sym}-1$, where $x_{m,l,p}$ is the $p^{th}$ cell of the $l^{th}$ OFDM symbol in the $m^{th}$ frame and $N_{data}$ is the number of data cells: $N_{data}=C_{FSS}$ for the frame signaling symbol(s), $N_{data}=C_{data}$ for the normal data, and $N_{data}=C_{FES}$ for the frame edge symbol. In addition, the interleaved data cells are defined as $P_{m,l}=[v_{m,l,0}, \ldots, v_{m,l,Ndata-1}]$ for $l=0, \ldots, N_{sym}-1$.

For the OFDM symbol pair, the interleaved OFDM symbol pair is given by $v_{m,l,Hi(p)}=x_{m,l,p}$, $p=0, \ldots, N_{data}-1$, for the first OFDM symbol of each pair $v_{m,l,p}=x_{m,l,Hi(p)}$, $p=0, \ldots, N_{data}-1$ for the second OFDM symbol of each pair, where $H_l(p)$ is the interleaving address generated based on a PRBS generator and a cyclic shift value (symbol offset) of a sub-PRBS generator.

Hereinafter, a method for transmitting a broadcast signal according to another embodiment of the present invention is described.

In FIG. 1, the Service List Table may be transmitted with being included in Low Level Signaling information. The LLS information may be transmitted in a UDP/IP layer, and may also be referred to as an LLS table. Since the LLS information is not encoded in a delivery layer but is transmitted in the IP packet format, the LLS information may be processed more quickly in a receiver, and accordingly, the delay caused to provide a service when the receiver is turned on.

The broadcast service may be delivered by using three functional layers. The three layers include a physical layer, a delivery layer and a service management layer. The physical layer may provide a mechanism in which signaling, service announcement and IP steams are transported to the physical layer. The delivery layer may provide an object or object flow transport functionality. The delivery layer may transport an object by using Real-Time Object Delivery over Unidirection Transport (ROUTE) protocol. The ROUTE protocol that operates in UDP/IP multicast over the broadcast physical layer and the HTTP protocol that operates in TCP/IP unicast over the broadcast physical layer may be used in the delivery layer. The service management layer enables services of arbitrary types such as linear TV and HTML5 application service to be transported in the delivery layer and the physical layer.

In this specification, a Fast Information Table (FIT) may also be referred to as a Service List Table (SLT).

FIG. 11 illustrates a service delivery and signaling structure according to an embodiment of the present invention.

The service signaling may provide service discovery and description information, and may include two functional components—bootstrap signaling through SLT and SLS. The SLT and the SLS indicate the information required to discover and obtain a user service.

The SLT enables to obtain the basic service information fast. The SLS provides information required for a receiver to discover and access a broadcast service (e.g., ATSC 3.0) and the contents components. The relationship between the SLT and SLS signaling (for ROUTE/DASH services) and an MMT signaling will be described below. However, the MMT signaling may also be referred to as the SLS.

For the broadcast delivery of the ROUTE/DASH services, the SLS may be transmitted to ROUTE/UDP/IP from one of the LCT transport sessions including a ROUTE session. The SLS may be transmitted to a proper carousel rate that supports fast channel joint and switching. In the broadband delivery, the SLS may be carried on HTTP(S)/TCP/IP.

As shown in FIG. 11, a service in the broadcast system of the present invention may be delivered though ROUTE protocol and MMT protocol, and the SLS for the service delivered through each protocol may also be delivered through each protocol.

FIG. 12 illustrates logical entity and relationship of a service management, delivery and physical layers according to an embodiment of the present invention.

The ROUTE/LCT session and/or the MMTP sessions that deliver the content component of a broadcast service may be composed as below. With respect to a broadcast delivery of a linear service without application-based enhancement, the service content component may be delivered by at least one of at least one ROUTE/LCT session or at least one MMTP session. With respect to a broadcast delivery of a linear service with application-based enhancement, the service content component may be delivered by at least one of at least one ROUTE/LCT session or zero or more MMTP sessions. For streaming of the media components in the same service, it may be prohibited that the MMTP and the ROUTE are used together. With respect to a broadcast delivery of the application-based service, the service content components may be delivered by at least one ROUTE/LCT session.

Each ROUTE session includes at least one LCT session that carries the content component that constructs a broadcast service. With respect to a streaming service delivery, the LCT session may deliver an individual component of a user service such as audio, video or caption stream. The streaming media may be formatted per MPEG-DASH as a DASH segment. Each MMTP session may include at least one MMTP packet flow that delivers a content component or an MMT signaling. The MMTP packet flow may deliver a component formatted per MMT or an MMT signaling message, as MPUs. With respect to the NRT user service or system metadata, the LCT session may deliver a file-based content item. The content file may include continuous (time-based) or discrete (non-time-based) media component of the NRT service or metadata such as a service signaling or ESG fragment.

A broadcast steam is an extraction of an RF channel, and may be defined as a carrier frequency centered in a specific bandwidth. The PLP corresponds to a portion of an RF channel. Each PLP has a specific modulation and coding parameter. The PLP may be identified by a unique PLP identifier (PLPID) in the broadcast stream to which the PLP is belonged.

Each service may be distinguished two types of forms of the service identifiers. One is a compact form used in the FIT, which is unique only in a broadcast area and another is a globally unique form used in the SLS and the ESG. The ROUTE session may be distinguished by a source IP address, a destination IP address and a destination port number. The LCT session may be distinguished by a unique Transport Session Identifier (TSI) in a ROUTE session. The common properties in the LCT sessions and specific properties with respect to each LCT session may be provided by the ROUTE signaling structure which is designated by Service-based Transport Session Instance Description (S-TSID), and the S-TSID is a part of the service level signaling. Each of the LCT sessions may be delivered by a single PLP. The different LCT sessions in the ROUTE session may be included in different PLPs. The properties described in the S-TSID may include TSI value and PLPID for each LCT session, descriptor for deliver object/files and application layer FEC parameters.

The MMTP session may be distinguished by a source IP address, a destination IP address and a destination port number. The MMTP packet flow may be distinguished by a unique packet_id in a scoop of a parent MMTP session. The common properties with respect to each MMTP packet flow and specific property with respect to the MMTP packet flow may be described in the SLT. Each MMTP packet flow may be carried on a single PLP. Different MMTP packet flows of an MMTP session may be included or not included in different PLPs. The property described in an MMT signaling message may include PLP ID information and packet ID information for each MMTP packet flow.

FIG. 13 illustrates a method for using a service signaling for bootstrapping and service discovery according to an embodiment of the present invention.

As an embodiment, signaling information may be carried as a payload of an IP packet that has a public/known address, and the signaling information may be referred to as a Link Layer Signaling (LLS) or a Service List Table (SLT). The point on which a receiver starts to operate when receiving a broadcast signal may be the LLS. The LLS may be used to build a list of services received by a receiver such as a channel name and a channel number. In addition, the LLS may also provide bootstrap information that enables a receiver to discover the LSL information for each service. The bootstrap information may include a destination IP address, a destination port and a TSI of the LCT session that delivers the SLS. With respect to MMT/MPD delivery service, the bootstrap information may include a destination IP address, a destination port and a packet IP of a service layer signaling MMTP channel.

With respect to ROUTE/DASH, the SLS for each service may describe attributes of services such as the capability of a receiver required to provide a meaningful presentation of a service, a location on which a service is available to be obtained, and a list of components. In the ROUTE/DASH system, the SLS may include User Service Bundle Description (USBD), S-TSID and DASH Media Presentation Description (MPD). The detailed description of USBD will be described below.

Since a separate service signaling is used with respect to each service, a receiver obtains the SLS only for a wanted service without the need to parse all SLSs within a broadcast stream, thereby decreasing unnecessary processing of the receiver. For the optional broadband delivery of a service signaling, the SLT may also include a HTTP URL in which a service signaling file may be obtained. When an update occurs in an SLS signaling, an event may be detected by a version field of the SLT. In addition, the updated signaling may be obtained by broadcast or in broadband.

As shown in FIG. 13, the LLS is used for obtaining the SLS, and the SLS may be used for obtaining a service component which is delivered with ROUTE/LCT transport session. A receiver may obtain the SLT. Each service identified by a service ID may provide SLS bootstrapping information. The SLS bootstrapping information may include a PLPID, a source IP address (sIP1), a destination IP address (sIP1), a destination port number (dPort1) and a TSI (tsi-SLS).

A receiver may obtain an SLS fragment which is delivered with IP/UDP/LCT session and the PLP. These fragments may include a USBD/USD fragment, an S-TSID fragment and an MPD fragment. These fragments may be associated with a single service. The USBD/USD fragment may include a URI that describes a service level attribute and refers to the S-TSID fragment and a URI that refers the MPD fragment.

The S-TSID fragment may be provide the component acquisition information in relation to a service and a mapping between DASH Representation discovered in the MPD and the TSI corresponding to a component of a service. The S-TSID may provide component acquisition information of a TSI form, a DASH Representation identifier and a PLP ID that delivers DASH segment in relation to the DASH Representation. By using the PLPID and the TSI values, a receiver may collect audio/video components, and may buffer DASH media segment by applying an appropriate decoding processing. Service #2 distinguished by a service ID (service_id, 0x1002) may provide the MMTP session description information that includes an MMT signaling message—PLPID(#2), a source IP address (sIP2), a destination IP address (dIP2), a destination port number (dPort2) and a packet ID (packet_id-2). A receiver may obtain an MMT signaling message carried through the IP/UDP/MMTP session and/or the PLP. These messages may include MPT table(s) associated with a service. By using the MMTP signaling message, a receiver may collect audio/video component from a service and start an MPT processing.

The hierarchical signaling architecture of a broadcast system will be described in more detail below.

A service signaling provides the bootstrap and discovery information with respect to a service which is currently "on the air". The Electronic Service Guide (ESG) provides the contents accompanying detailed information including a device performance, a content rating and a presentation schedule and a user service announcement announcing an available broadcast service and a content list. The ESG information may be provided such that a user may select a service or content. The ESG information may be required for a receiver to determine whether it is the content or service to be watched by a user. The linkage between a service of the ESG and a service of the SLS may be described by a service identifier.

Generally, the low level signaling (LLS) may also be operated under the IP level. In the reception side, the LLS may also be obtained faster than the IP level signaling. The LLS may be obtained before the session establishment. The LLS may be used for performing fast channel scan and fast service acquisition efficiently. The LLS may include the binding information between the service signaling and the PLP. In addition, the LLS may include the signaling information in relation to the Emergency Alert (EA).

The SLS may also include the USBD and the S-TSID metadata fragment. The USBD may include service identification and device performance information. In addition, the USBD may include different SLS fragment required to access to a service and a media component and metadata required for a receiver to determine a transport mode (broadcast and/or broadband). The S-TSID fragment may provide the transport session description with respect to an MMTP session or a ROUTE/LCT session through which a media content component is delivered, and may provide the description with respect to deliver objects delivered in an LCT session.

The streaming content signaling component of the SLS may also correspond to a Media Presentation Description (MPD). The MPD is a streaming content, and may be associated with the linear services for a delivery of DASH segments. The MPD may be used for supporting application-based service, and may be in relation to the DASH-formatted content components, and the MPD may be used for controlling a play out of the contents. The MPD may provide the resource identifier for an individual media component of linear/streaming service with a segment URL form, and may provide a context of the resources identified in the media presentation. The application-based enhancement signaling may be applied to a delivery of the application-based enhancement component such as an application logic file, an NRT media file, an on-demand content component or a notification stream.

FIG. 14 illustrates SLT information according to an embodiment of the present invention.

The SLT supports a fast channel scan and a service acquisition. The SLT enables a viewer to present a meaningful service list, and includes information supporting a service selection through channel up/down zapping. In addition, the SLT includes bootstrap information that may locate a position of a service layer signaling through broadcast/broadband depending on whether a signaling is available. The bit stream syntax of the SLT is as shown in FIG. 14. The description for each of the fields is as below.

table_id: An unsigned integer of 8 bits, and may be configured that a table is to represent an SLT section.

SLT_section_version: A field of 4 bits, and may represent a version number of an SLT section. The value of this field may be increased by 1 when the included information is changed. When the field value reaches to '1111' which is the maximum value, the value may return to 0 again.

SLT_section_length: This 12 bits field may represent a byte number of instance of an SLT section. The represented length may be started right after SLT_section_length field.

SLT_protocol_version: An unsigned integer of 8 bits, and represents the version of the SLT structure. Upper 4 bits of the field may represent the major version, and lower 4 bits may represent the minor version. As an embodiment, the value of this field may be set to 0x10 so as to represent version 1.0.

broadcast_stream_id: An unsigned integer of 16 bits, and may identify the entire broadcast stream. Uniqueness of the field value may be the range of a geographic area (e.g., North America).

SLT_section_number: An unsigned integer of 4 bits, and may represent the number of section starting from zero. The SLT may include multiple SLT sections.

last_SLT_section_number: This field may represent the section that has the highest value of the SLT_section_number of the SLT which is a part of the current SLT section. For example, in the case that the last_SLT_section_number field has '0010' value, may which represent there are total three sections labeled with '0000', '0001' and '0010'.

num_services: An unsigned integer of 8 bits, and may represent the number of services described in the service_list_table_section( ).

service_id: An unsigned integer of 16 bits that identifies the service in a scope of a broadcast area.

SLT_service_seq_number: This field represents a sequence number of the service information that has a service ID such as the service_id field in the repetition of "for" loop. The SLT_service_seq_number may be started from zero for each service and may be increased by 1 when the SLT service information for the service identified by the service_id is changed. In the case that the SLT service information for a specific service is not changed in comparison with the past service information that has a specific value of the SLT_service_seq_number, the SLT_service_seq_number field value is not increased. The SLT_service_seq_number field value returns to zero when it reaches the maximum value.

protected: A flag of 1 bit, and when it is set, this represents that at least one component required for a meaningful presentation may be protected. When it is set to '0', this flag may represent that the component required for a meaningful presentation of a service is not protected.

major_channel_number: An unsigned integer of 10 bits in the range of 1 to 999, and represents a "major" channel number of the service defined in the repetition of "for" loop. Each service may be in relation to a major channel number and a minor channel number. The major channel number may function as a reference number of a user for a virtual channel like the minor channel number. The major channel number is set such that a pair of the major channel number/the minor channel number is not overlapped.

minor_channel_number: An unsigned integer of 10 bits in the range of 1 to 999, and represents a "minor" or "sub" channel number of the service defined in the repetition of "for" loop. This field provides a channel number of two parts of a service together with the major channel number, and the minor channel number represents the second or the right number.

service_category: An unsigned integer field of 4 bits, and may represent a service category as represented in Table 1 below.

TABLE 1

| Service category | Meaning |
| --- | --- |
| 0x00 | not specified |
| 0x01 | Linear A/V service |
| 0x02 | Linear audio only service |
| 0x03 | App-based service |
| 0x04~0x0f | Reserved for future use | short_service_name_length: An unsigned integer field of 4 bits, and represents the length of the subsequent short_service_name( ) field. In the case that there is no short name provided for this service, this field may be set to zero.

short_service_name( ): This field represents a short name of a service, in the case that this field is present. Each character of the term may be encoded per UTF-8.

broadcast_signaling_present: A Boolean flag of 1 bit, and in the case that it is set to '1', this represents that there exist the fields started from SLS_PLP_id and ended in the fields in relation to num_ext_length_bits in Table of FIG. 14.

SLS_source_IP_address_present: A Boolean flag of 1 bit, and in the case that it is set to '1', this represents that the SLS_source_IP_address field is present. In the case that it is set to '0', this represents that the SLS_source_IP_address field is not present.

broadband_access_required: A Boolean flag of 1 bit, and in the case that it is set to '1', this may represent that a broadband access is required in order for a receiver to provide a meaningful presentation of the service identified by a service ID. In the case that it is set to '0', this may represent that a broadband access is not required in order for a receiver to provide a meaningful presentation of the service identified by a service ID.

SLS_protocol_type: An unsigned integer field of 4 bits, and represents a protocol type of an SLS channel on UDP/IP with respect to the service described in "for" loop. This bit may be coded as represented in Table 2. A receiver parses a part of data field, and may ignore the service in the case that the SLS_protocol_type is unknown or unsupported. Table 2 represents an embodiment of code values of the SLS protocol type information.

TABLE 2

| SLS protocol type | Meaning |
| --- | --- |
| 0x00 | Reserved |
| 0x01 | ROUTE |
| 0x02 | MMTP |
| 0x03 | Reserved |
| 0x04~0x0F | Reserved |

SLS_PLP_id: An unsigned integer field of 4 bits, and represents an ID of the PLP that includes SLS data for this service. The PLP may be more robust than other PLP used by the service.

SLS_destination_IP_address: This field represents IPv4 destination IP address of 32 bits of an SLS channel for the service.

SLS_destination_UDP_port: This field represents a destination UDP port number of an SLS channel for the service.

SLS_source_IP_address: This field represents a source IPv4 address in relation to an SLS for the service, in the case that it is present.

SLS_protocol_version: An unsigned integer field of 8 bits, and may represent a version of the protocol identified in the SLS protocol type field that may be used for providing the SLS for the service. The meaning of the SLS protocol version information may depend on the protocol (e.g., a value of the SLS protocol type information) which is used. In the case that the SLS_protocol_type value is 0x01, that is, in the case of representing the ROUTE protocol, the MSB 4 bits of the SLS_protocol_version field represents the major protocol version of the ROUTE protocol, and the LSB 4 bits may represent the minor protocol version of the ROUTE protocol. As an embodiment, with respect to the ROUTE protocol, the major version number may be 0x1, and the minor version number may be 0x0. In the case that the SLS_protocol_type value is 0x02, that is, in the case of representing the MMT protocol, the MSB 4 bits of the SLS_protocol_version field represents the major protocol version of the MMT protocol, and the LSB 4 bits may represent the minor protocol version of the MMT protocol. As an embodiment, with respect to the MMT protocol, the major version number may be 0x1, and the minor version number may be 0x0.

Receivers may not provide a user service which is labeled with a value of the major protocol version higher than that of the receivers support. In addition, a receiver may not provide a service on the bases of the minor protocol version to a user. A receiver may determine whether a transmitted data includes a data element defined in the latest version of the standard by using the minor protocol version.

num_service_level_descriptors: This field represents the number of zero or more descriptors that provide additional information for the service. The unsigned integer field of 4 bits may represent the number of service level descriptors for the service. In the case that the field value is zero, this represents there is no descriptor.

service_level_descriptor( ): The format of each descriptor may be a type field of 8 bits, and may be connected to a length field of 8 bits. The length field may represent the byte number of a length field subsequent data.

num_SLT_level_descriptors: This field represents the number of zero or more descriptors that provides additional information for the SLT. The unsigned integer field of 4 bits may represent the number of SLT level descriptors included in the service_list_table_section( ). In the case that the field value is zero, this represents there is no descriptor.

SLT_level_descriptor( ): The format of each descriptor may be a type field of 8 bits, and may be connected to a length field of 8 bits. The length field may represent the byte number of a length field subsequent data.

Zero or one or more descriptors may provide additional information for a set of services delivered by a specific service or the SLT instance. The SLT descriptor includes a descriptor tag, and the descriptor tag may represent at least one of a descriptor which is defined, a reference or a position in the SLT. A specific descriptor may be needed to exist in a specific situation. For example, the descriptors such as inet_signaling_location_descriptor( ), service_language_descriptor( ) and capabilities_descriptor( ) may be included in at least one level of a service level or an SLT level.

The SLT described above may be signaled in XML format.

FIG. 15 illustrates an XML format of the SLT according to an embodiment of the present invention.

FIG. 16 illustrates an XML format of InetSigLocation information according to an embodiment of the present invention.

For FIG. 15 and FIG. 16, the description in relation to FIG. 3 and FIG. 14 is not overlapped.

FIG. 17 illustrates a service layer signaling data model according to an embodiment of the present invention.

The SLS may provide detailed technical information for a broadcast receiver to discover and access a broadcast service and the content component of the broadcast service. The SLS may include a set of XML-encoded metadata fragments delivered to a dedicated LCT session. The LCT session that delivers the SLS may be obtained from the bootstrap information included in FIT. The SLS is defined in a service level, and describes the property of service and the access information. The SLS may include a list of content components, the information on how to obtain it and the information such as the receiver performance required to generate a meaningful presentation of a service. In the ROUTE/DASH system for the linear service delivery, the SLS may include USBD, S-TSID and DASH MPD. The SLS fragments may be delivered through an LCT transport session that has a public TSI value.

FIG. 18 illustrates a USBD according to an embodiment of the present invention.

The USBD of FIG. 18 is another embodiment of the USBD of FIG. 4, and the common description may be omitted. The USBD is the most significant or entry point SLS fragment.

The description for elements (attributes) included in the USBD of FIG. 18 is as below.

bundleDescription: A loot element of the USBD userServiceDescription: A single instance of ATSC 3.0 service @serviceId: A globally unique identifier of ATSC 3.0 service @atsc:serviceId: A reference to the corresponding service entry in an LLT (FIT). The value of a service identifier assigned in the entry is the same as the value of the attribute.

@atsc:fullMPDUri: A reference to an MPU fragment that includes a description for a content component of ATSC 3.0 service which is delivered by broadcast or (optionally) broadband.

@atsc:sTSIDUri: A reference to an S-TSID fragment that provides an access to a related parameter with respect to a transport session that carries a content of ATSC 3.0 service.

name: A term of ATSC 3.0 service given by language (lang) attribute.

lang: A language of ATSC 3.0 service term. The language may be specified according to XML data type (XML Schema Part 2 [7]).

serviceLanguage: An available language of ATSC 3.0 service. The language may be specified according to XML data type (XML Schema Part 2 [7]).

atsc:capabilityCode: This field represents a performance or a performance group defined in ATSC 3.0 service announcement and the individualization standard, and represents a performance of a receiver that is able to generate a meaningful representation of the corresponding ATSC service content. The format of the element may be the same as the atsc:capabilities element described under the ATSC 3.0 service announcement and the content fragment of the individualization document.

deliveryMethod: Container of transport related information pertaining to the contents of the service over broadcast and (optionally) broadband modes of access.

atsc:broadcastAppService: DASH Representation delivered over broadcast, in multiplexed or non-multiplexed form, containing the corresponding media component(s) belonging to the ATSC 3.0 Service, across all Periods of the affiliated Media Presentation (MP).

basePattern: A character pattern for use by the ATSC receiver to match against any portion of the Segment URL used by the DASH client to request Media Segments of a parent Representation under its containing Period. A match implies that the corresponding requested Media Segment is carried over broadcast transport.

atsc:unicastAppService: DASH Representation delivered over broadband, in multiplexed or non-multiplexed form, containing the constituent media content component(s) belonging to the ATSC 3.0 Service, across all Periods of the affiliated Media Presentation.

basePattern: A character pattern for use by the ATSC receiver to match against any portion of the Segment URL used by the DASH client to request Media Segments of a parent Representation under its containing Period. A match implies that the corresponding requested Media Segment is carried over broadcast transport.

FIG. 19 illustrates an S-TSID according to an embodiment of the present invention.

The S-TSID of FIG. 19 is another embodiment of the S-TSID of FIG. 6, and the common description may be omitted. The S-TSID includes overall transport session description with respect to a ROUTE session, an LCT session or an MMTP session, through which the media content components in which a service is delivered are delivered. The S-TSID may include a delivery object delivered in the LCT session of a service or metadata for an object flow. The S-TSID may also include additional information with respect to a content component and a payload format delivered in the LCT session. The S-TSID is signaling data in a unit of service.

The description for elements (attributes) included in the S-TSID of FIG. 19 is as below.

S-TSID: Service transport session instance description
RS: ROUTE session
@bsid: An identifier of a broadcast stream in a content component on which broadAppService is carried. In the case that the attribute is not present, The PLP that carries an SLS fragment for ATSC 3.0 service is included in a default broadcast stream. The ID value may be the same as the value of a broadcast stream ID in the FIT.

@sIpAddr: A source IP address (default: the source address of the current ROUTE session, and M for non-primary session.)

@dIpAddr: A destination IP address (default: the destination address of the current ROUTE session, and M for non-primary session.)

@dport: A destination port (default: the destination port of the current ROUTE session, and M for non-primary session.)

@PLPID: PIP ID for a ROUTE session (default: the current PLP).

LS: LCT session
@tsi: TSI value
@PLPID: PIP ID (overrides default ROUTE session value)
@bw: Maximum bandwidth
@startTime: Start time
@endTime: End time
SrcFlow: Source flow defined in ATSC 3.0 Delivery & Synchronization spec [3]
RprFlow: Repair flow defined in ATSC 3.0 Delivery & Synchronization spec [3]

Each instance of the S-TSID may be referred in the USBD fragment.

The MPD is an SLS metadata fragment including a formalized description of the DASH media presentation, which corresponds to a linear service in the duration defined by a broadcaster. The content of the MPD provides a context for resources identified in the media presentation and a resource identifier for the segments. In the context of a broadcast service, at least one representation conveyed by the MPD may be transmitted in broadcast manner. As an embodiment, the representation may be carried through at least one representation broadcast included in the MPD. The MPD may also describe an additional representation.

FIG. 20 illustrates a hierarchical signaling structure according to an embodiment of the present invention.

In FIG. 20, the SLT is transmitted with being included in the LLS, and the LLS is delivered with UDP/IP encapsulated IP packet. FIG. 20 shows an embodiment in which two S-TSIDs are delivered. A single S-TSID provides the access information for an LCT session belonged to ROUTE session #1. In addition, the second S-TSID provides the access information for an LCT session belonged to ROUTE session #N. As an embodiment, the UDP/IP encapsulated LLS may be link layer packetized and may be transmitted to PLP#0.

The PLP that carries the SLT may deliver a service component as well as the SLT. In the embodiment, since the SLS may be delivered to the PLP that delivers the SLT, the PLP ID information in the SLT may be omitted.

In a broadcast stream, multiple SLTs may be included.

As described above, the LLS information may include the SLT information, and also include the information related to Emergency Alert (EA). Hereinafter, the EA related information carried by the LLS information is described. The EA related information may also be referred to as EA information.

The EA information is needed to be broadcasted rapidly and provided to a user in an emergency situation. Accordingly, the EA information may be transmitted through different path from the ordinary service data. In the broadcast system described above, the EA information may be transmitted by using a dedicated channel for the EA information or a specific PLP. However, in such a case, since a data/signal is needed to be processed or inserted in a physical layer, the system operation for the EA information may become difficult. Accordingly, a method is described for transmitting the EA information by using UDP/IP packet.

The EA information may be transmitted with IP packet instead of being transmitted with a link layer signaling or a physical layer channel/data. Particularly, in the IP-based broadcast system described above, the IP-based EP information may generate an effect that enables the system management to be easy. For this, additional signaling information on which IP packet the EA related information is delivered may be constructed. As an embodiment, by using a header part of a packet, it may be represented that the EA information is included or not. In this specification, the packet or the table included in the EA related information may be referred to an EA packet. The LLS information may be transmitted in an IP packet and the LLS information may include the EA information. Accordingly, the EA packet in which the EA related information is included may be included in the LLS information.

FIG. 21 illustrates a method for transmitting EA information using UDP/IP according to an embodiment of the present invention.

A broadcast transmitter may collect a CAP message and the related data so as to transmit the EA information through an IP (step, S21010). The CAP message may also be referred to as an EA message. The EA related data may include an EA table or a packet. The Emergency Alert Table (EAT) may also be referred to the EA information or the EA message. However, the EA message may mean an EA message that should be delivered to a user, and in this case, the signaling information required to deliver the EA message may be referred to the EA information or the EAT.

The broadcast transmitter may construct the EA related information/data in an IP packet format by UDP/IP encapsulating it (step, S21020). It is as described above that such an IP packet may be the LLS information. In a payload of an IP packet, a table in the Emergency Alert Table (EAT) form may also be included. Otherwise, an IP packet may include the EA related information/data as a payload. As an embodiment, a field/information representing that the data constructed in the payload when encapsulating is the EA information may be added in a packet header. Alternatively, in order to represent that it is the EA information, an IP address and a UDP port number may become known in advance or a dedicated value known by a transmitter or a receiver with each other may be used. As a dedicated value, the preconfigured IP address and UDP port number of the LLS information may be used.

The broadcast transmitter may perform a PHY layer processing of an IP packet that includes the EA related information (step, S21030). The IP packet including the EA information may be transmitted to a specific base PLP or a normal PLP. In the case of using the base PLP, the receiver may decode the corresponding PLP without separate signaling information.

The broadcast transmitter may encode the broadcast data like A/V contents based on a delivery protocol (step, S21040). As described above, the deliver protocol may be the ROUTE protocol or the MMT protocol. In addition, the broadcast transmitter may construct the broadcast data in an IP packet format by UDP/IP encapsulating it (step, S21050).

The broadcast receiver may perform a PHY layer processing of a receiving signal, and may IP/UDP decoding/decapsulating the IP packets included in the PLP (step, S21060). The broadcast receiver may decode the IP packet, and may identify whether the corresponding packet is an EA packet by identifying the IP address and the port number from a header of the IP packet. Alternatively, the broadcast receiver may identify the LLS information as the IP address and the port number, and may identify the EA related information included in the LLS information.

The broadcast receiver may extract the EA message such as a CAP message by using a header of the EP packet and the payload information, and may deliver it to a CAP parser or a message parser (step, S21070). The broadcast receiver may parse the EA related information by using the CAP parser or the message parser (step, S21080).

The broadcast receiver may receive a service data by decoding the corresponding PLP in the case that the EA related information is included in the payload of the EA packet. In the case that the broadcast receiver transmits the EA related service through the PLP which is currently receiving, the broadcast receiver may continuously receive the corresponding PLP. In the case that the information in relation to an NRT service data is included in the payload of the EA packet or the CAP message, the broadcast receiver may receive the corresponding data. If it is required, the broadcast receiver may also receive the EA related NRT service data in the broadband. In the case that the overlapped information is in the payload of the EA packet or the CAP message, the broadcast transmitter may adjust the position of the corresponding information properly.

FIG. 22 illustrates a method for transmitting EA information using UDP/IP according to an embodiment of the present invention.

FIG. 22 corresponds to the case of transmitting the EA related information using a normal PLP, and the description as the same operation of FIG. 21 is not repeated.

In the case of using the normal PLP, it may be signaled the PLP that carries the EA information. That is, in order for a receiver to process the EA information quickly, it may be signaled the PLP that carries the EA information. In order to be distinguished in a physical layer, the physical layer signaling information may include the information representing whether the PLP included in a signal frame includes the EA information. In other words, since the EA information is included in the LLS information, the physical layer signaling information may signal/indicate whether the PLP include the LLS information.

In the case that the EA information is transmitted in the same PLP as the AV data, the broadcast transmitter may construct an IP address/port number of a service packet differently from an IP address/port number of the EA packet and transmit it. As an embodiment, the broadcast transmitter may use a dedicated IP address and port number for the IP packet including the EA information, and may use the IP address and the port number designated by a service signaling for the service data.

The broadcast receiver may perform a physical layer processing of the PLP. In addition, the broadcast receiver may identify the EA packet and the service data packet using the IP address/the port number of the IP packets. The description for the identified EA packet and the service data packet is as described in FIG. 21.

The broadcast receiver may receive or process the EA related information transmitted through the dedicated IP address and the port number, first. The broadcast receiver may process the EA related signaling and the EA message, and may receive the EA related audio/video data using the received EA signaling. That is, the broadcast receiver may identify the IP address and the port number for receiving the related audio/video data using the EA signaling, and may provide a service of A/V contents through receiving the corresponding packet stream. In the case that the corresponding service and the data are delivered through broadband, the related reception information (URI) may be signaled.

Hereinafter, the transmitted EA information is described.

FIG. 23 illustrates an EA message according to an embodiment of the present invention.

A broadcast system may construct EA information using a Common Alert Protocol (CAP) message as an EA syntax that a local broadcaster may transmit. As an embodiment, FIG. 23 shows an EA message using EA information required to construct EAS framework among the fields of the CAP message. However, the EA message constructed based on the CAP message may also be referred to as the CAP message.

The description of the fields included in the EA message of FIG. 23 is as below. The EA message includes a required field defined in the CAP and fields for transmitting a universal alert and an advanced alert required in the EAS framework.

The structure of binary syntax proposed in the present invention may be constructed with XML format.

message_identifier_str_length: A 8 bit unsigned integer value, and represent an identifier string of the corresponding EA message.

message_identifier_str( ): This field represents an identifier string of the EA message as much as a length of message_identifier_str_length.

sender_str_length: A 8 bit unsigned integer value, and means a length of string that means sender.

sender_str( ): A string that means a sender as much as a length of sender_str_length.

sent_str_length: A 8 bit unsigned interger value, and means a length of string that means the sent information.

sent_str( ): A string that means a sender as much as a length of sent_str_length.

status: A 4 bit unsigned integer value for representing a status of a message, and the definition of the value follows the definition of the CAP.

msgType: A 4 bit unsigned integer value for representing a message Type, the definition of the value follows the definition of the CAP.

scope: A 4 bit unsigned integer value for representing a Scope of a message transmission/reception, and the definition of the value follows the definition of the CAP.

num_info: In order to represent a message constructed with one or more languages, an alert may have one or more types of information.

category: This field means a category of the information that construct a message. The definition of the value follows the definition of the CAP.

lang_str_length: A value that represents a length of lang_str string.

lang_str: A string that represents the language of the corresponding info.

event_str_length: A value that represents a length of event_str( ).

event_str( ): A string describing an event, and the related definition follows the definition of the CAP.

urgency: A 4 bit unsigned integer value that represents an urgency, and the related definition follows the definition of the CAP.

severity: A 4 bit unsigned integer value that represents a severity, and the related definition follows the definition of the CAP.

certainty: A 4 bit unsigned integer value that represents a certainty, and the related definition follows the definition of the CAP.

num_resources: A 8 bit unsigned integer, and means the number of resources in relation to the corresponding info.

resource_desc_str_length: A string length of resource_desc_str.

resource_desc_str: A field that provides a description for a resource.

mimeType_str_length: A string length of mimeType that describes a mimeType.

mimeType_str: This field represents a mimeType of a resource.

resource_location( ): This field means a position to which a resource is transmitted. The detailed syntax is defined as invention 8 below.

FIG. 24 illustrates a resource location transmitted to support the enhanced alert according to an embodiment of the present invention.

A location of a resource transmitted to support the enhanced alert may have the path as shown in FIG. 24. Particularly, FIG. 24 shows a resource location or a transmission path for transmitting rich media content. The enhanced alert may correspond to the rich media content.

(1) As an embodiment, the rich media content may be transmitted through a protocol based on a transmission session. As an embodiment, a transmission protocol such as FLUTE, ROUTE and MMT may be used.

(2) As an embodiment, the rich media content may be transmitted with being included in the PLP as an IP/UDP packet.

(3) As an embodiment, in the case that the rich media content transmitted through a separate UDP/IP session, the rich media content may be transmitted through broadband.

(4) As an embodiment, the rich media content may be transmitted with being included in the EAT which is transmitted through an EA channel.

FIG. 25 illustrates a syntax representing a location of a resource for an enhanced alert transmission according to an embodiment of the present invention.

The structure of binary syntax proposed in the present invention may be constructed with XML format. The description of the fields included in the resource location syntax of FIG. 25 is as below.

location_type: This field means a type of a resource location.

0x01: A resource is transmitted through a single LCT session like FLUTE.

0x02: A resource is transmitted through a UDP/IP session.

0x03: A URL which is downloadable through broadband is specified.

0x04: This means the case that a resource itself is transmitted with being embedded.

Hereinafter, a method for signaling a resource location according to a location type is described based on the resource location information of FIG. 25.

(1) In the case that a resource location type is 0x01, a resource location may be signaled by the following information.

PLP_id: An identifier of the PLP in which a resource is transmitted.

source_IP_address: A source IP address of an IP packet in which a resource is transmitted.

destination_IP_address: A destination IP address of an IP packet in which a resource is transmitted.

destination_Port: A destination port number of an IP packet in which a resource is transmitted.

session_id: A session ID of a transmission session protocol in which a resource is transmitted, for example, may be a Transport Session Identifier value in the case of the LCT session.

broadcast_stream_id: An identifier of a broadcast stream in which a resource is transmitted.

(2) In the case that a resource location type is 0x02, a resource location may be signaled by the following information.

PLP_id: An identifier of the PLP in which a resource is transmitted.

destination_IP_address: A destination IP address of an IP packet in which a resource is transmitted.

destination_Port: A destination port number of an IP packet in which a resource is transmitted.

broadcast_stream_id: An identifier of a broadcast stream in which a resource is transmitted.

(3) In the case that a resource location type is 0x03, a resource location may be signaled by the following information.

resource_download_url_str_length: A length of URL in which a resource download is available.

resource_download_url_str: URL in which a resource download is available.

(4) In the case that a resource location type is 0x04, a resource location may be signaled by the following information.

resource_data_length: A length of an embedded resource.

resource_data_bytes( ): Embedded Resource Data

Accordingly, in the embodiment of FIG. 25, the present invention may provide an additional EA related content, and in such a case, the present invention may provide a method for transmitting the additional EA related content and a signaling method for supporting it.

FIG. 26 illustrates EA information according to another embodiment of the present invention.

The embodiment of FIG. 26 proposes a structure of the EA information (EA table) including one or more EAs. The embodiment of the EA table or the description syntax including one or more EAs is as shown in FIG. 26. The structure of binary syntax proposed in the present invention may be constructed with XML format. The description of the fields included in the EA table (EA message) syntax of FIG. 26 is as below.

In FIG. 26, the EA information includes the signaling information with respect to at least one EA contents. The transmission type of the EA content may be a type embedded in the EA information, a type transmitted in a broadcast network or a type transmitted in broadband. The format of the EA content may be distinguished by EA format information ea_format. The format of the EA content may correspond to a CAP format, a binary syntax format or an XML format.

table_id: A unique ID of a table given to EAT table
EAT_protocol_version: A protocol version of EAT
section_length: A length of a table
EAT_version_number: A version number of table data
current_section_number: A number of the current table
last_section_number: The number of total tables transmitted ea_id: A unique identifier given per an emergency alert issued a day ea_transfer_type: A value representing a path through which the EA is transmitted. In the case that it is 0x01, this means that the EA is transmitted with being embedded in a table. In the case that it is 0x02, this means the case that the EA is transmitted in a broadcast network. In the case that it is 0x03, this means the case that the EA is transmitted in broadband.

ea_format: This field means a format of the emergency information transmitted through the EAT. In the case that it is 0x01, the CAP is transmitted, and in the case that it is 0x02, this means a predefined message format of a binary syntax form. In the case that it is 0x03, this means a predefined message format of an XML form. In the other case, it is defined as a reserved field for the Future Extensibility.

encoding_type: This field an encoding type of the CAP in the case that it is transmitted with a CAP message. This field means 0x00 (no compression) or 0x01 (DEFLATE).

CAP_data_length: This field represents a length of the CAP in the case that the emergency alert is transmitted through the CAP.

CAP_data_bytes( ): Actual CAP bytes transmitted with being embedded in a table

Emergency_Alert( ): An alert message of a Predefined Emergency Alert Type defined in section 7 broadcast_stream_id: A stream identifier of a broadcast, in the case that it is transmitted with different IP packet, not embedded in a table. In the case that it is defined as 0x00, this means that it is transmitted with the same broadcast_stream_id as the corresponding EAT.

PLP_id: An identifier of PLP which is transmitted, in the case that it is transmitted with different PLP, not embedded in a table.

sourceIPaddress: A source IP address of a UDP/IP session, in the case that it is transmitted with different UDP/IP session, not embedded in a table.

destinationIPaddress: A destination IP address of a UDP/IP session, in the case that it is transmitted with different UDP/IP session, not embedded in a table.

destinationPort: A destination port number of a UDP/IP session, in the case that it is transmitted with different UDP/IP session, not embedded in a table.

tsi: A transport session identifier of an LCT session which is transmitted, in the case that it is transmitted with different LCT session, not embedded in a table.

ea_url_length: In the case that an Emergency Alert is transmitted in broadband, this field represents a length of URL which is transmitted.

ea_url: A path URL through which an Emergency Alert is transmitted in broadband

FIG. 27 illustrates an embodiment of signaling an embedded EA in an EA message.

It is identified that the ea_transfer_type field value is 0x01 and the EA is embedded in the EA table. In addition, in the case that the ea_format value is 0x01, this may represent that the embedded EA is the CAP data, and in the case that the ea_format value is 0x02, this may represent that the embedded EA is the predefined EA format. Furthermore, two EA messages TOR_ALERT_001 and HUR_ALERT_001 may be transmitted with being included in the EAT. The first EA message TOR_ALERT_001 may be transmitted with the CAP, and the second EA message HUR_ALERT_001 may be transmitted with the predefined EA format.

FIG. 28 illustrates an embodiment of signaling an EA with a separate session in an EA message.

The ea_transfer_type field value is 0x02, which may represent that an alert message is transmitted with a separate session. In addition, in the case that the ea_format value is 0x01, this may represent that the transmitted message is the CAP data, and in the case that the ea_format value is 0x02, this may represent that the transmitted message is the predefined EA format.

Hereinafter, the present invention proposes a method for transmitting rich media contents in relation to the EA and the EAT syntax therefor. As an embodiment, the EA related rich media may be transmitted through the EAS NRT service signaling.

FIG. 29 illustrates syntax of the EA information according to another embodiment of the present invention.

FIG. 29 shows the EA information defined to transmit the rich media in relation to the EA. The fields in the table of FIG. 29 as the same as FIG. 26 will not described repeatedly.

The EA table of FIG. 29 includes EAS_NRT_Service_id information. The rich media associated with an EA may be transmitted through the EAS NRT service signaling. The present invention proposes a method of providing an EAS NRT service ID associated with a single EA of the EAT, and signaling the rich media contents associated with the EA through signaling of the corresponding service. The EAS_NRT_Service_id information represents a service identifier for providing the rich media associated with the EA.

In FIG. 29, a type for the rich media content being transmitted may be CAP, broadcast or broadband, and the EA information provides the resource location information for each type. In the case that a transmission type of the rich media is broadcast, the EA information may provide at least one field of a broadcast stream ID, a PLP ID, a source IP address, a destination IP address, a destination port number and a TSI. In the case that the rich media content is transmitted in an LCT session, the TSI represents a transport session identifier (TSI) of the corresponding LCT session. That is, the TSI may represent the LCT channel information in which the rich media content is transmitted. In the case that a transmission type of the rich media content is broadband, the EA information includes the URL information for downloading the rich media content.

FIG. 30 illustrates an ENRT-IT (EA related NRT information table) for rich media contents signaling according to an embodiment of the present invention.

The description for the fields included in FIG. 30 is as follows.

table_id: A unique ID of the table given to the ENRT-IT table

ENRT_IT_protocol_version: A protocol version of the ENRT-IT section_length: A length of the table ENRT-IT_version_number: A version number of the table data current_section_number: A section number of the current table last_section_number: The number of total tables that are transmitted service_id: An identifier of the EAS NRT service specified with the service associated with the EA in the EAT num_rich_media_contents: The number of rich media contents transmitted through the EAS NRT service content_linkage: This field specifies a value mapped to Content linkage specified in FDT (File Delivery Table). A receiver may obtain the information of each file defined in the FDT using the value. This field may also represent a URL matched to the content-location attribute of the corresponding file element in the FDT of the LCT channel that delivers a file.

expiration: An expiration date of the corresponding content size: A size of the corresponding content time_slot_info: time_slot information of the corresponding content content_description_length: A length of description string that represents brief information of the corresponding content content_description: A string that represents brief information of the corresponding content name_length: A length of the name of the corresponding content name: A name of the corresponding content availableOnInet: A flag representing whether an acquisition of the corresponding content is available through broadband content_url_length: A length of broadband URL of the corresponding content content_url: A broadband URL of the corresponding content FIG. 31 illustrates a signaling structure of rich media contents according to an embodiment of the present invention.

As described above, the EA related rich media contents may be transmitted through broadcast or broadband. FIG. 31 shows a signaling structure for the case that the rich media contents are streaming through broadcast. That is, in the embodiment of FIG. 31, the rich media contents are provided as an EA service.

As described above, the EA information may include an ID of the service in which the EA related rich media contents are transmitted. In the embodiment of FIG. 31, the EAS NRT service ID is 0x0911.

Accordingly, a broadcast receiver may identify the ID of the service in which the EA related rich media contents are transmitted, and may check the SLS information for the corresponding ID from the SLT information. That is, the broadcast receiver may identify the service in which the EA related rich media contents are transmitted from the SLT information, and may obtain the resource information (IP information, port information, TSI-SLS information, etc.) for the SLS that signals the information for the service. The broadcast receiver may obtain the SLS information for the service that delivers the EA related rich media contents, and may receive the service data, that is, the rich media contents by using the SLS information.

For this, the service category information of the SLT may include an EAS service category. That is, the service category information service_category of FIG. 14 may further include an EAS service in addition to a linear A/V service, a linear audio only service, and an App-based service, as a service category.

An EA message may wake up or not a receiver based on a priority of a message. For this, a wake-up indicator may be signaled. Otherwise, based on the priority, the receiver may wake up only in the case that an EA message of higher priority than a specific value is received. The wake-up operation may occur in the case that a TV or a broadcast receiver is turned off or in a standby mode.

In the case that a user experiences wake-up of a broadcast receiver based on a wake-up signal and turns off the broadcast receiver, the broadcast receiver should not wake up for an identical EA message. Accordingly, in order for the receiver to know whether a wake-up signal is an identical wake-up signal or a new/updated wake-up signal, a wake-up indicator and/or a wake-up version may be signaled. In the case that multiple alert messages are received simultaneously, the message of the highest priority should wake up the broadcast receiver. In such a case, the broadcast receiver may display all EA messages according to the priority.

FIG. 32 is a diagram illustrating a method for waking up a broadcast receiver or processing an EA message according to an embodiment of the present invention.

FIG. 32(a) shows the case of using a version of a wake-up signal itself, and FIG. 32(b) shows the case of using a version of an EA message.

In FIG. 32, a broadcast receiver may decode a bootstrap signal of a physical layer signal frame. The bootstrap signal of the signal frame performs the role of an entry point with respect to a transmitted signal, and has a fixed configuration public to all receivers. The bootstrap information may include wake-up information eas_wake_up. The broadcast signal receiver may wake up from a standby mode to an active mode based on a value of the wake-up information.

In FIG. 32(a), the broadcast receiver that enters the active mode may decode L1 signaling information, and may check the wake-up version information included in the L1 signaling information. In addition, the broadcast receiver may obtain EA information (EAT) in the case that the wake-up version is new.

In FIG. 32(b), the broadcast receiver that enters the active mode may obtain the EA information, and may check the version information of the EA information included in the EA information. In addition, the broadcast receiver may process the EA information in the case that the wake-up version is new.

As described in FIG. 32, the wake-up information may include wake-up indication information that indicates wake-up of the receiver or version information that determines whether to obtain or process the EA information. The version information may represent a version of the wake-up information or a version of the EA information. However, in the case of representing a version of the wake-up information, the receiver is not even required to obtain and process the EA information, and accordingly, the receiver may further decrease unnecessary processing. Such wake-up indication information and the version information may be referred to as wake-up information.

FIG. 33 illustrates an operation of a broadcast receiver according to wake-up information.

In FIG. 33, a signal frame of a physical layer may include Physical Layer Signaling (PLS) information, and the PLS information may provide L1 signaling information. The L1 signaling information may include version information, and the version information may provide a wake-up indicator and a wake-up version. As an embodiment, a broadcast receiver may refer to a version (EAT, message_version) of an EA message.

On timing t1, the receiver may detect wake-up information, and may process or provide an EA message by waking up accordingly. The EA message may include the content that Hurricane is coming.

On timing t2, the receiver detects the wake-up information. The wake-up information detected by the receiver includes a wake-up indication. However, the version information of the detected wake-up information is the same as the version information of the wake-up information received on timing t1. Accordingly, the receiver does not process or provide the EA message. The receiver may not wake up.

On timing t3, the receiver detects the wake-up information. The wake-up information detected by the receiver includes a wake-up indication. However, the version information of the detected wake-up information has higher version than the version information of the wake-up information received on timing t1. Accordingly, the receiver may process or provide the EA message. The EA message may include the content that tornado is coming.

FIG. 34 illustrates a method for transmitting a broadcast signal according to an embodiment of the present invention.

A broadcast transmitter may encode a broadcast service data based on a delivery protocol (step, S34010). The broadcast service data is a data that supports a function provided by a broadcast service, and may include at least one of audio, video and text data. The broadcast service data may also be referred to as a service data component or a service component.

The broadcast transmitter generates Service Layer Signaling (SLS) information and SLT information for discovering and obtaining the broadcast service data (step, S34020). The SLS information provides a discovery and an acquisition of the broadcast service data, and the SLT information provides a discovery of the SLS information and a basic service list building. However, the SLT information may be generated after encoding based on generation and delivery protocol of the SLS information. In such an embodiment, the broadcast transmitter may encode the SLS information based on the generation and delivery protocol, and generate the SLT information, and then, perform the UDP/IP encapsulation of each service data, the SLS information and the SLT information. As another embodiment, the broadcast transmitter may generate the SLS information for the broadcast service data, and encode the broadcast service data and the SLS information based on the delivery protocol, and then generate the SLT information. That is, the order and the construction of performing steps S34010 to S34030 may be changed according to an embodiment.

The broadcast transmitter may encode the SLS information based on the delivery protocol (step, S34030). The deliver protocol in which the broadcast service data and the SLS information are encoded may include at least one of Real-Time Object Delivery over Unidirectional Transport (ROUTE) protocol or MPEG Media Transport (MMT) protocol. However, the same delivery protocol may be applied to the broadcast service data and the SLS information. That is, in the case that the broadcast service data is encoded by MMT protocol, the SLS information for the broadcast service data may be encoded by the MMT protocol. In addition, in the case that the broadcast service data is encoded by ROUTE protocol, the SLS information for the broadcast service may be encoded by ROUTE protocol.

The broadcast trasmitter may respectively UDP (User Datagram Protocol)/IP (Internet Protocol) encapsulate the broadcast service data, the SLS information and the LLS information including the SLT information (step, S34040). The broadcast service data, the SLS information and the LLS information which is performed through UDP/IP encapsulation is an IP packet, and may be distinguished by an IP address and a port number. Accordingly, the data transmitted by the broadcast receiver according to the present invention may operate/be distinguished based on IP.

The broadcast transmitter may generate a signal frame by performing physical layer processing of the broadcast service data, the SLS information and the LLS information (step, S34050). The signal frame may include physical layer signaling information (L1 signaling information).

In the UDP/IP encapsulation, the LLS information may be encapsulated with an IP packet that has a predetermined address and port number. That is, the LLS information may be carried as a payload of an IP packet that has a well-known address and port number. In addition, the LLS information may further include the Emergency Alert (EA) related signaling information.

A broadcaster may be needed to broadcast an alert for an emergency situation when the emergency situation occurs.

The signaling information for providing such EA (emergency alert) may also be referred to as EA related signaling information. Furthermore, the EA related signaling information may correspond to a Common Alerting Protocol (CAP) message. The CAP represents a simple but general format that may exchange/communicate all EAs over all types of networks.

The rich media content may be provided as the EA. For this, the EA related signaling information may include the signaling information for transmitting the EA related rich media content. In the case that the rich media content is delivered through broadband, the EA related signaling information may indicate the Uniform Resource Locator (URL) information that may receive the rich media content. In the case that the rich media content is delivered through broadcast, the EA related signaling information may indicate the LCT channel information in which the rich media content is delivered.

As described above, the SLT information includes service category information. The service category information may include a linear A/V service, a linear audio only service, an application-based service and an EA service, and may further include an EA service. In addition, the rich media content may be delivered through the EA service. In this case, the EA related signaling information includes the service ID information that delivers the rich media content.

In the case that a signal frame includes the EA related signaling information, the physical layer signaling information of the signal frame may include a wake-up signal (wake-up information) indicating a wake-up from a standby mode of a receiver and a version of the wake-up.

In the present invention, the LLS information is not encoded based on the delivery protocol. Accordingly, the receiver may obtain the SLT information or the EA related signaling information included in the LLS information with less decoding operation. Particularly, since the LLS information is distinguished by a well-known IP address/port number, the receiver may start providing a broadcast service quickly by receiving the LLS information with the start of a broadcast signal reception.

Since the EA related signaling information is included in the LLS information, the receiver may also provide the EA related message/content quickly by receiving/decoding to a user. Particularly, the EA related signaling information is used as a CAP message, and thus, the compatibility may be increased. The EA related rich media content may be transmitted separately from the EA related signaling information, and may be transmitted through broadcast or broadband. For each of the cases, the EA related signaling information provides the resource information (URL information and/or LCT channel information) required for the receiver to receive the rich media content through broadcast/broadband. Accordingly, even in the case that the receiver is unable to receive the rich media content in a path, the receiver may receive the rich media content in other path, and accordingly, the safety of EA content delivery for a disaster situation may be increased.

The rich media service for the EA may be delivered through broadcast service. Accordingly, the service category information should identify the EA service therefor. The service category information may distinguish a linear A/V service, a linear audio only service, an application-based service and an EA service. In addition, in this case, the EA related signaling information may include service ID information of the EA service. Since the receiver may receive the EA content as one of the broadcast service, in this case, the receiver may deliver the EA content while minimizing an operation change of the broadcast system.

FIG. 35 illustrates a broadcast signal transmitter and a broadcast signal receiver according to an embodiment of the present invention.

A broadcast signal transmitter 35100 may include a signaling generator 35110, a delivery layer encoder 35120, a UDP/IP encapsulator 35130 and a physical layer processor 35140.

The signaling generator 35110 may generate the Service Layer Signaling (SLS) information that provides a discovery and acquisition of the broadcast service data and the Service List Table (SLT) information that provides a basic service list building and an acquisition of the SLS information. The delivery layer encoder 35120 may encode the broadcast service data and the SLS information based on at least one delivery protocol of Real-Time Object Delivery over Unidirectional Transport (ROUTE) protocol or MPEG Media Transport (MMT) protocol. The UDP/IP encapsulator 35130 may respectively UDP (User Datagram Protocol)/IP (Internet Protocol) encapsulate the service data, the SLS information and the Low level Signaling (LLS) information including the SLT information. The physical layer processor 35140 may generate a signal frame by performing physical layer processing of the broadcast service data, the SLS information and the SLT information.

The broadcast signal transmitter 35100 of FIG. 35 performs the method for transmitting a broadcast signal described above, and the same description is not repeated.

The broadcast signal receiver 35200 may include a signaling parser 35210, a delivery layer decoder 35220, a UDP/IP packet parser 35230 and a physical layer parser 35240. The broadcast signal receiver 35200 may perform an inverse operation of the broadcast signal transmitter.

The physical layer parser 35240 may perform physical layer processing of a received signal frame and output a UDP/IP packet stream. The UDP/IP packet parser 35230 may decapsulate the received IP packet stream and output a service component data. The delivery layer decoder 35220 may decode the service component data according to the delivery protocol. The signaling parser 35210 may obtain and parse signaling information and control an operation of the broadcast signal receiver. For example, the broadcast signal receiver may obtain the SLT, and may obtain an IP address and a port number of a required SLS by parsing the SLT. In addition, the broadcast signal receiver may obtain a transmission path of a required service data by parsing the SLS. Furthermore, the broadcast signal receiver may perform physical layer parsing, UDP/IP decapsulating and delivery layer decoding of a required broadcast data throughout overall paths, and may provide the corresponding broadcast data to a user.

In FIG. 35, sub-units of the broadcast signal transmitter and the broadcast signal receiver are distinguished according to the operations. That is, a single sub-unit is not necessary to be implemented as a single physical processor, but a single sub-unit may be implemented as a plurality of physical processors or a plurality of sub-units may be implemented as a single physical processor.

The steps described in the aforementioned embodiments can be performed by hardware/processors. Modules/blocks/units described in the above embodiments can operate as hardware/processors. In addition, the methods proposed by the present invention can be executed as a code. Such code can be written on a processor-readable storage medium and thus can be read by a processor provided by an apparatus.

While the embodiments have been described with reference to respective drawings for convenience, the embodiments may be combined to implement a new embodiment. The apparatus and method according to the present invention are not limited to the configurations and methods of the above-described embodiments and the whole or some of the embodiments may be selectively combined to obtain various modifications.

Meanwhile, the method proposed in the present invention may be implemented as processor-readable code stored in a processor-readable recording medium included in a network device. The processor-readable recording medium includes all kinds of recording media storing data readable by a processor. Examples of the processor-readable recording medium include a ROM, a RAM, a CD-ROM, a magnetic tape, a floppy disk, an optical data storage device and the like, and an implementation as carrier waves such as transmission over the Internet. In addition, the processor-readable recording medium may be distributed to computer systems connected through a network, stored and executed as code readable in a distributed manner.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Such modifications should not be individually understood from the technical spirit or prospect of the present invention.

Those skilled in the art will appreciate that the present invention may be changed and modified in various ways without departing from the spirit and essential characteristics of the present invention. Therefore, the present invention is intended to include change and modification of the present invention provided in the accompanying claims and the equivalency range.

In the specification, both the apparatus invention and the method invention are mentioned, and description of both the apparatus invention and the method invention can be applied complementarily.

[Mode For Invention]

Various embodiments have been described in the Best Mode for the Invention.

INDUSTRIAL APPLICABILITY

The present invention is used in a series of broadcast signal transmission/reception fields.

Those skilled in the art will appreciate that the present invention may be changed and modified in various ways without departing from the spirit and essential characteristics of the present invention. Therefore, the present invention is intended to include change and modification of the present invention provided in the accompanying claims and the equivalency range.

The invention claimed is:

1. A method for transmitting a broadcast signal, comprising:
generating SLS information and SLT information with respect to broadcast service data, wherein the SLS information provides a discovery and an acquisition of the broadcast service data, and wherein the SLT information provides a discovery of the SLS information and building of a basic service list;
processing the broadcast service data and the SLS information based on a delivery protocol;
UDP (User Datagram Protocol)/IP (Internet Protocol) encapsulating the broadcast service data, the SLS information and Low level Signaling (LLS) information including the SLT information; and
generating a signal frame by physical layer processing of the broadcast service data, the SLS information and the LLS information,
wherein the delivery protocol includes at least one of a Real-Time Object Delivery over Unidirectional Transport (ROUTE) protocol or an MPEG Media Transport (MMT) protocol.

2. The method for transmitting a broadcast signal of claim 1, wherein the LLS information is carried in a payload of an IP packet that has a predetermined address and port number.

3. The method for transmitting a broadcast signal of claim 2, wherein the LLS information includes Emergency Alert (EA) related signaling information.

4. The method for transmitting a broadcast signal of claim 3, wherein the EA related signaling information corresponds to a Common Alerting Protocol (CAP) message.

5. The method for transmitting a broadcast signal of claim 4, wherein the EA related signaling information includes signaling information for media content transmission,
when a rich media content is delivered through broadband, the EA related signaling information indicates Uniform Resource Locator (URL) information for receiving the rich media content, and when the rich media content is delivered through broadcast, the EA related signaling information indicates LCT channel related information in which the rich media content is delivered.

6. The method for transmitting a broadcast signal of claim 4, wherein the SLT information includes service category information, and a service category indicated by the service category information includes a linear A/V service, a linear audio only service, an application-based service and an EA service.

7. The method for transmitting a broadcast signal of claim 3,
wherein when the signal frame includes the EA related signaling information, physical layer signaling information of the signal frame indicates wake-up from a standby mode of a receiver, and includes wake-up signal indicating a wake-up version.

8. A broadcast signal transmitter, comprising:
a signaling generator configured to generate Service Layer Signaling (SLS) information providing a discovery and an acquisition of broadcast service data and Service List Table (SLT) information providing building of a basic service list and an acquisition of the SLS information;
a delivery layer processor configured to process the broadcast service data and the SLS information based on at least one delivery protocol of a Real-Time Object Delivery over Unidirectional Transport (ROUTE) protocol or an MPEG Media Transport (MMT) protocol;
a UDP/IP encapsulator configured to respectively UDP (User Datagram Protocol)/IP (Internet Protocol) encapsulate the broadcast service data, the SLS information and Low level Signaling (LLS) information including the SLT information; and
a physical layer processor configured to generate a signal frame by performing physical layer processing of the broadcast service data, the SLS information and the LLS information.

9. The broadcast signal transmitter of claim 8, wherein the LLS information is carried in a payload of an IP packet that has a predetermined address and port number.

10. The broadcast signal transmitter of claim 9, wherein the LLS information includes Emergency Alert (EA) related signaling information.

11. The broadcast signal transmitter of claim 10, wherein the EA related signaling information corresponds to a Common Alerting Protocol (CAP) message.

12. The broadcast signal transmitter of claim 11, wherein the EA related signaling information includes signaling information for media content transmission,
when a rich media content is delivered through broadband, the EA related signaling information indicates Uniform Resource Locator (URL) information for receiving the rich media content, and when the rich media content is delivered through broadcast, the EA related signaling information indicates LCT channel related information in which the rich media content is delivered.

13. The broadcast signal transmitter of claim 11, wherein the SLT information includes service category information, and a service category indicated by the service category information includes a linear A/V service, a linear audio only service, an application-based service and an EA service.

14. The method for transmitting a broadcast signal of claim 10,
wherein when the signal frame includes the EA related signaling information, physical layer signaling information of the signal frame includes wake-up signal indicating wake-up from a standby mode of a receiver and indicating a wake-up version.

* * * * *

UNITED STATES PATENT AND TRADEMARK OFFICE
CERTIFICATE OF CORRECTION

PATENT NO. : 10,498,792 B2  
APPLICATION NO. : 15/574802  
DATED : December 3, 2019  
INVENTOR(S) : Woosuk Kwon et al.

Page 1 of 1

It is certified that error appears in the above-identified patent and that said Letters Patent is hereby corrected as shown below:

In the Claims

Column 47, Line 65, Claim 1:
Change: "building of"
To: -- a building of --

Column 48, Lines 51-52, Claim 8:
Change: "providing building"
To: -- providing a building --

Signed and Sealed this
Twenty-fourth Day of January, 2023

Katherine Kelly Vidal
*Director of the United States Patent and Trademark Office*